(12) United States Patent
Sperry et al.

(10) Patent No.: US 6,311,740 B1
(45) Date of Patent: *Nov. 6, 2001

(54) DISPENSING SYSTEM COMPONENTS OF A DISPENSING SYSTEM AND METHOD OF MANUFACTURING OPERATING AND SERVICING A DISPENSING SYSTEM AND COMPONENTS THEREOF

(75) Inventors: Charles A. Sperry, Springfield, VT (US); Vincent A. Piucci, Spencer, MA (US); Todd A. Hanna, Richmond, VA (US)

(73) Assignee: Carpenter Co., Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/442,492

(22) Filed: Nov. 18, 1999

Related U.S. Application Data

(63) Continuation-in-part of application No. PCT/US98/06508, filed on Apr. 1, 1998, which is a continuation of application No. 08/959,460, filed on Oct. 27, 1997, now Pat. No. 5,996,848, and a continuation-in-part of application No. 08/903,175, filed on Jul. 30, 1997, now Pat. No. 5,964,378.

(51) Int. Cl.[7] ...................................................... B65B 1/04
(52) U.S. Cl. ............................... 141/129; 141/9; 141/100; 141/313; 222/146.6
(58) Field of Search ................................. 141/9, 100, 105, 141/106, 313, 129; 222/146.6, 145.2, 148, 129.1, 145.5; 239/112

(56) References Cited

U.S. PATENT DOCUMENTS 5,964,378   10/1999   Sperry et al. ..................... 222/145.2
5,996,848   12/1999   Sperry et al. ..................... 222/145.2

FOREIGN PATENT DOCUMENTS

WO 99/06196   4/1998   (WO) .

Primary Examiner—Steven O. Douglas
(74) Attorney, Agent, or Firm—Smith, Gambrell & Russell, LLP

(57) ABSTRACT

A mixing chamber assembly which has a reciprocating rod (270) received within a mixing chamber of a mixing chamber member (28). The reciprocating rod (270) is in a non-interference position with the mixing chamber over its entire length within the mixing chamber. The non-interference fit provides for continuous solvent flow about the exterior of the rod and interior of the wall defining the mixing chamber such that solvent drips out the discharge end of the mixing chamber and the rod is free to float or ride on a film of solvent. The ability for the rod to ride on a film of solvent over the entire portion received within the mixing chamber, allows for a much reduced reciprocating motive force requirement and a corresponding freedom to increase the mixing chamber volume. The mixing chamber member is preferably received within a dispenser housing (148) such that it is free to shift behind a dispensing and a non-dispensing mode with a shuttle valve arranged between the housing and mixing chamber to seal off chemical precursors for forming polzurethane foam or the like from entering the mixing chamber when the mixing chamber member is in a non-dispensing mode.

11 Claims, 43 Drawing Sheets

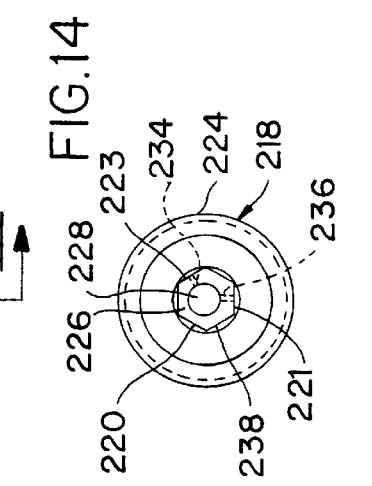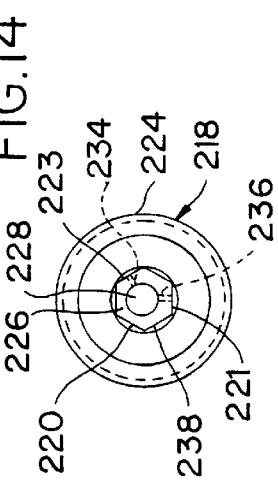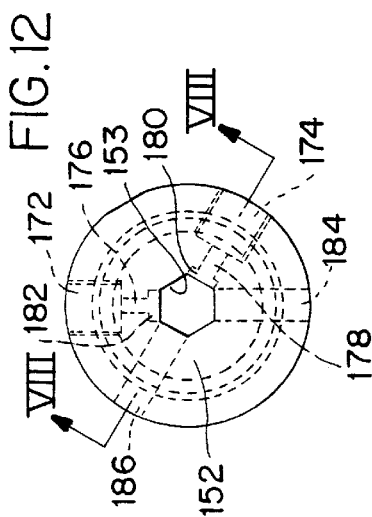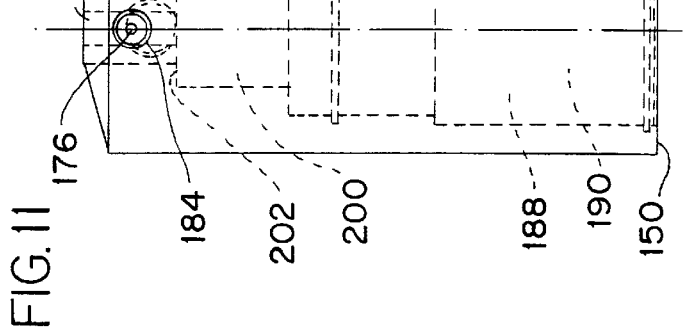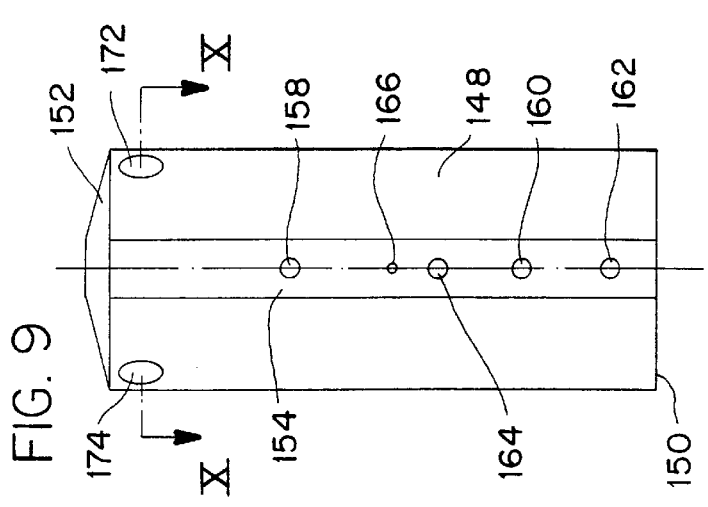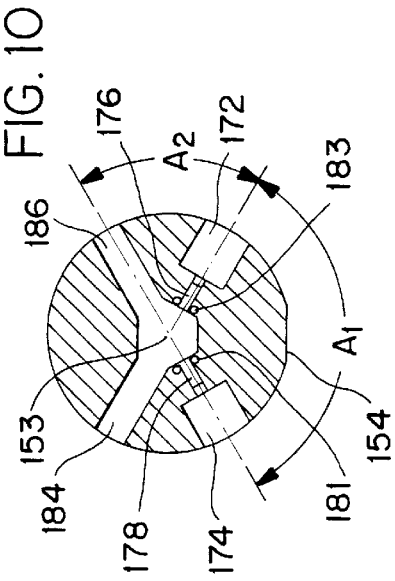

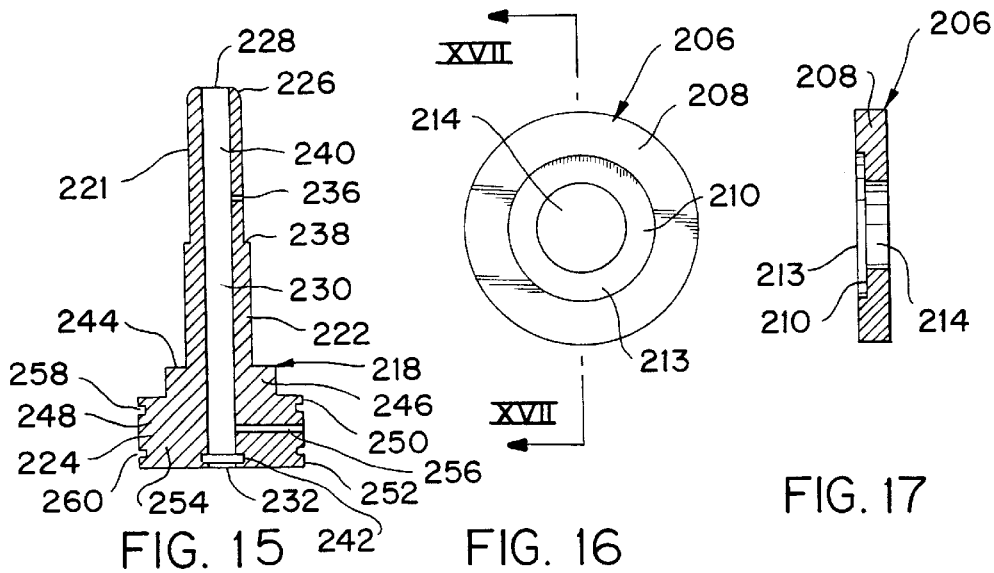
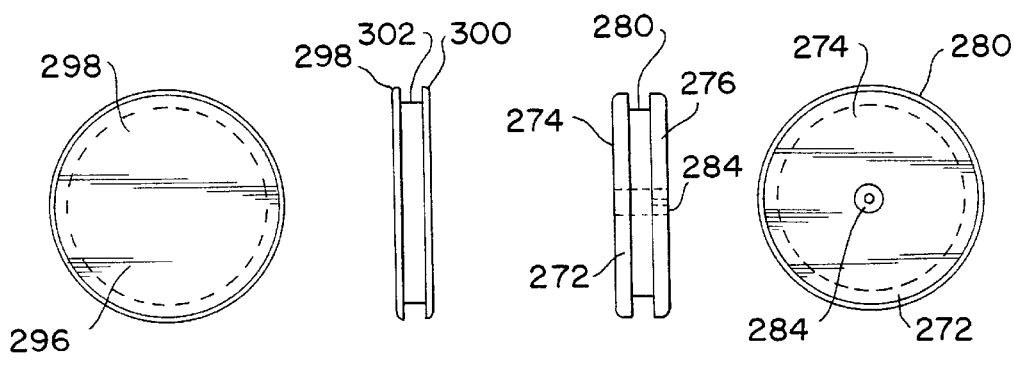
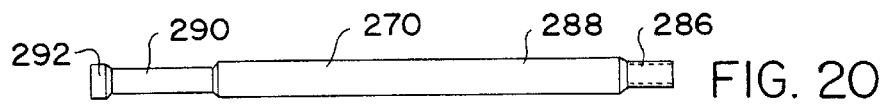
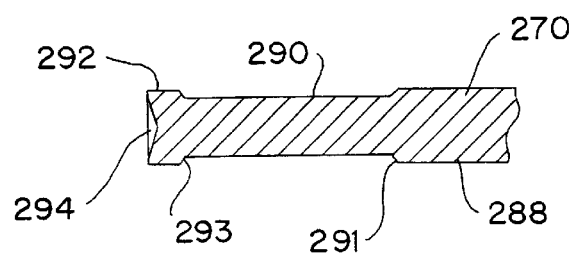

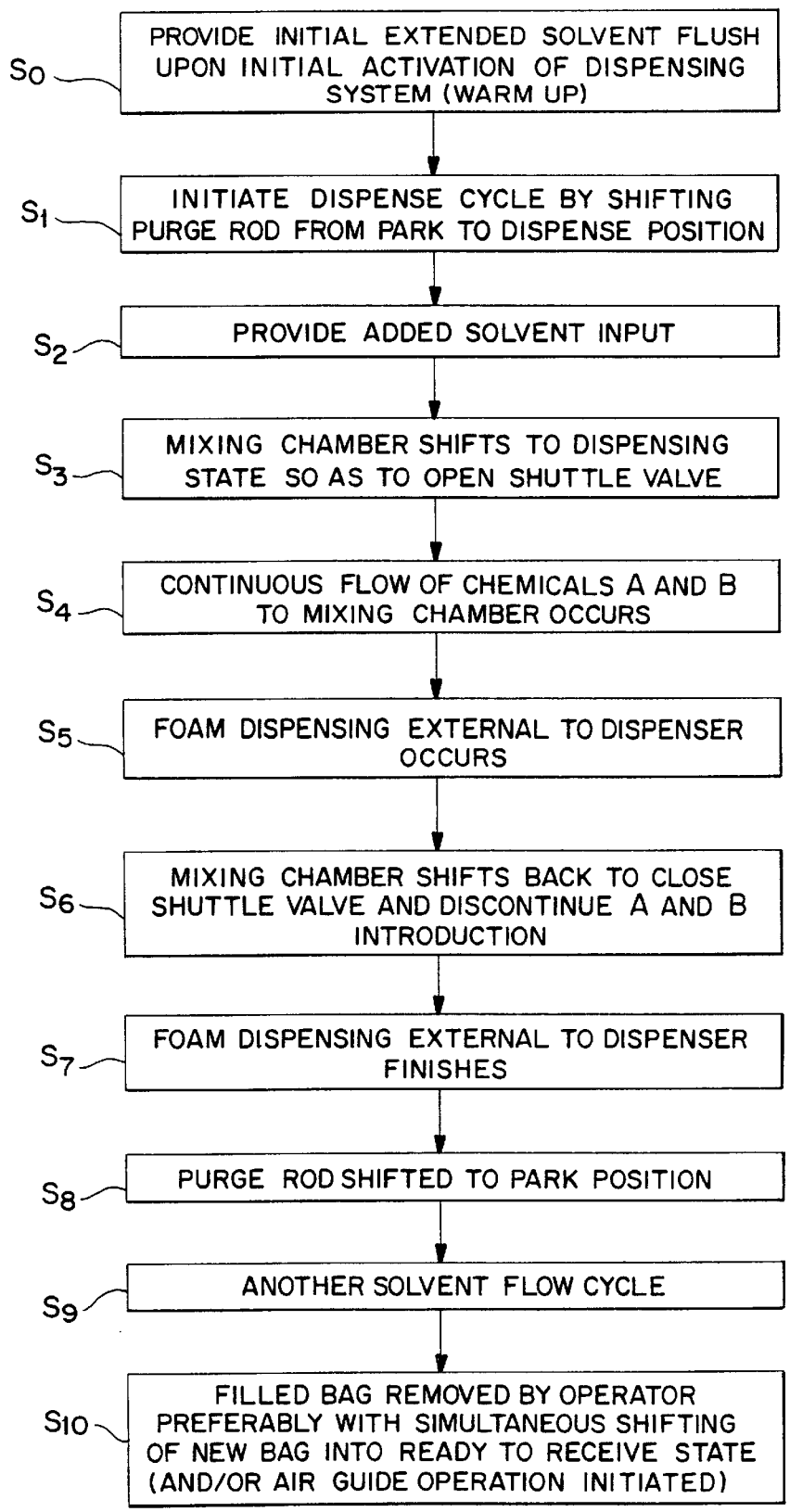

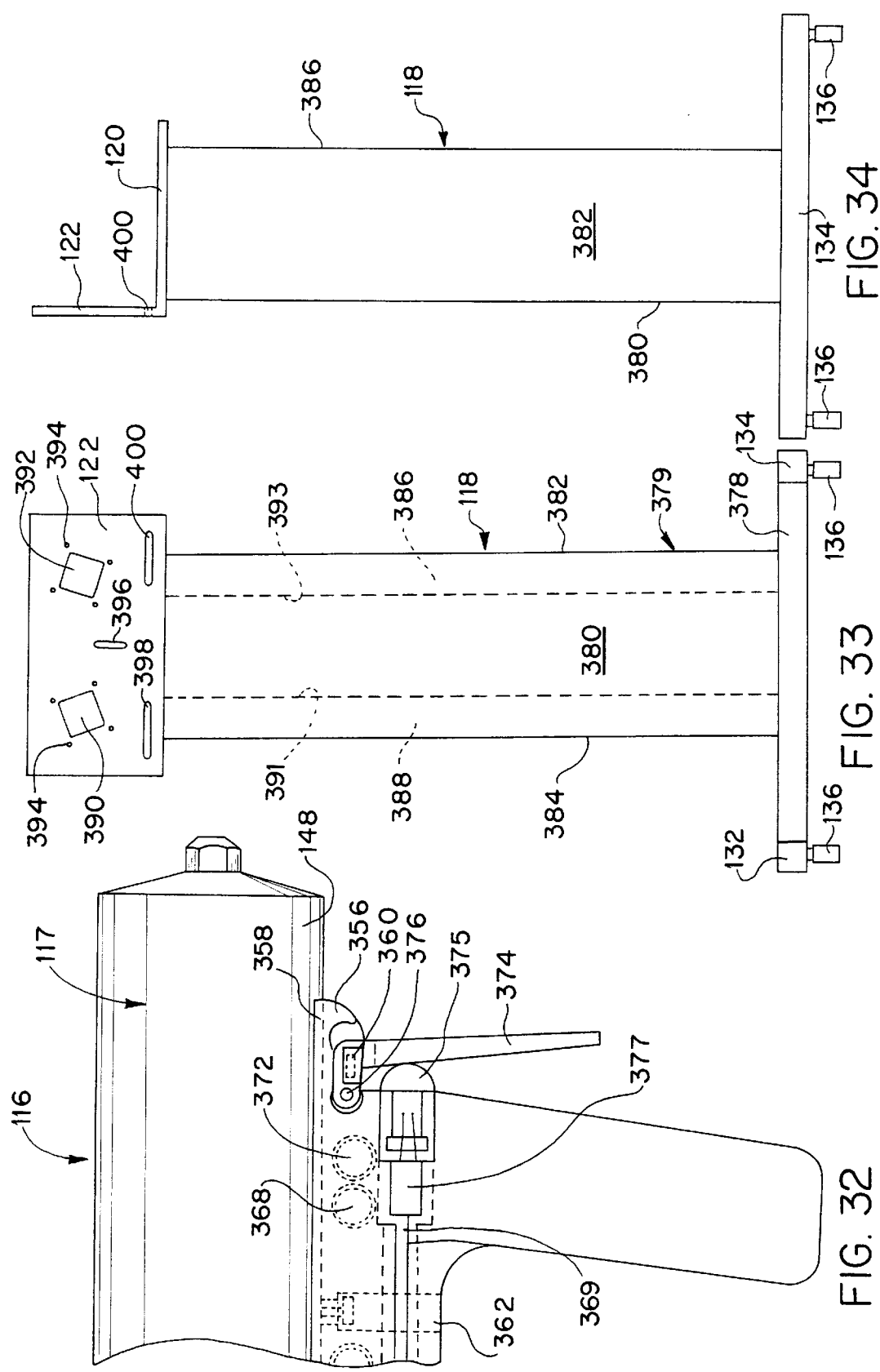

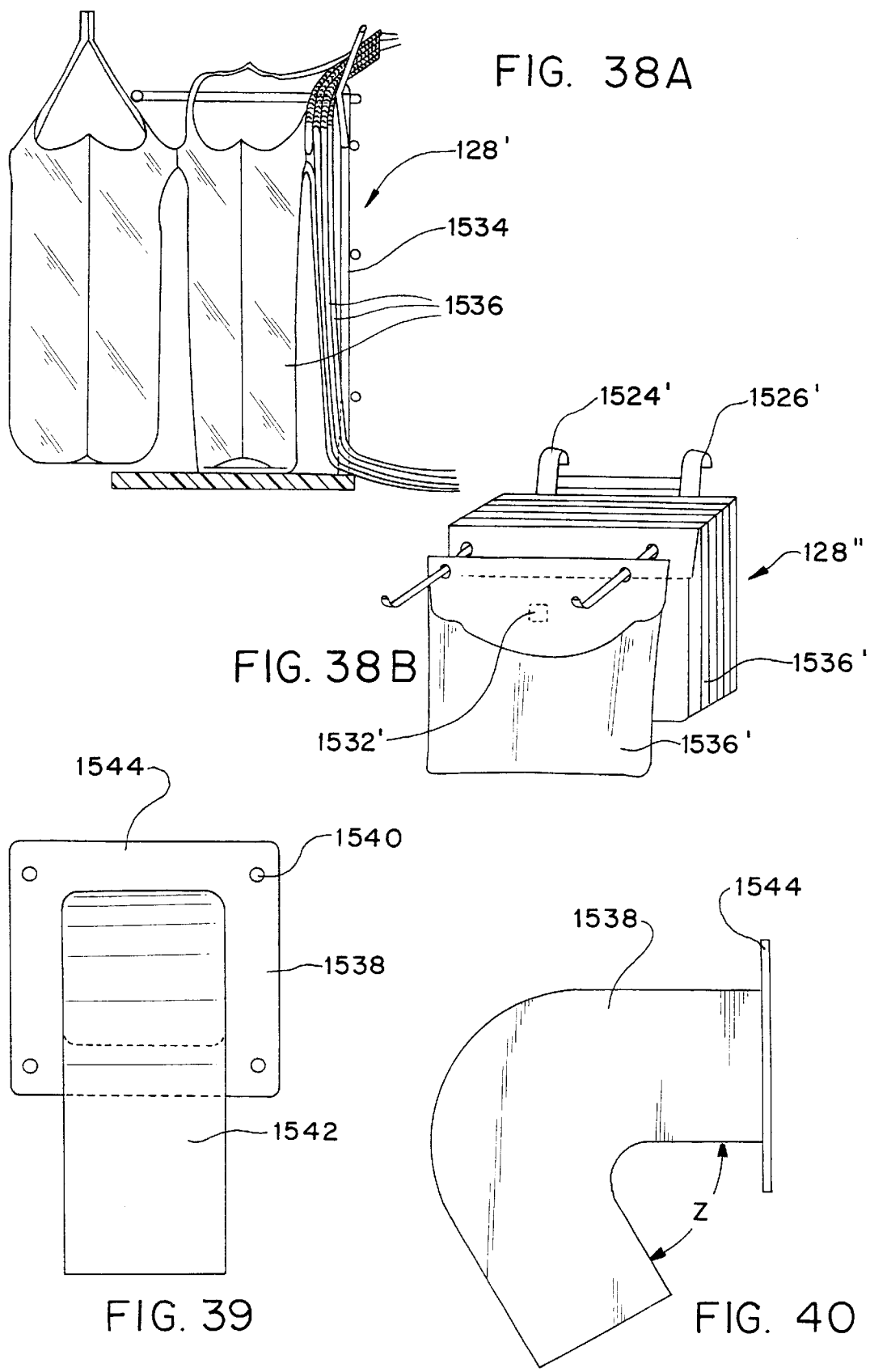

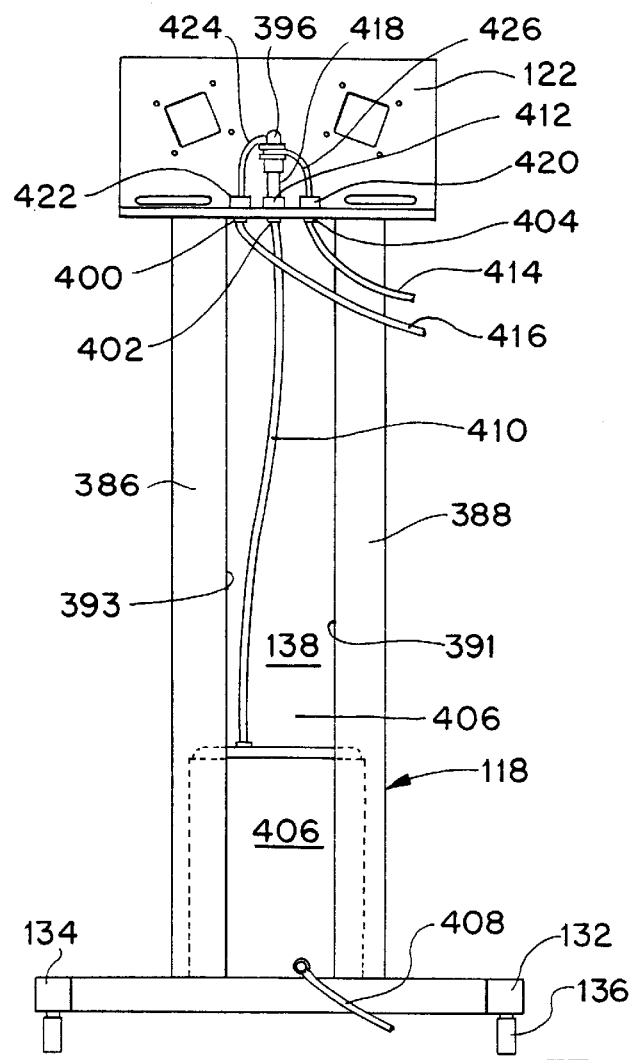
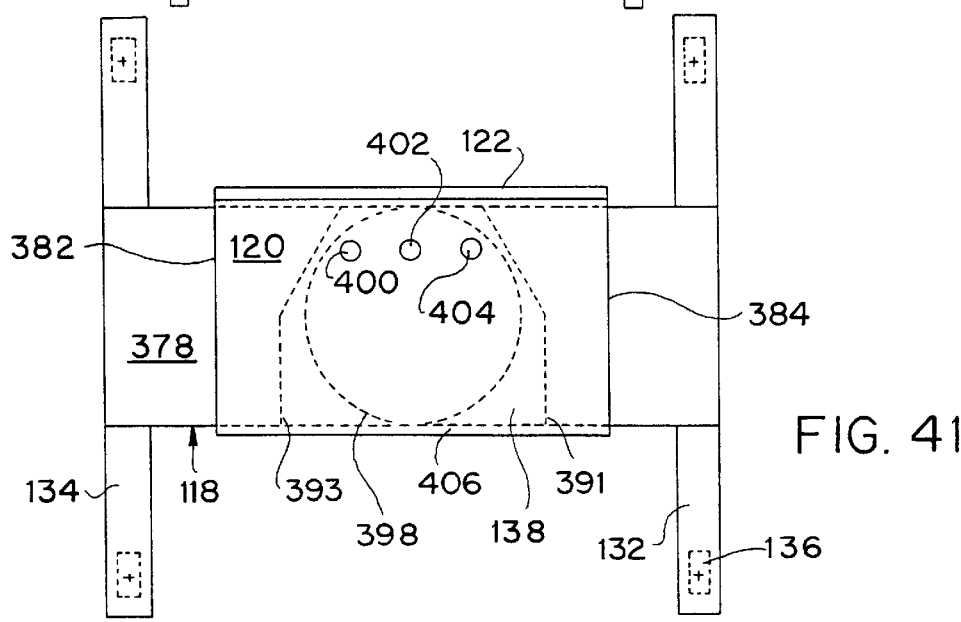
FIG. 42
FIG. 41

FIG. 64
FIG. 65
FIG. 66
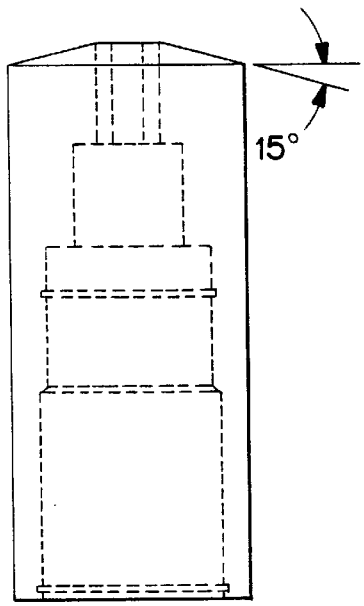
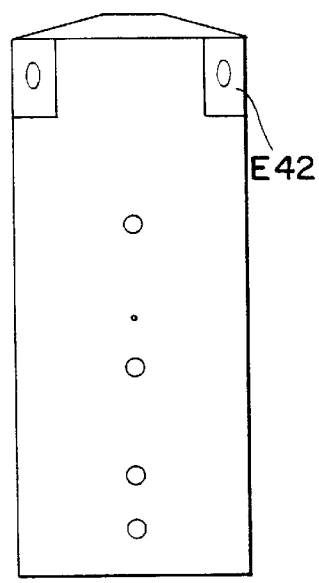
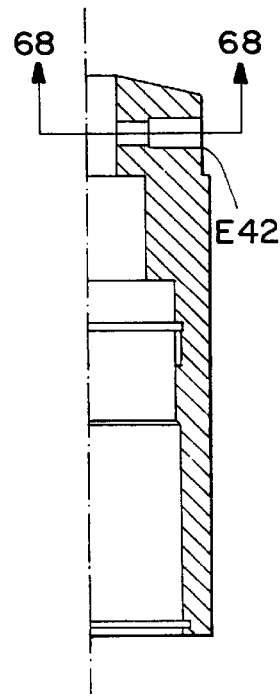
FIG. 67
FIG. 68
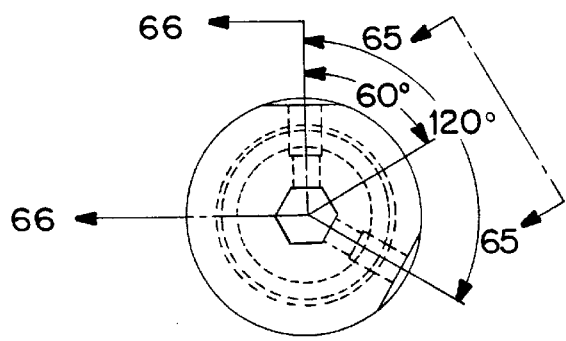
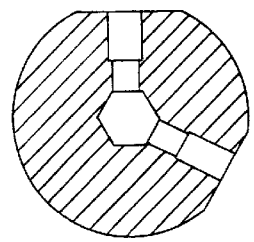

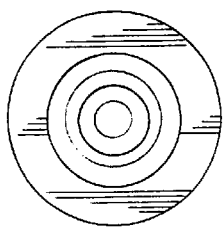
FIG. 80
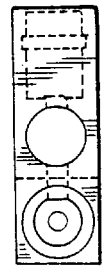
FIG. 84
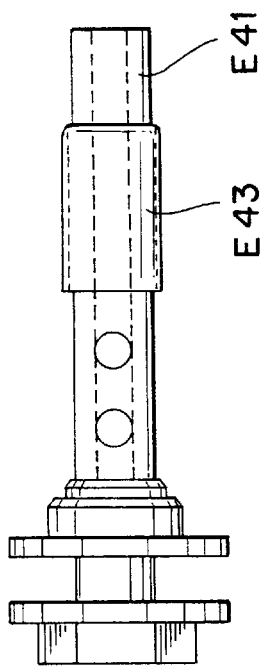
FIG. 79
FIG. 83
FIG. 82
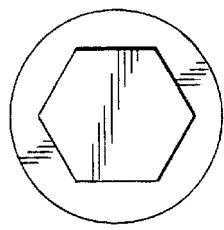
FIG. 78
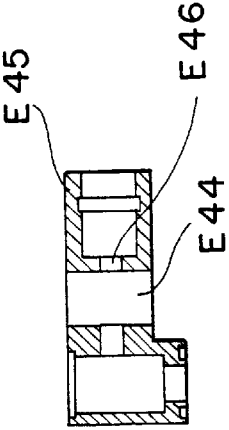
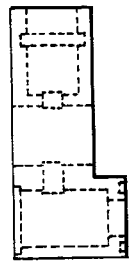
FIG. 81

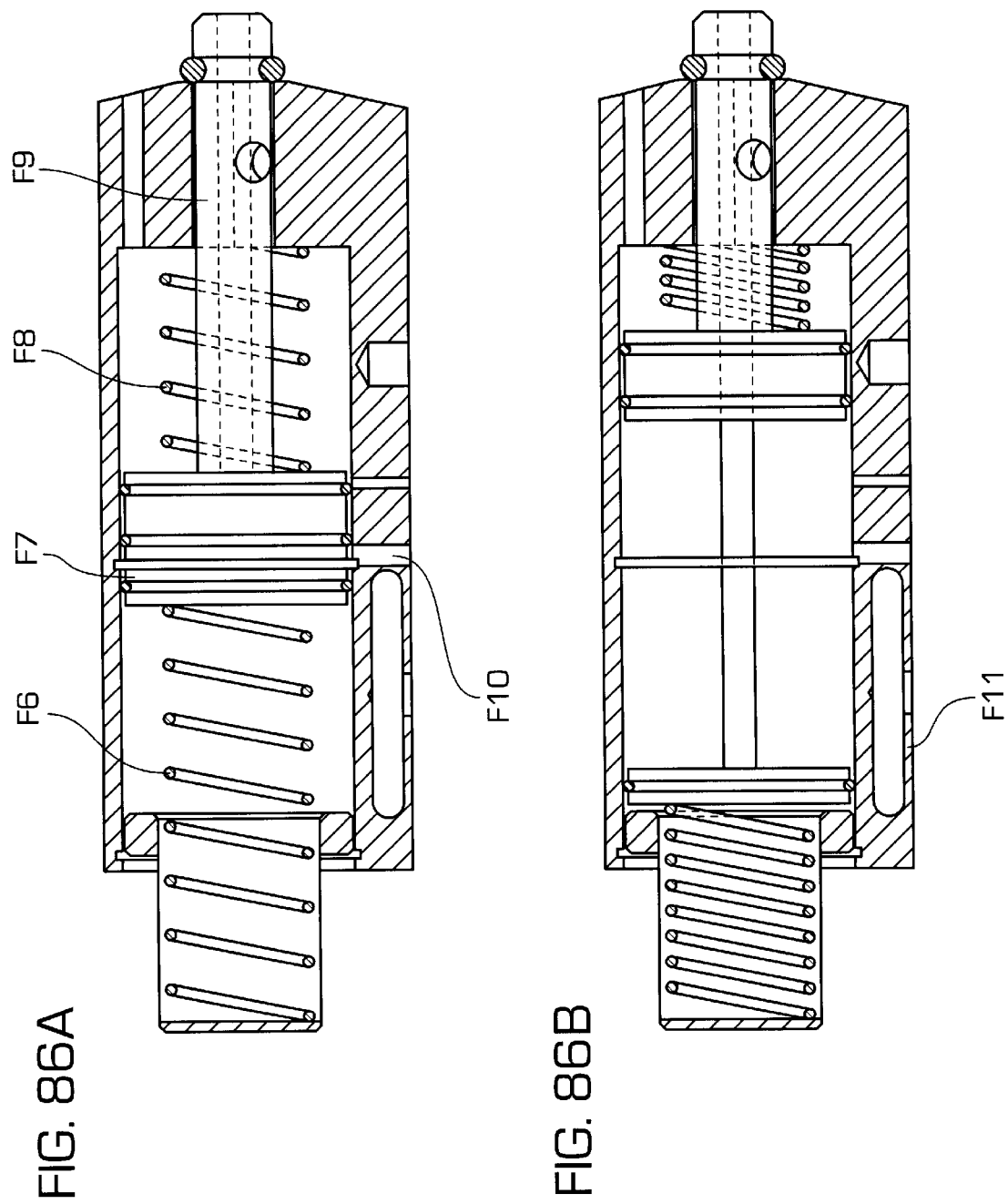

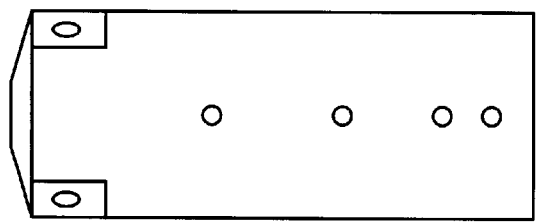
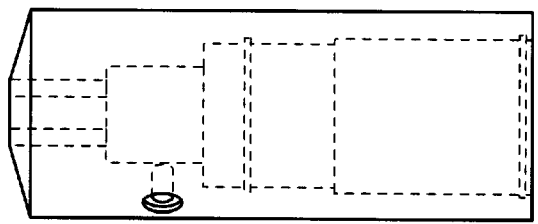
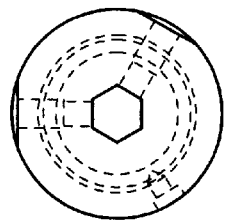
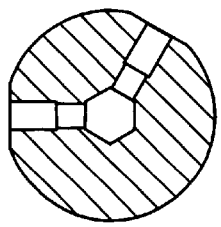
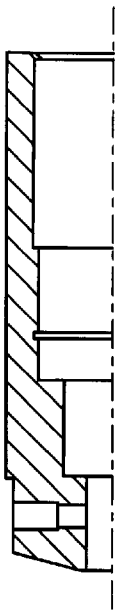

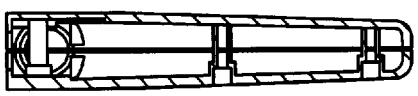
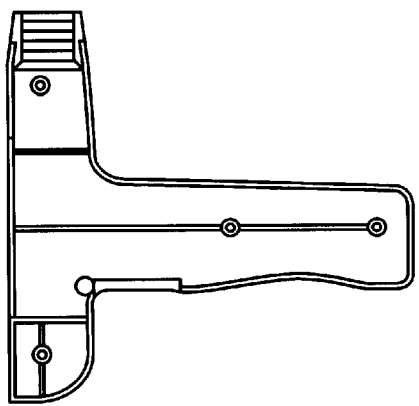
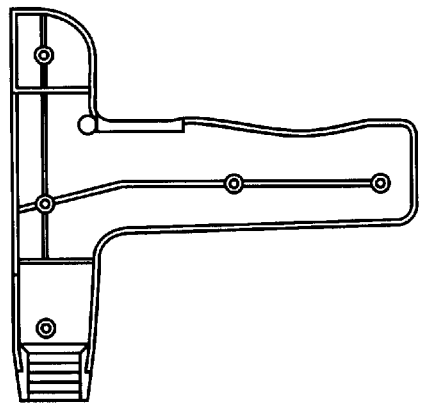
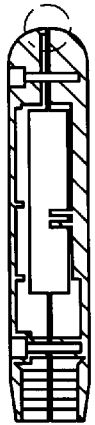
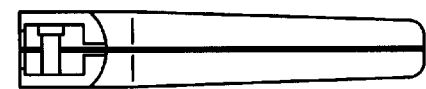

FIG. 96A
FIG. 96B      FIG. 96C
 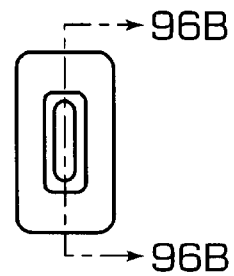
FIG. 96D      FIG. 96E
 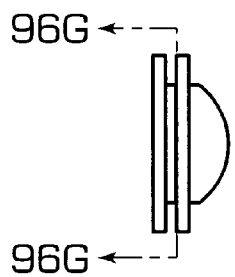
FIG. 96F      FIG. 96G
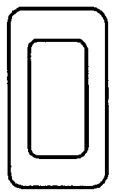 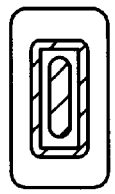

DISPENSING SYSTEM COMPONENTS OF A DISPENSING SYSTEM AND METHOD OF MANUFACTURING OPERATING AND SERVICING A DISPENSING SYSTEM AND COMPONENTS THEREOF

CROSS-REFERENCE TO RELATED APPLICATIONS

This application is a continuation-in-part of PCT/US98/06508 having an International filing date of Apr. 1, 1998, which PCT application is a continuation of U.S. Ser. No. 08/959,460 filed on Oct. 27, 1997 and now U.S. Pat. No. 5,996,848, with the latter application being a continuation-in-part of U.S. Ser. No. 08/903,175 filed on Jul. 30, 1997 and now U.S. Pat. No. 5,964,378.

FIELD OF THE INVENTION

The present invention relates to a dispensing system, components of a dispensing system, and methods of manufacturing, operating and servicing a dispensing system and components thereof. A preferred dispensing system embodiment of the present invention, and related components thereof, pertain to a dispensing system which brings into contact two different fluid products within a chamber, and particularly two different liquids which, when mixed, react to produce a foam product or the like.

BACKGROUND OF THE INVENTION

To help appreciate the significant advances made by the present invention in the field of dispensing and, in particular, the field of foam dispensing, provided below is a discussion of the prior art efforts to provide a dispensing system for use in dispensing a foam such as a polyurethane foam.

FIG. 1 of the present invention schematically illustrates the general set up of a dispensing system for mixing and dispensing two liquids (liquids A and B) such as organic resins and polyisocyanates which react to form a polyurethane foam. As shown in FIG. 1, a chemical "A" supply means 1100 is provided for feeding to the dispensing apparatus 1102 a first chemical such as a liquid organic resin, and a chemical "B" supply means 1104 is provided for feeding to dispensing apparatus 1102 a second chemical such as a polyisocyanate. The organic resin and polyisocyanate are mixed within a mixing chamber of dispensing apparatus 1102 to form polyurethane foam which is discharged from dispensing apparatus 1102.

One particular problem with the dispensing of polyurethane foam of this type is that the organic resin and polyisocyanate react rapidly, and can accumulate over the external and internal surfaces of the dispensing apparatus. Under some mixes, an expansion of about 200 times in volume takes place and the mixed chemicals become very adhesive in nature. Thus, preventing the foam mix from reaching undesirable areas such as the chemical introduction ports and the discharge outlet is difficult. Also, once the foam material reaches a location and cures, it is difficult to remove the residue left as the residue strongly adheres to the underlying surface. A build up of foam residue can result in, for example, the binding, sticking or locking up of components, as well as degradation of the contacting surfaces, particularly when, a plastic, cold flow material such as TEFLON® material is used in the mixing chamber region. The sticking of components due to the build up of foam precursor material also requires an increase in the driving motor output used to reciprocate purge or valve rods associated with many prior art designs. Accordingly, in anticipation of this inevitable build up and increase in motive requirements such dispensers is sized to accommodate this build up in motive force requirement.

The inevitable build up of cured foam in the dispenser over time also results in partial or complete blockage of the chemical inlet ports and passageways which can lead to a change in flow characteristics with respect to chemicals A and B and therefore a change in the chemical A and B input ratio. Even a minor obstruction in an inlet port passageway prevents the output of a precise and consistent amount of foam over time, which, among other problems, presents a significant quality control problem with respect to the resultant foam product. That is, the poor ratio associated with prior art dispensers having chemical inlet or inlets at least partially blocked with cured foam build-up leads to an off-ratio mix and a resultant product not having high quality characteristics. Also, as the amount of build up, and thus the degree of obstruction, varies over time, there is a corresponding variation in the amount of chemical precursor introduced into the mixing chamber and outputted from the dispenser. This, coupled with the change in foam development brought about by the off-ratio foam introduction, leads to significant changes in the amount of foam produced from output to output over time and the aforementioned quality control problems.

The partial or complete blockage of the chemical inlet ports and binding or sticking of components in the dispenser are just some examples of the dispenser's performance being degraded by the build up of foam residue on a surface thereof. Actually, starting from the time of first use, the dispensing operation tends to deteriorate such that frequent dispensing apparatus servicing (e.g., disassembly and cleaning or replacement) is required. For high use operators of the prior art foam dispensers, servicing often takes place on a daily basis, while for even less high volume producers, weekly servicing is not uncommon. Of course, the down time associated with such servicing requirements, as well as the costs associated with such servicing is particularly problematic in the industry. Prior to servicing, however, the inevitable deterioration in operation typically results in a substantial decrease in foam output of the gun for reasons such as those outlined above. A not atypical scenario involves a dispenser dropping from a first cycle output flow rate of 8 to 10 lb./min. mixed foam precursor down to 4 or 5 lb./min. often within a relatively short time frame (e.g., less than 20,000 cycles of use). After running at this reduced capacity, the tenacious nature of the mixed foam precursor material inevitably leads to a complete locking up of the gun or a dispensing ratio that is totally unacceptable.

The prior art, in an effort to prolong the time between servicing, has relied upon complicated systems in an effort to maintain the optimum chemical A and chemical B input ratio despite the inevitable partial and often unequal obstruction of the inlet ports for the chemicals leading into the mixing chamber. For example, complicated pumping and sensing systems have been developed to vary the pumping characteristics of one or the other chemical supply pumps to account for a greater degree of blockage in one port versus the other. In addition to the high costs associated with these complicated prior art pumping and associated control systems, the added complexity can lead to increased chances of a breakdown as well as more difficult operation and higher skilled personnel to monitor the dispensing system. Moreover, this additional equipment can do nothing to help in the internal build up of foam in the dispenser which causes the increased sticking in reciprocating components and the eventual lock up of the dispenser.

FIGS. 2 and 4 illustrate two different prior art dispensing apparatuses which are representative of those being used in this field. The structure and operation of these systems are described below and in further detail in the detailed disclosure portion of the present application to help illustrate the significant advances made by the present invention over the prior art. These dispensing apparatuses are disclosed in U.S. Pat. Nos. 5,211,311 and 3,945,569, respectively, and both of these patents are incorporated herein by reference. Also, reference is made to U.S. Pat. Nos. 4,568,003; 4,469,251; 4,898,327; and 5,090,814 as further illustrating the state of the art and these patents are also incorporated herein by reference. The embodiment shown in FIGS. 2 and 3 is representative of a dispensing apparatus which does not involve the use of a solvent, features a purge rod (as opposed to a valving rod discussed below for the FIG. 4 embodiment) and features valves positioned to allow or disallow the flow of fluid to the mixing chamber through the mixing chamber inlet ports. Accordingly, the FIG. 1 schematic shows the optional inclusion of solvent supply means 1106 by a dashed line representation.

The FIG. 4 system is representative of a dispensing apparatus which uses a reciprocating valving rod to allow for and to disallow the introduction of the chemical precursors into the mixing chamber of the dispensing apparatus. In addition, a pool of solvent is provided through which an intermediate portion of the valving rod reciprocates.

The purge rod and the valving rod in the two above described prior art embodiments are placed in an interference fit or zero tolerance relationship with respect to the mixing chamber's wall encompassing the reciprocating rod. The reason for this is that the dispensing apparatuses are designed to preclude any sort of leakage past the rods and to prevent the possibility of foam material remaining anywhere in the mixing chamber long enough to harden and form an adhered deposit. In an effort to further assure against the hardening of a deposit, solvent utilizing systems such as that shown in FIG. 4 include a recessed area in the interference valving rod which traps a quantity of fluid rearward of its front end to bring the solvent into a particular portion of the mixing chamber prior to the rod being reciprocated back to a dispensing mode position.

As the prior art dispensing apparatuses rely upon a valving rod in an interference fit relationship with the wall defining the mixing chamber or a non-valving purge rod in a similar interference fit relationship, the rod in each case has a relatively high friction coefficient and the motive force required to reciprocate the rod is relatively high. The motive force relied upon in the prior art has typically been a piston/pressurized air (e.g., 100 psi) assembly with the rod being attached at its rear end to the reciprocating piston. An air piston force of 1,000 lbs. is typically involved in moving a piston travelling in a back chamber of the dispenser and a liquid tight seal with respect to the piston chamber.

This relatively high motive force is also present in prior art systems such as that disclosed in U.S. Pat. No. 4,568,003, wherein the reciprocating rod is in an interference relationship with a core or block of Teflon material having a through-hole within which the valving rod reciprocates. Despite the relatively low friction coefficient of Teflon material, the cold flowing core is placed in a high pressure state by enclosing the core in an encompassing housing with a retaining plate held under a relatively large biasing force by a series of Bellville washers. This biasing arrangement therefor maintains, by way of cold flow of the Teflon block, an interference fit between the reciprocating valving rod and surrounding block of Teflon material defining the mixing chamber despite a scraping or wearing away of the Teflon block.

Because of the motive forces involved, the prior art systems such as those described above virtually all have a mixing chamber of about 3/16 of an inch (4.75 mm) in diameter which is generally considered the upper end for most practical applications of the prior art dispensing apparatuses. This is because any attempt to increase the diameter of the mixing chamber leads to a substantial increase in the surface area contact between the reciprocating rod and mixing chamber wall and thus a corresponding substantial increase in the motive force required for reciprocation of the rod. This restriction imposed on the diameter of the mixing chamber presents a serious limitation on the throughput volume of foam that can be dispensed. For example, any attempt to modify a gun such as that shown in FIG. 4 to have a larger discharge outlet would require a significant increase in size in the motive force providing means (particularly in view of the fact that the motive force providing means needs to be built not only large enough to overcome the substantial increase in resistance created by the increased surface area contact between the purging of valving rod with the mixing chamber wall, but also to compensate for the sticking problem discussed above) and housing and a corresponding increase in the weight of the dispenser and housing as to render the design unpractical for many uses, particularly one involving hand held dispensing. FIGS. 2 and 4 are representative of the hand-held or gun dispensing apparatuses used in the art. Examples of non-gun or support structure mounted dispensing apparatus can be seen, for example, in U.S. Pat. Nos. 4,426,023; 4,390,337; and 5,255,847, which are also incorporated herein by reference.

A typical throughput for a prior art system is, in its first few cycles, 8 to 10 lbs./min. on average for a 3/16 inch discharge outlet which produces an exit velocity in the foam being dispensed which is considered the maximum allowable as any increase in velocity produces unacceptable backsplash and splattering. Also, because of the small amount of time between the moment the chemicals A and B make contact and the moment foaming is complete, and even the smaller window of opportunity within which the foam is in a workable state, operators often find it difficult to properly mold the foam (e.g., a bag of foam) about the configuration of an object to be protected. Once the two foam precursors come in contact there is a period within which the mix is in a creamy, not appreciably rising, state. This is short lived, however, because soon the mix begins expanding at an accelerated rate from the cream state to a solid foam body. From the standpoint of conforming a protective foam body about an object to be protected, it is preferable to place the foam while mainly in a cream state within a mold extending about the object to be protected. With many foam mixtures this would be a 6 to 8 second window. However, under the prior art systems, it often takes much of, if not all, that window just to dispense the foam (e.g., a one pound quantity of foam) from the dispenser. If any additional steps are involved, such as removing and positioning a bag of foam in a container containing a product to be protected, the window of opportunity is surpassed. This is especially true with regard to prior art dispensers which are in between an off-the-shelf state and lock up as such dispensers operate at reduced output capacity and thus take a longer period of time to dispense a given quantity of foam material. This problem of low volume dispensing within a given time frame is due largely to the 3/16 inch discharge outlet threshold faced by the prior art systems. While an increase in the velocity of the mixture being dispensed can lessen the time frame between the time the discharge is initiated and terminated for a given volume of foam mix, an increase in velocity leads to the aforementioned problem of an unacceptable amount of backsplash and splatter.

The backsplash of the prior art system is due in part to the high output velocity (e.g., 80 in/sec.) associated with the relatively small passageway diameter of the mixing chamber's output. Backsplash or splatter of reacted chemistry is thus a typical detriment found in prior art dispensing systems because of the above noted diameter, throughput, velocity relationship and limitations. Because reacted chemistry must be effectively directed into the receiving chamber in order to obtain the most efficient associated labor and material performance, a larger diameter, higher throughput, lower velocity relationship is preferable for optimal functionality of the dispensing system. However, because of the above described reasons, the prior art systems have been unable to provide such a dispensing system.

The inability to increase foam output within a given period of time also leads to a decrease in the overall yield of foam produced. As the initially discharged foam begins to expand, the later discharged foam comes in contact with it. This results in a decrease in foam yield as the contact with the subsequently discharged foam prevents optimum expansion of the rising foam mixture.

Another problem which is prevalent in many prior art dispensing systems is the problem of chemical precursor cross-over, while the rod is in parked state. Cross-over occurs due to leakage of chemical precursors around the rod (particularly a valve rod) when in its parked state. As the prior art systems are not designed to allow for flow of chemical precursors between the rod and mixing chamber housing, the cross-over leads to significant problems. If the cross-over does not lead to an immediate locking up of the dispenser, it can lead to further degradation of the system until it either locks up or is otherwise non-functional. Many efforts have been made in the prior art to avoid this problem with U.S. Pat. No. 4,159,079 being representative.

As discussed above, a system using a valving rod, such as the one shown in the prior art dispenser of FIG. 4, is particularly susceptible to premature chemical contact due to the cross-over of the chemicals through leakage between the valve rod and mixing chamber. This problem is lessened in the prior art system shown in FIGS. 2 and 3 which has a separate upstream valve assembly and purge rod in place of a valve rod. However, while lessening of the crossover leakage problem, the upstream positioned valving arrangement presents another problem in that there is added a requirement for synchronizing the opening and closing of the upstream chemical passageway ports for chemicals A and B. For example, because the needle valves in the FIG. 3 prior art depiction are in line with the chemical ports, wear in the seals can lead to one or both sides leading. To compensate for this possibility, the extension of the needle valves can be adjusted in an effort to maintain a constant seal pressure contact for both chemical ports. To provide for synchronized opening and closing of both ports despite variations over time in the dispenser's features (e.g., seal wear), adjustable yoke assembly 837 is provided in the FIG. 2 and 3 embodiment. The fine tuning of the yoke assembly required by an operator to achieve synchronized chemical inlet opening and closing represents an additional problem in prior art dispensing devices.

Another particularly problematic area in these prior art dispensing apparatuses is found at the outlet tip of the dispensing apparatus. Whether due to backsplash, internal leakage or leftover deposits, there is a tendency for the prior art dispensing apparatus to have the valving or purge rod lock up at the end portion of the dispensing apparatus or to have the dispenser's port become blocked. Various methods have been developed in the art to avoid this problem such as a grinding of the tip (requires a hardening of the material forming the tip) or applying solvent at the tip through a separate line and solvent supply assembly joined to the tip. An example of providing a solvent to the tip of a dispensing apparatus is found in U.S. Pat. No. 4,426,003, which features a cap-like structure with multiple solvent ports mounted in the tip region of the dispensing apparatus and U.S. Pat. No. 4,898,327, which features a porous tip permeable to solvent.

The prior art dispensing apparatuses are also difficult to service due, for example, to the complexity of their designs, the large number of components involved, the deterioration of components, sticking and jamming, the high force needed to remove the purge or valve rod, and difficulty in accessing the various components. For example, even with the appropriate tools, it is often very difficult to separate the rod from the mixing chamber due to the adhesive quality of the foam precursor build up. Also, the chemical inlet ports are very difficult to clean due to their small diameter (drilling out of deposits often being involved). The cleaning of the ports can also lead to changes between the diameter of the chemical A and B ports and a resultant off-ratio mix. The prior art dispensing apparatuses also often have a relatively short halflife of 20,000 cycles or so between servicing or replacement requirements. The problems associated with the prior art and the difficulty involved in servicing such systems often results in disposal rather than a continued effort to keep using the prior art dispensing apparatuses.

SUMMARY OF THE INVENTION

The present invention is directed at avoiding the above-noted problems plaguing the industry, as well as numerous other problems, and, in so doing, the present invention also avoids the trend in the industry to rely upon complicated and expensive devices in an effort to counteract the inevitable problems that occur in the difficult environment associated with rapid reactions (e.g., polyurethane reactions) occurring within foam dispensing devices. As will also be made clearer below, among other advantages, the structure of the present invention provides:

(1) A dispensing system that has an extremely high ratio of foam throughput with respect to the force required to reciprocate a purging rod;

(2) A dispensing system that is designed to consistently maintain, from cycle to cycle, over its life all pertinent surfaces, including, among others, the chemical inlet ports leading to the mixing chamber, the mixing chamber itself, and the dispensers outlet tip, wetted with solvent such that there is no degrading build up or foam in the dispensing system;

(3) A dispensing system that puts out a precise and consistent amount of high quality foam over time due in part to the avoidance of any chemical inlet port obstruction (which obstruction creates an off-ratio chemical supply situation in the prior art), and the avoidance of any degrading foam precursor build up in general;

(4) A dispensing system which, due in large part to (1) above and the corresponding ability to utilize essentially any size mixing chamber, can provide a large volume output per dispensing cycle at a sufficiently low enough velocity as not to present a backsplash or splatter problem;

(5) A dispensing system which, because of its high throughput in a short period of time, provides greater time for an operator to place in the desired position the foam mix before too much solidification has occurred.

(6) A dispensing system which, despite the maintenance of all pertinent surfaces wetted with solvent and free of build up, is able to utilize a relatively small quantity of solvent;

(7) A dispensing system which provides an upstream chemical inlet ports shuttle valve assembly which, despite its low number of relative components, provides a highly effective seal function that is not easily susceptible to failure and provides consistent and accurate opening and closing of the chemical inlet ports without the need for a synchronizing assembly;

(8) A dispensing system that provides an A and B chemical pumping and transfer assembly that, despite its relatively low number of components and cost, is able to provide immediately upon demand and in a consistent fashion the desired amount of foam at the desired pressure and temperature to the chemical inlet ports;

(9) A dispensing system that properly positions and presents a receptacle for filling with little loss of time in operator manipulation; and

(10) A dispensing system that has low servicing requirements and, if services is required, is extremely easy to service due in part to the ease in which the relative components can be disassembled including the purge rod with respect to the mixing chamber.

Many of the advantages provided by the present invention, are related, at least to some extent, in the establishment of a clearance or non-interference fit relationship between the reciprocating purge rod and the mixing chamber, and the presence of a flushing solvent flow in the clearance space provided between the wall defining the mixing chamber (or walls, if a non-cylindrical purge rod is involved) and the purge rod itself.

As discussed above, in the prior art systems using a valving rod an interference fit is provided between the valve rod and mixing chamber in an effort to avoid leakage of foam precursor along the valve rod when the valve rod is in a chemical port blocking position. In the prior art systems utilizing a purge rod and an upstream chemical valve assembly, an interference fit is also relied upon to avoid seepage of foam precursor behind the purge rod during its forward, purging travel and also to provide a mixing chamber wall scraping function. As also discussed above, this interference fit requires a large motive force even before taking into consideration the inevitable subsequent sticking problems and also prevents an increase in foam throughput per given time because an increase in diameter in the mixing chamber results in a substantial increase in the motive force required for reciprocation.

The present invention takes a radically different approach in its use of a non-interference fit purge rod that is wetted with solvent over its entire length received by the mixing chamber and which allows for a solvent flow along and past the free end of reciprocating purge rod. This relationship is particularly advantageous in that it allows for the first time a dispensing apparatus that can provide an extremely high ratio of throughput with respect to the force required to reciprocate a purging rod. Under the present invention, the only resistance to the purge rod reciprocation is found in the relatively negligible fluid/solid surface resistance between the reciprocating rod and the fluid solvent boundary layer between the rod and mixing chamber wall and, with respect to a preferred embodiment of the invention, an extremely small frictional resistance between chemical input shuttle valve seals positioned within the interference gap. Because of the extremely low resistance against purge rod reciprocation under the arrangement of the present invention, the previous insurmountable barrier to increasing foam mix throughput at a reasonable motive force and velocity has now been overcome. That is, under the present invention, because the purge rod reciprocation resistance is so low, the mixing chamber diameter can be drastically increased without a problem with respect to the motive force required. That is, for the same throughput velocity and driving motor size as a prior art dispensing apparatus for a 3/16 inch mixing chamber diameter, the present invention can easily have double the mixing chamber diameter, i.e., a 3/8 diameter mixing chamber and can also even easily provide larger sized diameters without complication. The ability to easily increase the mixing chamber's volume through an increase in diameter corresponds to a drastic increase in throughput capability in the dispenser. As an example, the increase from the prior art's 3/16 inch to a 3/8 inch diameter mixing chamber essentially doubles the throughput of the dispenser (e.g., 8 lb./min. to 14 or 15 lb./min). Also, because of the drastic reduction in motive force requirements under the arrangement of the present invention and because a further increase in diameter in the mixing chamber does not appreciably increase the motive force requirements (only a relatively negligible seal friction increase due to an increase in diameter to encompass a larger chemical inlet port and a negligible liquid/surface resistance increase due to the increased mixing chamber area), the diameter or cross-section size of the present invention's mixing chamber can be scaled to essentially any desired size.

Further, the presence of a clearance space between the reciprocating rod and mixing chamber wall (right out to and past the mixing chamber dispensing tip) provides for additional advantages in the present invention including an increased ability to direct a flow of solvent (from a single source) to areas not previously accessible to a solvent. For example, under the arrangement of the present invention, all surfaces of the dispenser that might be susceptible to foam contact are flushed and maintained with a solvent. For example, under the solvent supply arrangement of the present invention, the solvent wets and flushes the rod (including its front end tip), the mixing chamber, the chemical inlet ports, the exterior of the seals, the exterior of the mixing chamber and even interior and exterior portions of the housing, among other components, with each solvent cycle. The providing of an intermediate recess in the purge rod wherein a pool of solvent can form further improves the capability of maintaining a sufficient supply of solvent to maintain all pertinent surfaces in the dispenser wetted with solvent, especially between periods of non-use.

Thus, in the present invention, the solvent throughput provides solvent contact over 100% of the mixing chamber and the purge rod received therein (e.g., the solvent contacts the purge rod from an initial contact point forward all the way to the tip which is over 90% of the purge rod length and all of the length of the mixing chamber in the referred embodiment of the invention).

Because under a preferred arrangement of the present invention, the solvent is free to flow through the chemical inlet ports, and down to and past the tip, the solvent can reach the tip by way of an external solvent flow stream passing along the exterior of the mixing chamber and also by an internal flow passage of solvent between the rod and mixing chamber down past the tip end of the rod preferably in a slow dripping arrangement. This avoids having to rely on a tip attachment and complicated solvent feed system relied upon in many prior art systems. Also, with a suitable control, the flow of solvent along the reciprocating rod can be initiated at any time as it is unrelated to the reciprocating rod's position. For instance, the solvent can be supplied before, during and/or after the introduction of the precursor chemicals. As discussed above, the solvent supply and amount of flushing out flow should, however, be controlled to achieve an initial wetting and a maintenance of all pertinent surfaces wetted with solvent. Also, during extended down times, the flow can be initiated for a suitable length of time during non-operation. For example, during an extended factory shutdown a timed release of the solvent flow can be initiated and repeated automatically after a certain period of non-use to avoid binding of the dispenser because of internal seepage of the precursor chemicals or the like.

Because the solvent flows through the chemical inlet ports in the mixing chamber under the arrangement of the present invention, those ports are maintained clear of obstruction. Further, since the non-interference clearance space between the purge rod and mixing chamber wall is also continuously flushed with a solvent any build up of foam precursor is prevented. This means that, unlike the prior art dispensers, the present invention provides a consistent output every time it operates and can provide a motive force that does not need to account for increased requirements over time due to sticking. For example, as discussed above, under the prior art dispensers there was an inevitable build up of foam in the inlet ports which not only obstructed the ports but caused off-ratio situations in chemical feed to the mixing chamber. This led to a continuous decrease in throughput of the dispenser from the time of initial use to failure (e.g., 8 to 10 lb./min. down to 4 or 5 lb./min. well within 100,000 cycles). The arrangement of the present invention is such that it is possible in the present invention to have the same foam mix output parameters and motive force requirement after 20,000 reciprocating rod cycles and even at and well after 100,000 cycles. This consistency in operation over an extremely extended period of use is a feature not attainable in the prior art systems such as those described above.

In addition to the advantageous consistent operation from cycle to cycle over an extended number of uses, the complete solvent flushing provided in the present invention as well as the other features of the present invention, including the non-interference arrangement of the present invention, provides a dispenser with an average life that is able to far succeed the life of the prior art dispensers such as those discussed above. In essence, the life of the prior art dispensers was mainly determined by the time it took for the gun to succumb to the effects of foam build up and, to a lesser extent, the actual failure of a component. Under the present invention the dispenser is not subjected to the problems in the prior art concerning foam precursor build up and, with the arrangement and materials preferred for the structure of the present invention, even component failure in the dispenser is not often a problem which results in a dispenser apparatus which has an extremely long life.

Even when a repair is needed or a scheduled servicing is performed, the design of the present invention is such that the repair or servicing can be easily performed with minimal effort and tool requirements. For instance, since all surfaces possibly susceptible to mixed foam precursor contact are subject to a flushing solvent flow, the detachment problems associated with a rod or other dispenser component locked in place due to a buildup of the highly adhesive mixed foam precursor is not present in the present invention. In addition, as will be made clearer below the design, relatively small number of components and arrangement of those components in the present invention also leads itself to easy disassembly, servicing and reassembly.

The present invention also features a durable and efficient chemical supply pump assembly which is used to pump a chemical from a supply source, through a heated conduit to a dispensing apparatus. Because of the flushing of the chemical inlet ports made possible by the solvent flow passageway system of the present invention, unequal obstruction of the chemical inlet ports is avoided. Accordingly, the complicated, and expensive equipment relied upon in an effort to equalize chemical port output between the obstructed ports is not required under the design of the present invention.

Therefore, a preferred pump assembly of the present invention features a brushless, AC motor driving unit which, rather than being continuously run, is intermittently run, on demand, to provide a pulsating pump driven in conjunction with the triggering or switching on of the dispensing apparatus and discontinues running upon the release of that switch or upon a programmed time interval passing. The AC motor drives a torque pump (e.g., a gerotor pump) which features a driving gear driven by a shaft connected to the AC motor with the driving gear having one less tooth than a surrounding driven gear so as to provide a fluid collecting pocket therebetween which varies in volume from a maximum volume, low pressure state to a minimum volume, high pressure state at the time of reaching an outlet of the pump housing wherein the high pressure, compressed volume of liquid between the teeth is released. The speed of the AC motor and hence the speed of rotation in the driving shaft and gear determines the output of liquid chemical to the heated conduit and eventually to the mixing chamber. This pump arrangement is highly responsive and highly consistent in its output every time a chemical feed demand signal is received by the pressing of a dispenser trigger of the like. The pump is preferably driven to provide a 150 psi pressure in the chemical liquid being fed to the mixing chamber via a heated conduit. The pump assembly of the present invention is therefore well-suited for rapidly providing the desired dispensing, preset flow pressure desired for use in the present invention (e.g., 100 to 300 psi) and avoids the problem of substantial pressure drops between demand which was a significant problem in prior art pulsating piston pumps due to the fluctuations in pressure leading to the inputted chemicals A and B going off-ratio. Further, the pump assembly of the present invention is much less expensive than the continuous pump systems with control systems relied upon in the prior art and yet is very effective in providing the proper ratio of chemicals to the mixing chamber, particularly when used in conjunction with the above-described dispensing apparatus which maintains the injection ports particularly clean.

The present invention also features an advantageous chemical inlet valving operation which utilizes a shuttle valve seal system supported by a dispenser housing and placed in contact with an external surface or surfaces of a reciprocating mixing chamber member across a preferably non-interference fit spacing between the housing and mixing chamber member. The seals of the shuttle valve system seal off the outlet end of the chemical passageways extending through the housing by providing a sealed enclosure at the outlet end of the housing passageway. This sealed enclosure is achieved by the encircling nature of the seal around the housing passageway outlet opening and the seal's contact with an exterior wall of the mixing chamber member. The mixing chamber member has chemical inlet passageways which extend from an inlet that opens out on the exterior surface of the mixing chamber member to an outlet that opens into the mixing chamber itself. The chemical inlet passageways in the mixing chamber lie on a common vertical line with the internal center of the surrounding shuttle valve seal. Thus, when the mixing chamber member is shifted along its central axis (e.g., vertically) from a parked, non-dispensing mode position to a dispensing mode position under the preferred dispensing apparatus arrangement, the chemical inlet passageways in the mixing chamber align or essentially align with the chemical passageways in the housing. The shuttle valve's seals encircle the aligned passageways across the non-interference fit spacing between the mixing chamber member's exterior surface and the housing's interior surface and are squeezed between those two surfaces, so as to preclude leakage of chemical material between the interior of the housing and exterior surface of the mixing chamber.

When the mixing chamber member is shifted to its non-dispensing state, a non-opened or solid portion of the exterior surface of the mixing chamber member is placed across from the housing's passageways so as to seal off those passageways. In one embodiment of the invention, an elastomeric seal is sized so as to be of a sufficient enough thickness so as to be sufficiently squeezed between the two surfaces to provide the sealing function. In an alternate, more preferred, embodiment seals of a plastic material such as Teflon® material are utilized in the same location as the other seals, while, to ensure sufficient sealing contact, a biasing device such as a spring biased rod with sliding cap is supported by the housing to push the rod into contact with the seals with a force of 30 to 50 lbf., for example.

Under this system, the shuttle valve system acts to automatically open and close off the chemical inlet passageways in the mixing chamber member simply through the sliding action of the mixing chamber member. This allows for a significant decrease in the complexity of the valving operation while still providing an upstream valve location with its associated benefits such as allowing for the non-interference fit relationship discussed above and the avoidance of synchronizing problems such as those discussed above with respect to the valving system in FIG. 3. In addition, as will become clearer below, the shuttle valve system of the present invention helps in the providing of a fail-safe shutdown of the system.

The present invention's heated conduit assembly heats the precursors as they travel from the pump to the dispensing apparatus. A heating system is provided with a thermistor or thermostat to monitor the temperature of the precursors heated by an embedded heat resistor or some other means of heating. The heating system preferably features a programmable controlling device which takes into account sensed or presented data as to the heating conduit's present state and the desired state, and makes the appropriate adjustments in the event of any deviation from the desired parameters. These sensed parameters preferably include specific heat, chemical throughput and length of dispensing cycle.

The present invention also features a stand supported dispensing unit with a unique bag supply assembly and bag opening maintenance means. The bag supply assembly features a stack of bags held along their upper, to-be-opened end by a support assembly. The support assembly can take the form of, for example, a pair of spaced support rods or wickets upon which the bags slide and which have a common support member that can be hung or fastened to the support stand. The support assembly thus includes attachment means for attaching the bags to a support stand supporting a dispensing apparatus above the bags. Releasable coupling means are also preferably provided for opening a replacement bag upon the removal of a bag from the support assembly. The releasable coupling means can include, for example, an adhesive patch coupling, an integrated fold arrangement, etc. The mechanical interrelationship between bags in sequence ensures that upon removal of a first bag in the sequence a second bag is moved into a filling position in an open state. In this way, an open bag is always present below the dispenser to catch the solvent drips being released by the dispensing apparatus thereabove and to catch the foam during foam dispensing. A blower motor with manifold or a pair of blowers which direct air through a pair of air guides can be utilized in place of the releasable coupling means or in association with the coupling means. The air exiting the air guides helps to open and maintain open the bag once the operator starts the process and ensures that the bag does not collapse, while the chemical mixture starts flowing out of the dispensing apparatus into the open bag below. The operator can then quickly and easily detach the bag and move it to the desired location before the liquid mixture has a chance to significantly change from a liquid to a solid foam body.

A preferred embodiment of the present invention features a mixing chamber assembly having a mixing chamber member that includes an interior mixing chamber and a pair of fluid ports which open into the mixing chamber. The mixing chamber member further includes a same diameter discharge outlet for dispensing fluid received within the mixing chamber. A rod is received within the mixing chamber, and the rod is designed, with respect to the mixing chamber, to provide a solvent passageway between the mixing chamber and an exterior surface of a first, free end of the rod received within the mixing chamber such that solvent is free to flow out past the first end of the rod. Thus, from the time of initial assembly, the first end of the rod includes a tip portion and a section rearward of the tip portion which are each in a non-interference fit relationship with respect to a wall surface of the mixing chamber to provide the noted solvent passageway as well as a low friction fluid interface between the rod and the wall defining the mixing chamber. The non-interference fit relationship includes a spacing, as of the time of initial manufacture, of 0.0005 to 0.05 of an inch, or more preferably, 0.001 to 0.003 of an inch with 0.002 and 0.003 of an inch being values particularly suited for the purposes of the present invention. The mixing chamber is preferably cylindrical in shape and the rod has a circular cross-section which is concentrically arranged at the aforementioned spacing within the cylindrically shaped mixing chamber.

The mixing chamber member has a longitudinal length with a through-hole passing from a non-discharge end, through an intermediate portion, and to a discharge end of the mixing chamber member. A forwardmost portion of the through-hole at the discharge end defines the discharge outlet, and the fluid ports extend through the intermediate portion of the mixing chamber member and into the mixing chamber upstream from the discharge outlet. In a preferred embodiment, the purge rod has an upstream section and a tip portion separated by a recessed section, and, when the upstream section is positioned adjacent the fluid inlet ports, the tip section has a forwardmost end commensurate or essentially commensurate with the discharge end of the mixing chamber member and the recessed section falls downstream from the fluid inlet ports so as to fall between the inlet ports and the discharge end. In this way, a significant percentage of solvent flows through the mixing chamber's inlet ports to maintain those ports free of obstruction.

In a preferred embodiment, the motive force used to shift the rod between a parked (non-dispensing mode position) and a dispensing mode position is provided by a piston member attached to the rod at a second end of the rod opposite to the first, free end of the rod. This piston member is subjected to air pressure manipulation introduced into a piston chamber formed in the dispenser housing's back end.

The dispenser housing has a dispensing end and a reception chamber formed in the dispenser housing. The mixing chamber member is received within the reception chamber of the dispenser housing, and the fluid passageways or ports open into the mixing chamber which has a discharge outlet for discharging the mixed fluid. The means for reciprocating the rod positioned within the mixing chamber between a fluid dispense mode position and a fluid non-dispense mode position can easily reciprocate the rod since the rod is in a non-interference relationship with respect to said mixing chamber by way of the solvent flow passageway formed between the rod and the mixing chamber. The means for supplying solvent to said solvent flow passageway results in the solvent flowing along the rod and the formation of a solvent fluid layer between the rod and the mixing chamber so as to provide for non-interference reciprocation of said rod within said mixing chamber between said fluid dispense and non-fluid dispense mode positions.

The dispensing apparatus also further preferably includes reciprocating means to reciprocate the mixing chamber member within the reception chamber of the dispenser housing between a fluid dispensing state position and a non-dispensing state position. The means for shifting the rod and the means for reciprocating the mixing chamber member cause the rod to assume the fluid dispense mode position prior to the mixing chamber member assuming the fluid dispensing state position and cause the mixing chamber member to return from the fluid dispensing state position to the fluid non-dispensing state position prior to the rod returning from the fluid dispense mode position to the fluid non-dispense mode position. The reciprocating means also preferably includes a biasing member to bias the mixing chamber member into the non-dispensing state position which provides a fail safe feature in the invention.

When the shifting means includes a piston member attached to the rod, the reciprocating means preferably includes a pressurized gas contact surface provided at a rear end of the mixing chamber member, with each of the shifting and reciprocating means sharing a common pressurized gas supply system having at least one gas supply port which is formed in the dispenser housing and opens out between said piston and the pressurized gas contact surface.

In a preferred embodiment, the mixing chamber member and the dispenser housing are dimensioned and arranged such that solvent supplied by the solvent flow supply means passes simultaneously along the solvent flow passageway formed between the mixing chamber member and purge rod, through the fluid ports or passageways in the mixing chamber member and between an exterior portion of the mixing chamber member and a wall of the dispenser housing defining the reception chamber receiving the mixing chamber member. The dispenser housing also has at least one through-hole in fluid communication with the solvent flow passageway such that solvent is free to flow along an exterior surface of the dispenser housing. A recess in the rod and/or in a section of the housings reception chamber is also preferably provided to help maintain all surfaces wet with solvent, particularly during extended down times.

Thus, one preferred embodiment of the dispensing apparatus for mixing and dispensing a plurality of liquids features a dispenser housing having a dispensing end and a reception chamber formed in the dispenser housing. A mixing chamber member received within the reception chamber of the dispenser housing, and having a mixing chamber formed therein, fluid passageways opening into the miting chamber, and a discharge outlet for discharging mixed fluid. The mixing chamber member is slidably received within the reception chamber so as to be shiftable between a dispensing mode and a non-dispensing mode. A preferred embodiment of the dispensing apparatus further comprises a shuttle valve system that preferably comprises seals positioned on the dispenser housing so as to seal off the first and second fluid conduits in the dispenser housing and so as to contact the mixing chamber member both when in the dispensing and non-dispensing mode, and wherein the fluid passageways in the mixing chamber member are in fluid communication with the fluid conduits and sealed off by surrounding shuttle valve seals when the mixing chamber member is in the dispensing mode. Preferably, the shuttle valve seals are represented by elastomeric O-ring or plastic annular seals, such as Teflon seals, which are seated in seal seats formed in at least one interior surface of the dispenser housing. The use of a Teflon annular seal is preferred from the standpoint of long-life and low friction contact. To accommodate for the lower compressibility of such seals, the present invention also preferably feature a seal contact enhancing device that includes a spring biased push rod that has a contact cap which pushes against a side portion of the mixing chamber which is away from the shuttle valve seals (e.g., 120° spacing) to compress those seals between the purge rod and housing.

The means for shifting the purge rod end positioned within the mixing chamber between a fluid dispense mode position and a fluid non-dispense mode position is not dependent upon the structure representing the reciprocating means for the mixing chamber and therefore the sequence of placement of the rod and mixing chamber can be carried out at different times. It is preferable, however, to have a common pressurized air source for placing both the mixing chamber member and purge rod in a dispensing mode, although the timing of each can be different.

A preferred embodiment of the solvent supply system includes a solvent supply passageway formed between an exterior of the purge rod and the mixing chamber for providing solvent to the discharge port of the mixing chamber, and a solvent supply channel that extends between an exterior of the mixing chamber and the dispenser housing to further provide solvent to a region of the dispenser housing proximate to the discharge outlet. The solvent supply passageway and supply channel are preferably in fluid communication through the chemical inlet ports when the mixing chamber member is in the non-dispensing parked mode. In this way, the chemical inlet ports are flushed with solvent between periods when the chemical precursors are flowing therethrough. As noted above, this flushing of the ports is an advantageous feature of the present invention with respect to prior art systems which typically required periodic drilling or the insertion of cleaning tools into the ports.

The rod is preferably in a non-interference fit over the entire exterior portion of the rod received within the mixing chamber such that the solvent supply passageway is uninterrupted over that entire portion received within the mixing chamber, and the solvent supply means for supplying a solvent to the solvent supply system provides a solvent fluid interface between all exterior portions of the rod received within the mixing chamber. A suitable solvent for use in the system is CARBITOL™ solvent which is available from Union Carbide Corp. Other ingredients can also be included in the solvent flow including a viscosity increasing ingredient or ingredients, lubricant(s) and/or an emulsifier to help suspend the ingredients in the combination.

The present invention also features a dispensing apparatus which includes a mixing chamber member with mixing chamber and inlet ports for receiving mutually reactive chemicals, with the mixing chamber member having a discharge outlet through which mixed chemicals are discharged. A dispensing apparatus support such as a stand is provided to support the dispensing apparatus. In the system, a bag dispensing assembly, preferably supported by the same stand, is positioned below the dispensing apparatus and has means for automatically opening and positioning below the dispensing apparatus a next in succession bag upon removal of a filled bag. The automatic bag opening system is particularly useful for a solvent supply system such as that of the present invention which features a flow of solvent that drips out of the discharge end as it can drip into an opened bag below. The means for automatically opening the next in line bag can include, for example, an adhesive tab affixing a pair of bags in sequence.

A dispensing system of the present invention also preferably feature chemical A and chemical B fluid supply means, which includes torsional supply pumps that are pumps that supply fluid in a non-continuous, on demand manner. A suitable pump for the purposes of the present invention is a gerotor pump with a rotating shaft and one or more (e.g., two) pairs of driving and driven gerotor gear combinations. The pump is preferably driven by an intermittently run AC motor. The motor forces the chemicals through respective heated conduits having an embedded heat resister with thermistor or thermostat temperature monitoring device, as well as a control unit for adjusting temperature in the flowing chemical to output into the mixing chamber at the desired temperature.

A preferred dispensing system is further made up of a dispenser housing a mixing chamber member which defines the mixing chamber and is free to shift within the dispenser housing and a purge rod, which is received within the mixing chamber in a non-interference fashion, as well as solvent supply means for supplying solvent to the dispensing apparatus so that the solvent flows past the purge rod on an exterior of the purge rod and out the discharge outlet in at least a dripping state. With such an arrangement, the mixing chamber is provided with a discharge outlet having a diameter of, for example, 0.5 of an inch which is well above the 3/16 inch standard diameter used in the art.

The solvent used in the present invention is either a solvent alone such as the aforementioned CARBITOL™ solvent or a combination of ingredients which includes a main solvent ingredient designed for removing or preventing foam residue build up as well as flow control particles and/or viscosity increasing additives mixed in with the main solvent ingredient.

The present invention is also directed at a method of assembling a mixing chamber assembly comprising inserting a purge rod within a mixing chamber defined by the mixing chamber member with the purge rod being dimensioned to be in a non-interference fit relationship such that a solvent fluid passageway is formed between all exterior portions of the rod received within the mixing chamber and the mixing chamber.

The invention also features a method of manufacturing a mixing chamber assembly wherein the rod and the mixing chamber are assembled so as to have a solvent flow spacing which is sufficiently large enough to allow for a solvent fluid film formation between all exterior portions of the rod received by the mixing chamber. If the solvent is a combination solvent material with flow control particles, the particles are sized to pass the tip as well, but with a certain degree of friction to help avoid too rapid a flow out of the end.

The invention also features a method of assembling a foam dispenser apparatus that comprises positioning a mixing chamber member within a reciprocation chamber of a dispenser housing, positioning a mixing chamber biasing member into contact with the mixing chamber member to bias the mixing chamber into a first of at least two reciprocation positions assumable by the mixing chamber member within the reciprocation chamber, and inserting a purge rod into a mixing chamber defined by the mixing chamber member. A piston can also be attached to the rod prior to insertion of the rod into the mixing chamber and the piston is inserted into a piston chamber defined by the dispenser housing. Shuttle valve seals are also preferably inserted between an exterior surface of the mixing chamber member and an interior surface of the reciprocation chamber of the dispenser housing. The shuttle valve seals, when in position and when the mixing chamber member is in a second of the at least two positions assumable, surround chemical precursor inlet ports formed in the dispenser housing and in the mixing chamber member, and when the mixing chamber member is in the first position the chemical precursor inlet ports of the dispenser housing are sealed off from fluid communication with the inlet ports of the mixing chamber member.

The solvent is supplied to a solvent flow passageway which extends between the mixing chamber member and an exterior surface of the rod so as to form a fluid film over all exterior portions of the rod received within the mixing chamber and also, preferably, to a solvent flow channel formed between the mixing chamber and the dispenser housing and which channel is in fluid communication with the solvent flow passageway via the chemical inlet ports formed in the mixing chamber member.

The advantageous aspects of the invention will be more fully appreciated from the following description, particularly when considered in conjunction with the attached drawings, wherein:

BRIEF DESCRIPTION OF THE DRAWINGS

FIG. 9 shows a rear elevational view of the housing of FIG. 8;

FIG. 10 shows a cross-sectional view taken along cross-section line X—X in FIG. 9;

FIG. 11 shows a side-elevational view of the housing in FIG. 9 with the interior chambers being represented by dashed lines;

FIG. 12 shows a plan view of the dispensing end of the housing in FIG. 11;

FIG. 13 shows an elevational view of the mixing chamber member of the present invention;

FIG. 14 shows a plan view of the dispensing end of the mixing chamber of FIG. 13;

FIG. 15 shows a cross-sectional view of the mixing chamber member in FIG. 13 along cross-section line XV—XV;

FIG. 16 shows a bottom plan view of the spring retainer shown in the exploded view of FIG. 7;

FIG. 17 shows a cross-sectional view taken along cross-section line XVII—XVII in FIG. 16;

FIG. 18 shows a plan view of the housing end cap shown in the exploded view of FIG. 7;

FIG. 19 shows the periphery of the end cap shown in FIG. 18;

FIG. 20 illustrates the purge rod shown in FIG. 7 except in a detached state from the purge rod piston described below with respect to FIG. 22;

FIG. 21 shows a close-up, cross-sectional view of the dispensing end of the purge rod;

FIG. 22 shows a plan view of the purge rod piston shown attached to the purge rod in the exploded view of FIG. 7;

FIG. 23 shows the periphery of the piston shown in FIG. 22;

FIG. 28A illustrates in cut-away a view similar to the dispensing end of the apparatus in FIG. 28 with the added inclusion of a flow control substance in the solvent material;

FIG. 29A shows a flow chart of one preferred sequence in steps for carrying out a dispensing operation in the present application;

FIG. 32 shows a side-elevational view of a dispensing assembly in the form of a gun dispenser;

FIG. 33 shows a front elevational view of a support stand suitable for use in a dispensing system like that shown in FIG. 5;

FIG. 34 shows a right side elevational view of the support stand in FIG. 33;

FIG. 38A shows an alternate bag supply assembly;

FIG. 38B shows still another bag supply assembly embodiment;

FIG. 39 shows a front elevational view of a blower guide;

FIG. 40 shows a side elevational view of that which is shown in FIG. 39;

FIG. 41 shows a top plan view of the support stand in FIG. 33 with a solvent supply container support position provided in a reception area of the support stand;

FIG. 42 shows a rear elevational view of that which is shown in FIG. 41 with added solvent and air pressure conduits shown in cut-away;

FIG. 64 shows an elevational view of the main body of the embodiment of FIG. 60 with the interior chambers shown in dashed lines;

FIG. 65 shows an elevational view of the main body of the embodiment of FIG. 60;

FIG. 66 shows a cross-sectional view taken along cross-section line B—B in FIG. 67;

FIG. 67 shows a top plan view of that which is shown in FIG. 64;

FIG. 68 shows a cross-sectional view at the level of cross-section line A—A in FIG. 66;

FIGS. 78–80 show an elevational view and opposite end views of the manifold retainer used in the embodiment of FIG. 59;

FIG. 81 shows the manifold of the FIG. 59 embodiment with the interior chambers shown in dashed lines;

FIG. 82 shows a cross-sectional view of that which is shown in FIG. 81;

FIG. 83 shows an end view of that which is shown in FIG. 81; and

FIG. 84 shows a bottom plan view of that which is shown in FIG. 81.

FIGS. 86A and 86B show another embodiment of the invention.

FIG. 90 shows a plurality of views of the embodiment in FIGS. 85A and 85B.

FIGS 92–96 show detailed illustration of various components of the hand dispenser handle and internal components.

DETAILED DESCRIPTION OF THE DRAWINGS

Figure 1:
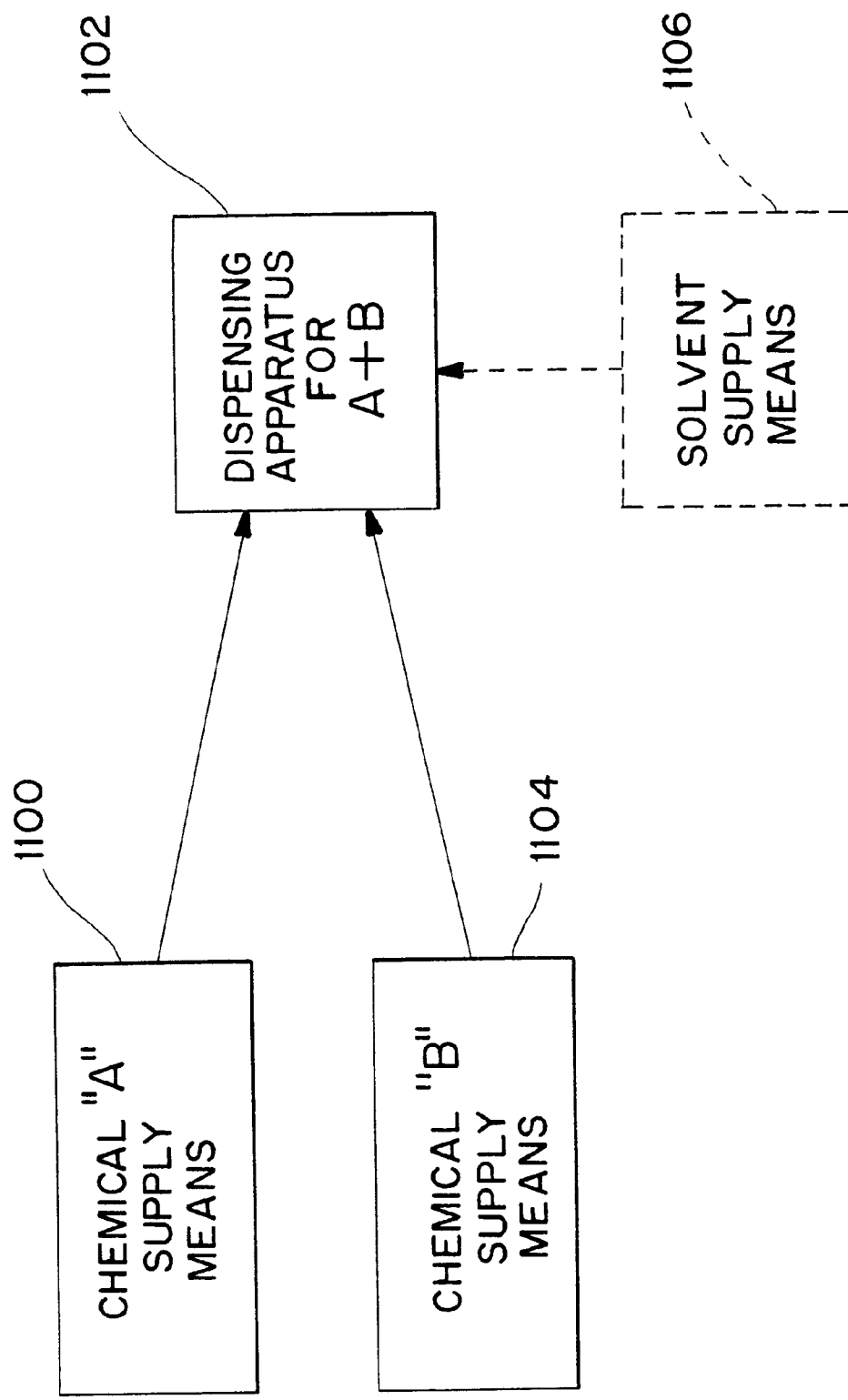
FIG. 1 shows a schematic illustration of a dispensing system.

FIG. 1 shows a schematic illustration of the general layout for a dispensing system for two chemical components such as a mutually reactive organic resin and polyisocyanate used in the production of polyurethane foam. As shown in FIG. 1, Chemical A and Chemical B supply means (1100, 1104) supply chemicals A and B into mixing and dispensing apparatus 1102. Within mixing and dispensing apparatus 1102, the two mutually reactive chemicals mix and are dispensed for use in, for example, protective packing. Also shown in FIG. 1 is solvent supply means 1106 in communication with the dispensing apparatus. As discussed in greater detail below, the solvent supply means 1106 supplies a suitable solvent to the dispensing apparatus in an effort to avoid the accumulation of a product or residue of the mutually reactive chemicals within the dispensing apparatus 1102 or on the dispensing apparatus 1102. The solvent supply means 1106 is shown in dashed lines in view of the fact that some systems utilized in the prior art are solvent-less.

Figure 2:
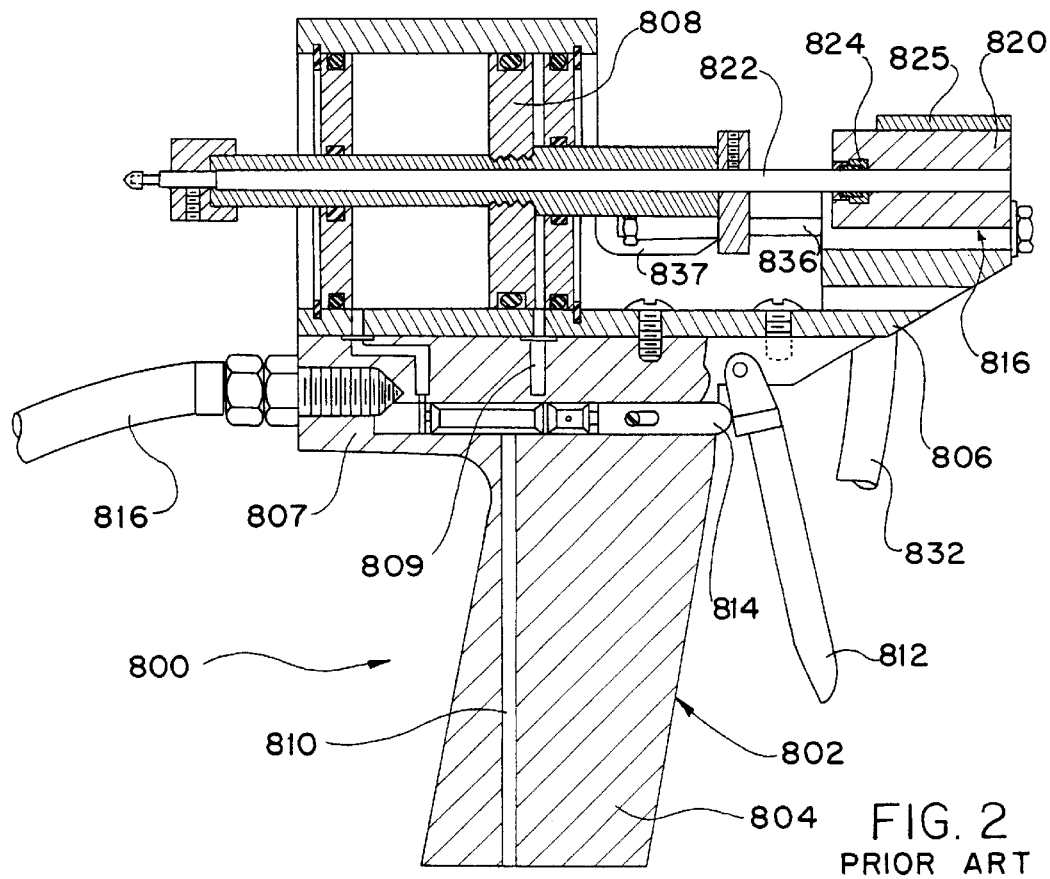
FIG. 2 shows a cross-sectional view of a prior art dispensing apparatus.
Figure 3:
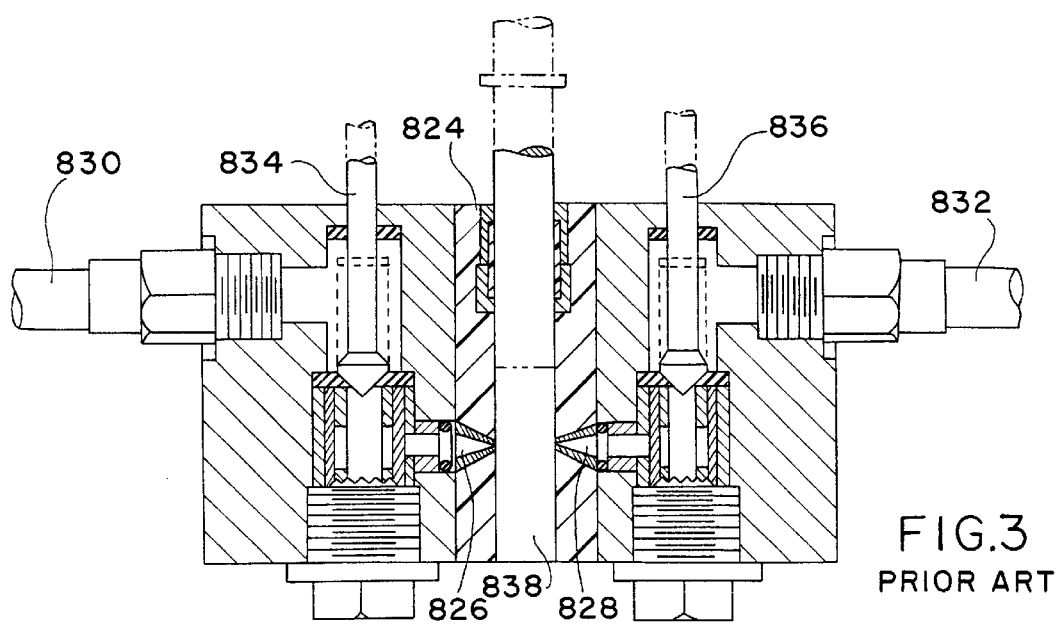
FIG. 3 shows a cross-sectional view in the mixing chamber and chemical precursor inlet ports for the dispensing apparatus of FIG. 2.

FIGS. 2 and 3 illustrate one such solvent-less, polyurethane foam dispensing gun which is more fully described in U.S. Pat. No. 5,211,311 to Carpenter Company, Inc. and is incorporated herein by reference. Provided below is a discussion of some features of the dispensing gun disclosed in the '311 patent and partially depicted in FIGS. 2 and 3 of the present application. Dispensing gun 800 in FIG. 2 features main body 802 which includes handle section 804 and upper mount section 806. Within handle section 804 are a series of air passageways 807, 809 and 810 which include openings that open out on opposite sides of piston 808. By manipulating trigger 812, valve 814 is shifted with respect to the pressurized air being fed through air conduit 816 so as to either cause piston 808 to shift to the left or to the right.

FIG. 2 further illustrates base 806 supporting mixing assembly 818 which includes mixing chamber block 820, purge rod 822, and scraper assembly 824. Mixing chamber block 820 is clamped into position by clamp member 825 having ends (not shown) affixed to base 806. Mixing chamber block 820 is preferably formed of a Teflon material that has rod scraper assembly 824 positioned in a hollow cavity formed therein. Purge rod 822 is received within the mixing chamber in an interference fit relationship and reciprocates in a through-hole which, in part, forms the mixing chamber for the chemical reactants "A" and "B" fed in through inlet ports (826, 828—FIG. 3) formed in the mixing chamber by way of chemical conduits 830, 832. FIG. 3 further illustrates needle valves 834 and 836 which are positioned so as to block or allow through the corresponding chemical precursor at a location which is upstream of inlet ports 826, 828 and mixing chamber block 820. Because valves 834 and 836 function to control whether or not the chemicals reach the mixing chamber 838, rod 822 functions as a purge rod and not as a valve rod.

This purging function is achieved in the reciprocating nature of rod 822 which is attached, at least indirectly, to the reciprocating piston 808. Needle valves 834, 836 are also shifted through movement of the piston due to the action of interconnecting yoke 837. Yoke 837 is designed to provide the desired opening and closing sequence with respect to the upstream chemical valves and the reciprocating purge rod. In this regard, a threaded adjustment device is provided on each of needle valves 834 and 836 received by yoke 837. This threaded adjustment is used to compensate for wear in the seals as it can be used to further extend the needle valve along its central axis toward the seals to compensate for loss in seal thickness in the same direction.

The Teflon block and scraper in the embodiment of FIG. 2 are maintained in an interference fit relationship with the reciprocating purge rod to promote the maintenance of a clean mixing chamber 838 and to preclude leakage of the fluid being mixed rearwardly past the purge rod.

Figure 4:
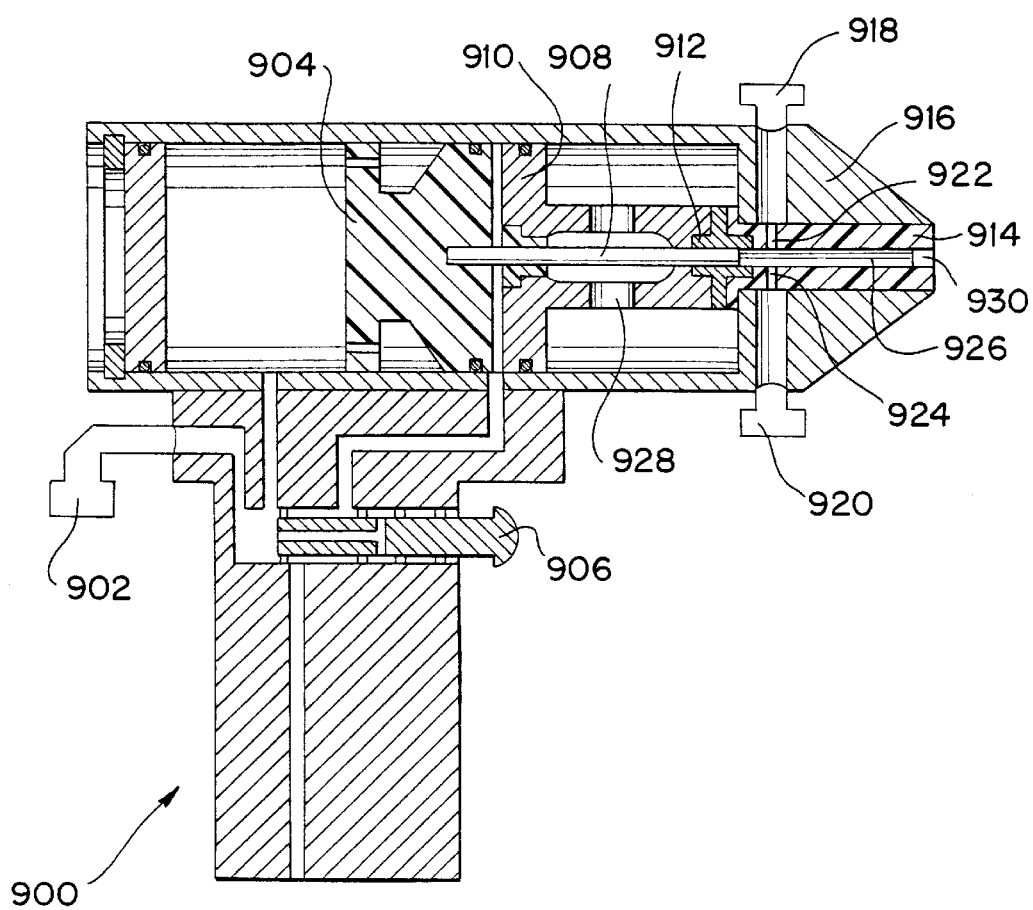
FIG. 4 shows a cross-sectional view of another prior art dispensing apparatus.

FIG. 4 illustrates a dispensing gun which involves providing a solvent supply means that relies upon a pool of solvent placed in contact with a reciprocating valving rod. FIG. 4 of the present invention is representative of the prior art dispensing un described in U.S. Pat. No. 3,945,569 which is incorporated herein by reference. As shown in FIG. 4, dispensing gun 900 in the '569 patent includes a pressurized source of as 902 used to shift piston 904 back and forth depending upon the setting of trigger 906. Valve rod 908 is connected to piston 904. Valve rod 908 reciprocates within T-shaped solvent reservoir member 910, intermediate bushing 912 and Teflon® material shank member 914. The reciprocating valving rod is in an interference fit relationship with respect to the receiving shank 914 to facilitate the scraping out of any residue in the mixing chamber defined by Teflon shank 914 and received by head portion 916 of the gun and to prevent leakage of the chemical precursor into the mixing chamber, particularly a cross-over leakage wherein leakage from one inlet port reaches leakage or leftover fluid at another inlet port and reacts on the surface of the valving rod. Pressurized source 918 for Chemical A and pressurized source 920 for Chemical B direct chemicals into respective inlet ports 922 and 924. Interference fit valving rod 908 is cylindrical at its front and back and includes a flattened section 926 therebetween. Flattened section 926 has end walls which block off the inlet ports 922 and 924 when the reciprocating rod 908 is in a forward, valve closed position.

When valving rod 908 of the Sperry U.S. Pat. No. 3,945,569 is reciprocated back into the dispensing position, the flattened portion 926 is located in the solvent chamber or reservoir 928. The flattened sides of flattened portion 926 and the additional spacing provided thereby helps carry the solvent into the mixing chamber after the trigger 24 is released and the gun is switched into the non-dispensing or stand-by position. Thus, the valve rod 908 cleans the inside of the gun by scraping the defining wall of the mixing chamber as the circular outer end 930 moves forward, and the solvent carried by the flattened sides, upon leaving the reservoir, dissolves residue material in the mixing chamber while the edges of the flattened sides perform their valving function by blocking the inlet ports 922 and 924.

An additional embodiment of the Sperry '569 patent includes a passage or channel extending from one of the flattened walls, internally through the valving rod, and out at the valving rod's front tip in an effort to provide solvent at the tip.

THE PRESENT INVENTION

Figure 5:
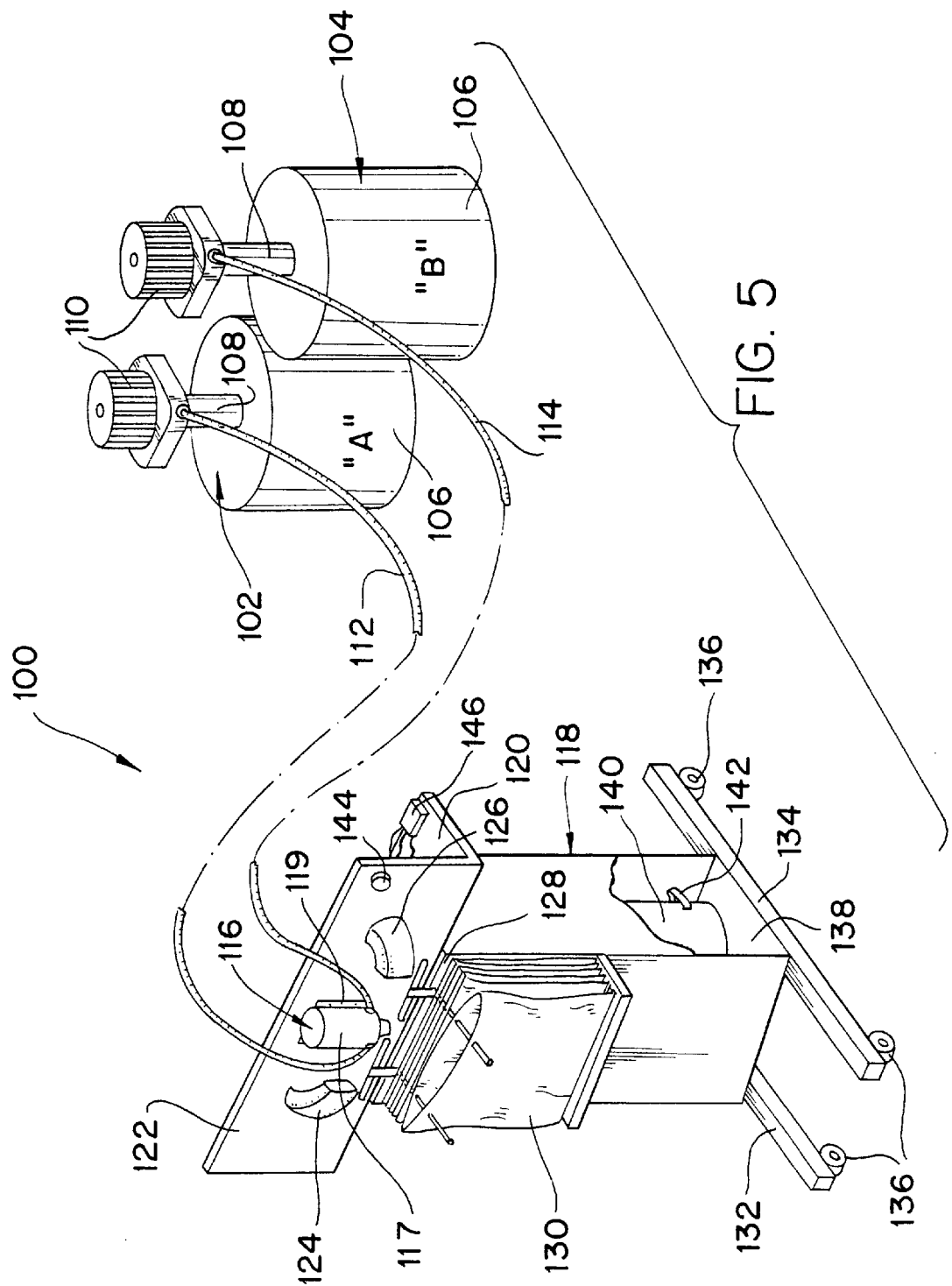
FIG. 5 shows a perspective view of a preferred embodiment of a dispensing system of the present invention.

FIG. 5 illustrates a preferred dispensing system 100 of the present invention which is particularly well suited for dispensing polyurethane foam products. Dispensing system 100 includes a chemical "A" supply means 102 and a chemical "B" supply means 104. As explained in greater detail below, the chemical supply means are each preferably comprised of a chemical supply drum or container and an intermittent or pulsed pump having common characteristics. The intermittent, non-continuous pump described in greater detail below, operates on a unique basis and has a driver which, in a preferred embodiment, is an intermittently run AC motor.

The preferred embodiment of the present invention involving an intermittent, torque based pump with brushless AC motor has many advantages over the pump systems presently being used in the industry. The pump system currently being used in the industry are continuous, DC motor driven pumps having complex control systems in an effort to maintain a constant flow rate ratio between chemicals A and B despite variations (e.g., the aforementioned port restrictions due to residue accumulation) in the variable components of the prior art systems, some of which are generally based on the equation, $$P = \frac{mRT}{V}$$

with P representing pressure, m representing mass of pumped fluid, V representing the volume of the fluid containing system, T representing the temperature of the pumped fluid, and R is a constant based on the fluid involved. The development of a partial obstruction in the inlet port leading to the mixing chamber, for example, can alter the flow rate of one chemical into the mixing chamber so as to disrupt the desired ratio. The current state of the art involves a continuous DC motor pump designed to provide, in a non-disrupted setting, 200 psi of liquid pressure. Despite the high cost and complexity of the pump system and associated control requirements, these type of pumps were adopted in the industry out of necessity in an effort to counteract the discontinued use of fluorotrichloromethane as a heat sink to help drop reaction temperature of the mixed A and B chemicals and correspondingly, in accordance with PV=mRT, the pressure requirements.

The industry had earlier used, when fluorotrichloromethane was being utilized, piston pulse pumps in stainless steel casings. However, upon the increase in pressure levels required to compensate for the discontinued use of fluorotrichloromethane, these pulse pumps proved not to be practical due to poor response time caused by large pressure drops between pump activations.

The pumping system of the present invention makes possible the advantageous use of an intermittent pump without the problems associated with the prior art piston pulse pumps. These advantages include, for example, low initial cost, low service requirements, improved seal life, rapid response times, etc.

The fluid stored in chemical drums 106 is pumped on demand by pumps 108 into respective fluid conduits 112, 114. In a preferred embodiment, conduits 112 and 114 feature a flexible metallic outer sheath enclosing an embedded heater assembly with a heat control unit featuring a thermistor or thermostat and a fluid hose for fluid travel. Further details of the preferred conduit arrangement is provided below in the discussion of FIGS. 56–58.

Figure 58:
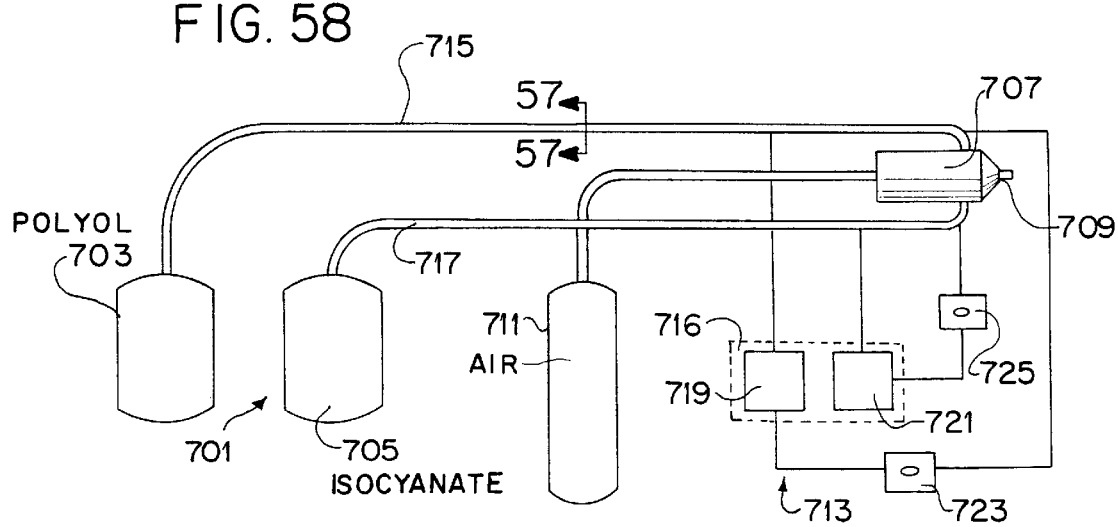
FIG. 58 shows a schematic illustration of the thermostat, heater unit and control used to maintain a desired temperature of the fluid passing in the fluid material transport conduit.

In FIG. 58, there is illustrated a schematic layout of chemical supply means 701 which features polyol and isocyanate sources 703, 705 as the chemicals to be provided to dispenser 707 having outward end 709. Pressurized air conduit 711 is connected to dispenser 707 to shift dispenser 707 between a parked, non-dispensing state and an active dispensing state. Conduit heating means 713 is designed to heat the chemical traveling through conduits 715, 717 to inlet ports provided in dispenser 707. Control and heating means 713 is designed to monitor the temperature of the foam and heat the conduits when certain parameters being sensed by the control and heating means 713 suggest that heating is required. For example, control and heating means 713 preferably includes programmable controller 716 which receives data concerning, for instance, specific heat, chemical throughput and length of foam dispensing cycle. With this information and present temperature profiles, the controller 716 is utilized to provide a precise and consistent output of liquid chemical to the mixing port despite variations in the surrounding environment, etc. (e.g., humidity and temperature). Thus, control and heating means 713 features means 716 for monitoring and adjusting the amount of heat supplied to the conduits 715, 717 which means can include independent control units 719, 721 for the two conduits individually shown in FIG. 58. The monitoring and adjustment means thus includes, for example, a thermistor or thermostat embedded in the conduits, suitable electrical supply means and electrical lines for providing energy to a heat resistor also embedded in the conduit and suitable environmental sensors and sensors for determining liquid flow in the line and reception means for data concerning the desired length for a foam dispense cycle. Means 713 can also include manual temperature adjustment devices 723 and 725 for manual adjustment of the temperature when it is desired to override initially, set or supplement the automated heat control provided by means 719 and 721. Heating and control means 713 can also form a component of a programmable control unit which controls other items such as solvent supply, pumping operation; etc.

Figure 56:
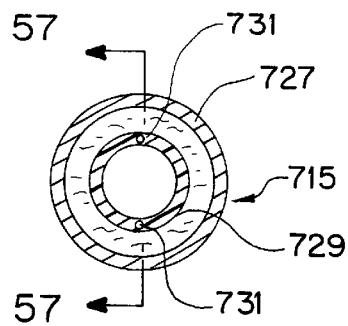
FIG. 56 shows a schematic view of the fluid material transport conduits extending from the pumps to the dispensing apparatus.
Figure 57:
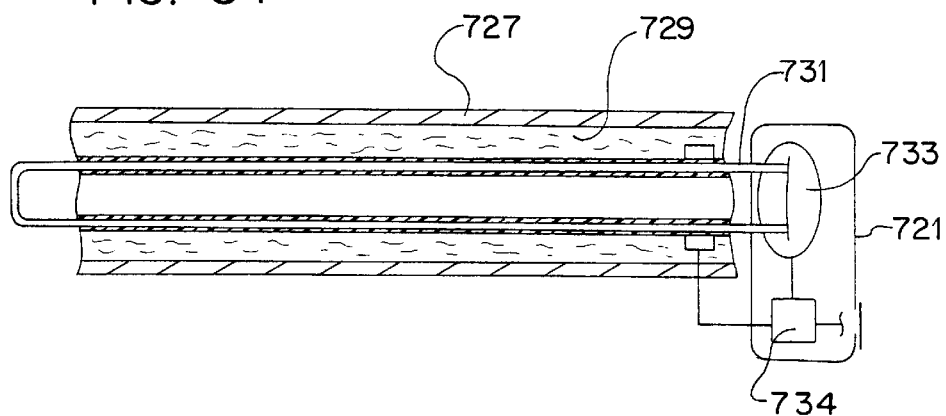
FIG. 57 shows a cut-away illustration of the heater control system including the thermostat provided within the conduit shown in cross-section in FIG. 56.

With reference to FIGS. 56 and 57, FIG. 56 shows a radial cross-sectional view taken along cross-section line 56—56 in FIG. 58, while FIG. 57 provides a broken away view of a longitudinal section of one of conduits 715, 717.

As shown in FIG. 56, conduit 715 features a flexible outer spiral metal protective sheath 727. Within sheath 727 is provided insulating (thermally and electrically) layer 729 surrounding interior precursor flow conduit formed of a flexible plastic or other suitable material. Embedded within the plastic conduit or within the surrounding insulating material is a looped, heating resistance wire 731. As further shown in FIG. 57, heating and regulating means 721 includes electrical power source 733 and sensing and adjusting means 734.

With reference again to FIG. 5, conduits 112 and 114 (which can be similar in design to those described in FIGS. 56–58) direct chemicals A and B to respective reception ports in dispensing assembly 116. Dispensing assembly 116, which is comprised of dispensing apparatus 117 and mount block 119, is mounted on support stand 118 having top plate 120 with vertical support wall 122 extending transversely thereoff. Vertical support wall 122 is shown as further supporting optional blower guides 124, 126 with outlets positioned to opposite sides of dispensing assembly 116 for directing air downwardly and somewhat inwardly with respect to an individual bag support assembly 128. As discussed in greater detail below, bag support assembly 128 features means for the releasable mounting of it to the support stand as well as means for releaseably securing a plurality of individual bags 130 in position below dispensing assembly 116. Further details of this preferred bag dispensing arrangement is provided below in the discussion of FIGS. 35–38B.

As discussed in greater detail below, the bag support assembly of the present invention preferably includes releasable coupling means to ensure that upon removal of a filled bag, a second empty bag moves into an appropriate, open position below the dispensing assembly 116. This releasable coupling means can include, for example, adhesive areas or patches on the bags that work in conjunction with a pair of support rods to pull and open the next in line bag upon removal of a filled bag. Blowers (not shown in FIG. 5—discussed below) for producing an air stream through blower guides 124, 126 in FIG. 5 are an optional feature of the present invention which, when operating, can facilitate the opening and the maintaining of a bag open such that foam material can be easily poured into the bag without spillage. The automatic opening of the bag also provides a means for avoiding solvent (from the dripping solvent supply system of the present invention) dripping onto the floor or onto an operator.

Support stand 130 of FIG. 5 includes outwardly extending beams 132, 134 having roller assemblies 136 attached at each end to provide for mobility in support stand 118. Support stand 118 further includes an interior recess 138 within which is received a solvent container 140 (e.g., a 5-gallon container which can provide a year's supply of solvent under typical usage of the present invention). A more detailed discussion of support stand 118 and solvent container 140 is provided below with respect to FIG. 42. Solvent container 140 is shown in FIG. 5 as being connected to air pressure supply tube 142 (shown in cut-away) which provides sufficient pressure to force solvent out of the container and to the dispensing assembly 116 when a valve or other metering means is opened. Various other solvent feed arrangements are possible including a gravity drip arrangement and further details of supplying the solvent to the dispensing apparatus are provided below.

Switch 144 is provided on vertical wall 122 and, when depressed for a first time, initiates operation of the chemical supply means 102, 104 and gas pressure supply means (not shown in FIG. 5—discussed below) for placing dispensing assembly 116 into a dispensing mode. Any suitable control system for activating and deactivating the various components of the system can be utilized with an electronic control system being preferred. Also, rather than switch an LCD, a pressure button panel (not shown) is also contemplated for use in the present invention wherein the amount of foam, velocity of foam output, temperature of conduits, chemical flow, etc. can be set and the system activated thereafter upon depressing a central button.

The triggering of switch 144 can also activate a gas pressure supply means (not shown) such as an air compressor for forcing gas through pipe 142 into solvent chamber 140 and pushing the solvent out past an opened valve (also activated by central switch 144) or other metering device into dispensing assembly 116. If the solvent supply is set up to act independently of the precursor chemical supply, there need not be any timing interrelationship between the solvent introduction and the chemicals introduction. However, in a preferred embodiment, activation of switch 144 leads to an initial injection of solvent and another solvent introduction cycle upon return of the dispenser to a parked state or one that continues throughout the dispersion of the chemical mix. That is, the solvent injection can be initiated immediately prior to, simultaneously with, and/or just after foam dispensing. A preferred cycle is discussed below together with respect to a complete cycle of the foam dispensing. The solvent introduction can thus be adjusted to suit the operating parameters via an electronic control system.

The timing of the various components in system 100 such as the chemical supply means, the solvent supply means, the blowers for the air guides, the pressurized gas for dispensing assembly activation or deactivation, the heating temperature in conduits 112, 114, and any other sub-assembly in system 100 are preferably all controlled by a programmable, central control unit 146, which can be in the form of a microprocessor or the like, and is in communication with the remaining portion of the overall electronic control system of which control unit 146 forms a part. The electronic control system is activated either by a manual switch or trigger or by an automated function such as one triggered by a cam or sensor detecting the appropriate position or state of an object to be filled. The microprocessor preferably includes a suitable timing unit for providing a time schedule for activating and deactivating the various subassemblies in the dispensing system to provide an efficient dispensing operation. The solvent supply system also preferably features an independent, intermittent and repeating solvent supply cycle generating means which is activated during sensed periods of extended non-use so as to maintain the system wetted with sufficient solvent to avoid a drying out of the dispensing assembly 116.

Upon switch 144 being pressed or some other triggering means, the system goes into operation to produce a desired volume of polyurethane foam into a receiving object such as a bag. Thus, while the mixed chemical precursors are still in a fluid state, the bag can be placed at the desired location (e.g., into contact with an article of manufacture to be protected during shipping) and the mixed chemicals react to produce a solid but compactable foam body. Upon the timed completion of the various operations controlled by control unit 146 the system returns to a stand-by mode or, alternatively, the switch can be of a type involving the continued depressing of the switch and a discontinuation in operation upon release of the switch (such as in the prior art hand held gun embodiments).

Although, the system 100 in FIG. 5 illustrates an individual foam-in-bag dispensing system, the features of the present invention are applicable in a wide variety of dispensing systems, including, for example, hand-held gun systems such as those described above and below, automatic conveyor and box dispensing systems such as those described in U.S. Pat. Nos. 4,426,023 and 4,390,337, etc.

Figure 6:
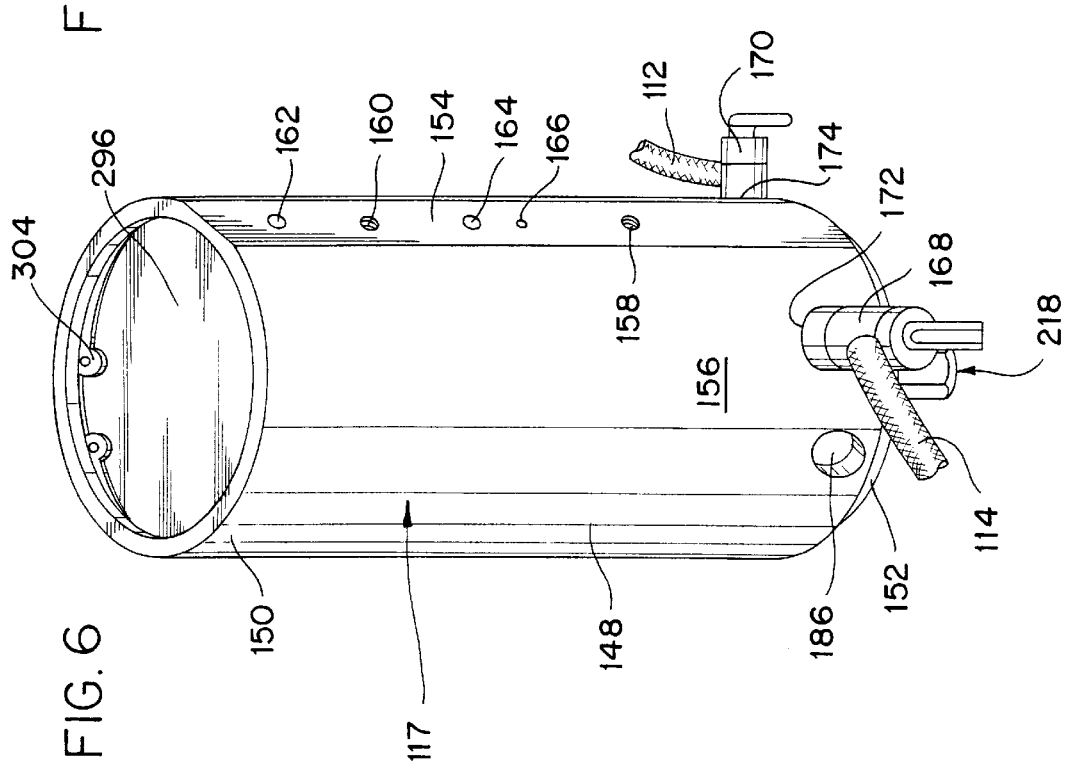
FIG. 6 shows a perspective view of one preferred embodiment of a dispensing apparatus of the present invention.

FIGS. 6–32 are directed at one preferred embodiment of the dispensing assembly 116 of the present invention shown mounted on support stand 118 in FIG. 5. FIG. 6 provides a perspective view of dispensing apparatus 117, as well as a cut-away view of the ends of the heated chemical conduits 112 and 114 connected to dispensing apparatus 117.

With reference to FIGS. 6–12, dispensing apparatus 117 is comprised of main body 148 which preferably is generally in the shape of a hollow cylinder having an open rear or non-dispensing end 150 and a gradually tapering front or dispensing end 152. Between front and rear ends 150 and 152 there is positioned planar mounting surface 154 formed on what is an otherwise cylindrical peripheral surface 156. As shown by FIG. 11, front end 152 has a shallow taper which is preferably about 15°.

Opening out at planar surface 154 and extending through main body 148 to the hollow interior thereof are threaded mount holes 158 and 160, reciprocating piston air ports 162, 164, and solvent introduction port 166. While threaded mount holes are depicted, various other mount arrangements are contemplated including a key slot with or without a spring biased holding member in the support stand, an integral mount arrangement or any other suitable mounting technique.

FIG. 6 further illustrates chemical flow on/off valves 168, 170 which are connected to respective chemical supply-conduits 112 and 114 and also received within threaded reception holes 172 and 174 formed in main body 148. Valves 168 and 170 represent service valves or safety valves that can be shut off to preclude fluid flow into the main body, although, as explained in greater detail below, separate means are provided for preventing fluid flow of the chemicals into the mixing chamber of the dispensing apparatus 117 when the dispensing apparatus is in a non-dispensing state.

Figure 8:
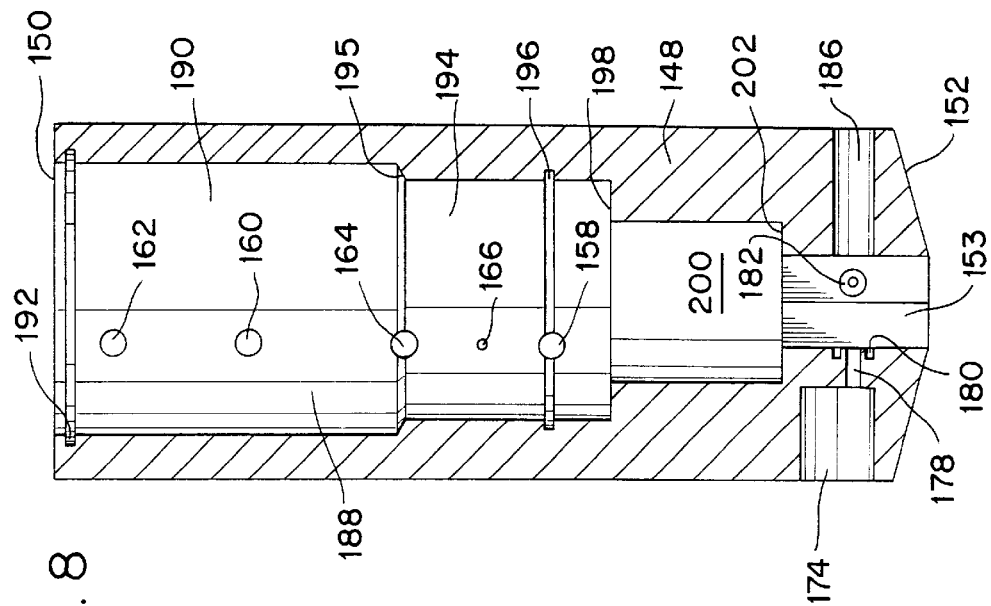
FIG. 8 shows a cross-sectional view of the housing or main body of the dispensing apparatus of FIG. 6 taken along cross-section line VIII—VIII of FIG. 12.

As shown in FIGS. 8 and 10, in particular, threaded reception hole 172 opens into internal passageway 176 which, in turn, opens into opening 153 provided at the dispensing end region of main body 148. In the illustrated embodiment, opening 153 is multi-sided (e.g., a six-sided opening). Other arrangements are also contemplated such as a round cross-section opening. Internal passageway 178 extends between opening 153 and threaded reception hole 174. As best shown by FIGS. 8 and 10, passageways 176 and 178 are provided in the lower half quadrant of the corresponding reception hole (172 or 174) although a concentric arrangement is also contemplated as discussed further below. Also, FIGS. 8 and 10 show a shuttle valve system featuring seal reception grooves 180, 182 which are designed to receive correspondingly shaped seals such as the illustrated elastomeric O-ring seals or, as will also be explained below, plastic composite material seals such as Teflon® material with a 25% level of glass fill. The seals can, however, take any suitable form and be of any suitable material which can carry out the sealing functions involved in the present invention's dispensing system. Thus, while elastomeric "O-ring" and Teflon material seals are illustrated and described as being preferred embodiments, the present invention is not intended to be limited to any particular seal shape or material, only an arrangement appropriate to achieve the seal functions described in this application. As also explained in greater detail below, it is seals 181, 183 provided in seal grooves or seats 180 and 182 that provide an upstream chemical flow shuttle valving means in association with a mixing chamber that is adjustable in position between a stand-by or no chemical mix dispensing mode and a chemical mix dispensing mode.

FIGS. 10 and 12 also illustrate diametrically opposed access ports 184, 186. Access ports 184 and 186 allow an operator to initially insert and then later replace seals placed in seal seats 180, 182. Also, as explained in further detail below, access openings 184 and 186 each provide a solvent flow passageway which, in conjunction with the tapered surface 152, provides means for supplying an external solvent flow to the dispensing tip of dispensing apparatus 117.

FIG. 10 also shows angles A1 and A2 with angle A1 representing the angle formed between the center lines of internal passageways 176 and 178, and angle A2 representing the angle between the center line of internal passageway 176 and that of access port 186. In a preferred embodiment, A1=120° and A2=60° such that the interior angle between access ports 184 and 186 is also 120°

FIGS. 8 and 11 illustrate the configuration of hollow interior 188 of main body 148. Hollow interior 188 is comprised of reciprocating piston chamber 190 which opens out at rear end 150. Just forward of that opening there is provided circular spring clip recess 192. The aforementioned reciprocating piston air ports 162 and 164 formed in planar surface 154 of main body 148 open into reciprocating piston chamber 190 with port 162 being at a rear end of chamber 190 and port 164 at the front extremity of chamber 190. Threaded mount hole 160 extends partially or all the way through (provided the fastener is not too long as to interfere with piston travel) main body 148 and into chamber 190.

Immediately forward of reciprocating piston chamber 190 is intermediate cavity 194 into which solvent port 166 opens. This is a preferred location for solvent introduction as it ensures a complete wetting of the relevant surfaces although other positions are also possible. Also, the position of the second threaded mount-hole 158 with respect to intermediate cavity 194 is shown. A second spring clip recess 196 is also formed in the lower region (e.g., ¼ rearward of the total axial length of cavity 194 from the front end of cavity 194) of intermediate cavity 194. Cavity 194 joins with chamber 190 by way of beveled surface 195. The forward end of cavity 194 includes step shoulder 198 and opens into spring reception cavity 200. The forward end of spring reception cavity also includes step shoulder 202 and opens into the aforementioned multi-sided opening 153.

Figure 7:
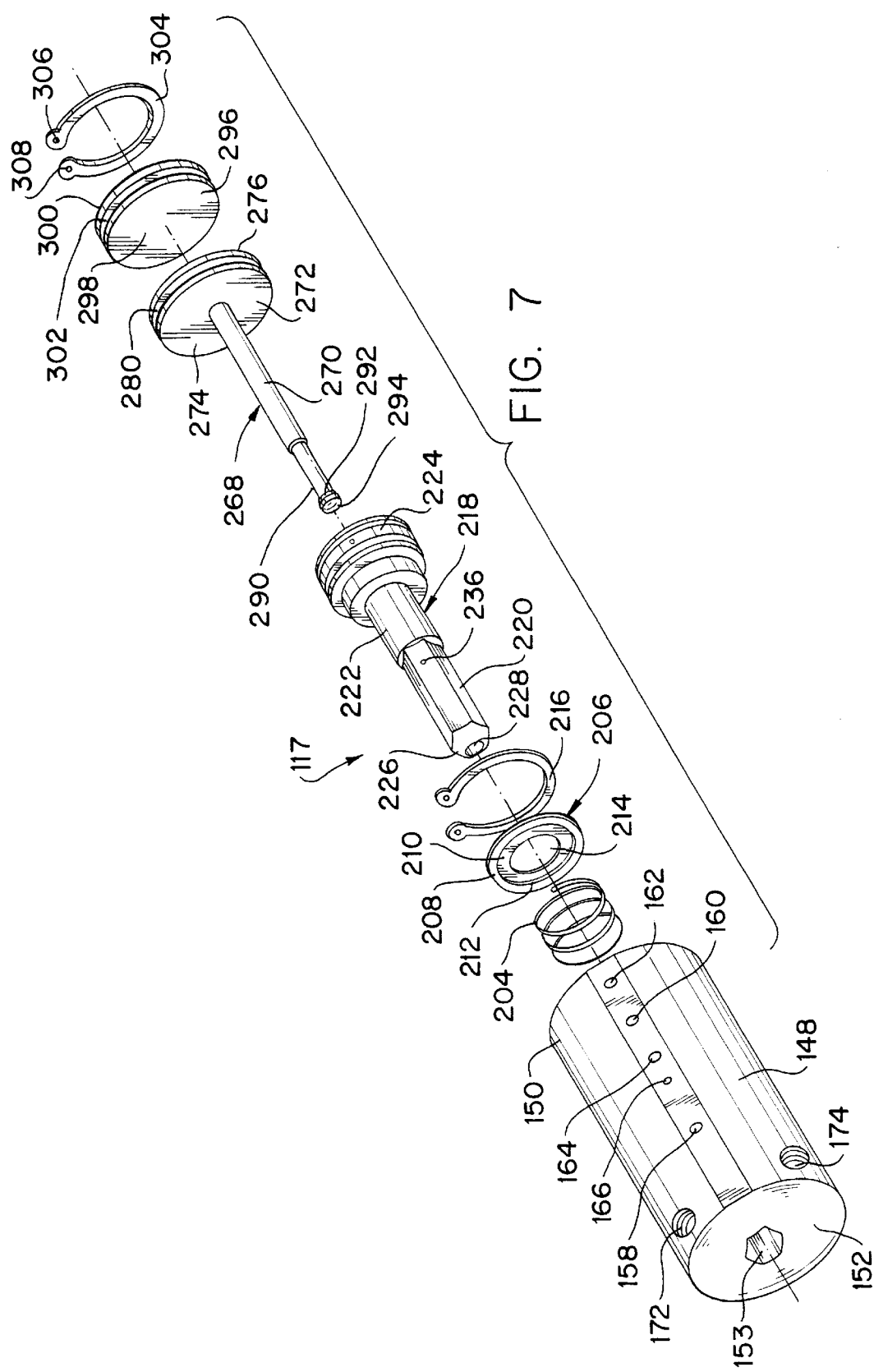
FIG. 7 shows an exploded view of that which is shown in FIG. 6 except for the seals and fluid shut off valves and lines being omitted for added clarity.
Figure 25:
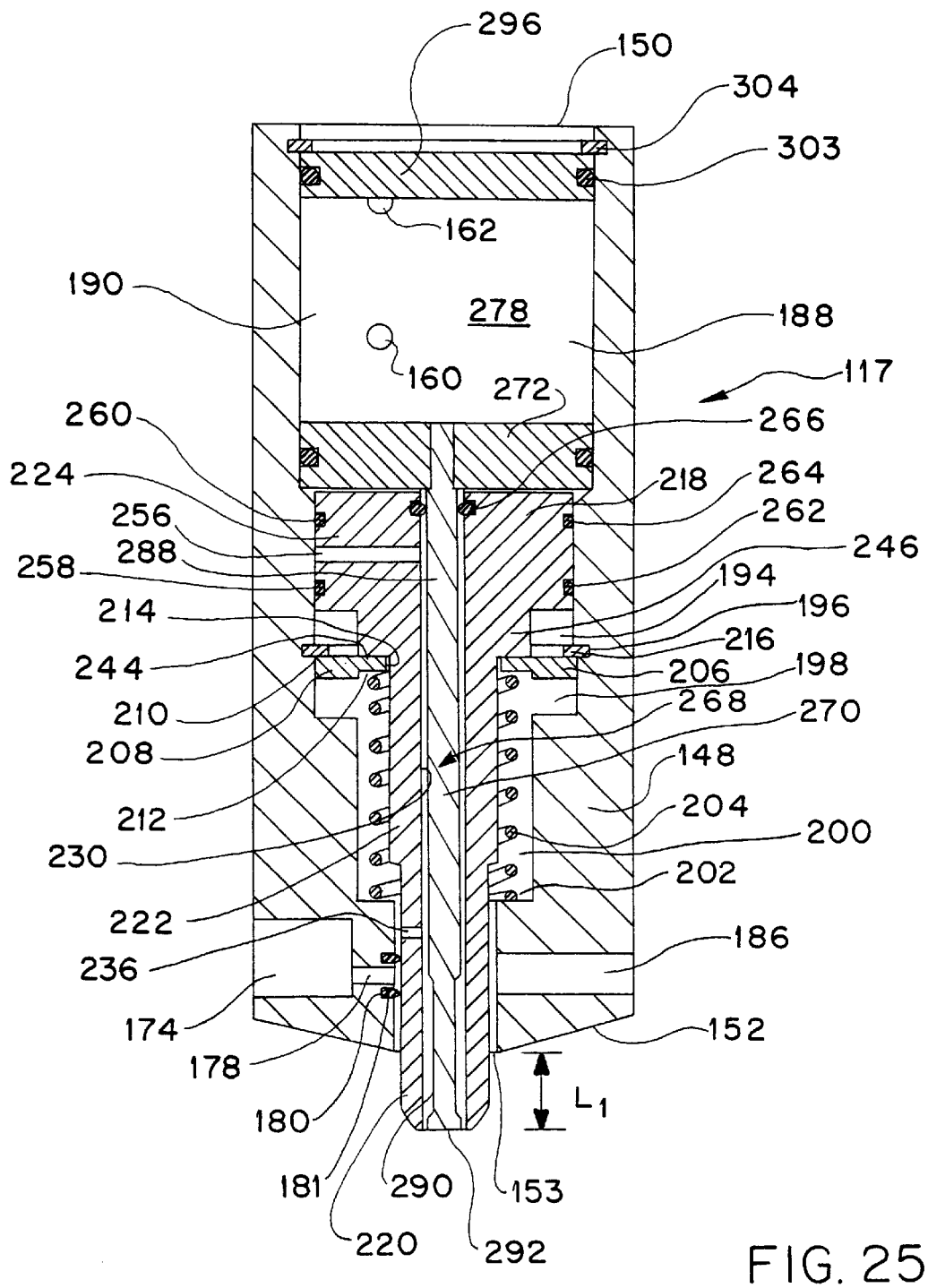
FIG. 25 shows a cross-sectional view of the dispensing apparatus in stand-by mode which is similar to FIG. 24 except for the inclusion of the purge rod and purge rod piston.

FIG. 7 shows an exploded view of the various components of dispensing apparatus 117 exclusive of the seals and chemical on/off valves 168 and 170 which have not been included for added clarity. FIG. 25 shows dispensing apparatus 117 with seals in position but still without the chemical on/off valves 168, 170 (which actually could be positioned closer to the pump source and not connected with main body). In addition to main body 148, dispensing apparatus 117 is shown in FIGS. 7 and 25 to include return spring 204 which is preferably a helical spring, or some other suitable biasing means. As shown in FIG. 25, return spring 204 is received within spring reception cavity 200 and has a forward end in contact with step shoulder 202. Positioned rearward and in contact with spring 204 is spring retainer member 206. Spring retainer member 206 is shown also in FIGS. 16 and 17 and, as shown, is preferably in the form of a cup shaped member having thicker exterior ring section 208 and thinner, annular flanged section 210. Sections 208 and 210 together define spring end reception recess 213 while the interior edge of ring shaped flanged section 210 defines central opening 214.

As shown in FIG. 25, rearward of cup-shaped member 206 is positioned retainer clip 216 which is partially received within second spring clip recess 196 and extends radially inward a sufficient distance to trap cup-shaped member 206 (and hence spring 204 as well) forward thereof and preferably in a slightly compressed state (e.g., a spring force of 50 lbs.).

FIGS. 7 and 25 further illustrate mixing chamber defining member 218. Mixing chamber defining member 218 includes front section 220 (multi-sided in this embodiment), cylindrical intermediate section 222 and rear section 224. Mixing chamber defining member 218 is shown in greater detail in FIGS. 13–15. As shown in FIGS. 13–15, front section 220 features an elongated segment 221 designed to correspond in cross-sectional shape with the configuration of the opening 153 which is multi-sided in the illustrated embodiment to help maintain relative positioning by avoiding relative rotation of member 218 with respect to main body 148 and to facilitate alignment of ports in the housing with ports in member 218. Front section 220 further includes tip segment 226 which extends forward of multi-sided segment 221 and defines mixing chamber outlet 228 at its extreme forward end. Tip segment 226 can be hardened for improved capability to withstand repeated grinding operations or provided with a non-stick coating which represent techniques used in the industry to avoid foam residue accumulation. However, with the improved solvent cleaning system of the present invention described below, build-up is prevented in these external regions so as to lessen or eliminate completely the need for these prior art tip modifications.

The materials for the dispensing apparatus of the present invention include any materials that can provide the required tolerances and can stand up in the environment. Some examples of suitable materials include aluminum and steel materials, as well as various plastics and composite materials.

As shown particularly in FIG. 15, member 218 includes passageway 230 extending axially through member 218 from opening 228 at tip section 226 to rear opening 232 in rear section 224. The multi-sided segment 221 includes chemical injection ports 234 and 236 which receive, when aligned with chemical internal passageways 176 and 178 formed in main body 148, chemicals A and B. As chemical injection ports 234, 236 are positioned so as to correspond with internal passageways 176, 178, they are also angled apart by angle A1 (preferably 120°). Thus, injection port 234 can represent the chemical A injection port while injection port 236 can represent the chemical B injection port. Injection ports 234 and 236 are also preferably spaced at a position ⅔ of the length of elongated multi-sided front section 220 back from the front end of that section and thus ⅓ forward of the flange ring 238 defining the step between front section 220 and intermediate section 222.

The section of passageway 230 which runs within front section 220 essentially constitutes mixing chamber 240 although, depending on the position of the forward end of the purge rod described below, the mixing of the chemicals A and B occurs essentially commensurate or just rearward of injection ports 234, 236 (e.g., the front tip of the retracted rod preferably being 0 to ¼ of an inch or 0 to 6.3 mm back from the injection ports) out to opening 228 when in a dispensing mode state. The diameter of passageway 230 and thus also mixing chamber 240 is preferably from about 2/16 of an inch to 1 inch with a 3/16 to ½ inch diameter range being particularly suited for the purposes of the present invention and 3/16, ⅜, and ½ of an inch being preferred values within that range. As discussed earlier in the Summary of the Invention, however, the design of the present invention easily can be made to have mixing diameters of greater than 1 inch (e.g., 1 ½ or 2 inches). The intended use can thus easily dictate the use of a greater than 1 inch mixing chamber diameter. If a much larger diameter is utilized in the system of the present invention, then suitable adjustments such as in the pump, conduit and chemical passageway size would also need to be made. The distance between opposing walls in the preferred hexagonal shaped front section 220 is about ½ inch for a bore or mixing chamber passageway of ¼ inch in diameter.

At the rear end of passageway 230, just forward of rear opening 232, there is provided circular groove 242 (FIG. 15) for receiving an O-ring seal or the like.

Intermediate section 222 is preferably cylindrical in shape with a diameter that is essentially the same as diametrically opposed edges of the multi-sided front section 220. As shown in FIG. 25, intermediate section 222 has an exterior periphery designed for receipt both within the confines of spring 204 and within the confines of opening 214 defined by cup-shaped, spring retainer member 206.

As shown in FIG. 25, for example, the cup-shaped spring retainer's opening 214 is sufficiently large enough to provide for relatively easy sliding action in the intermediate section 222 inserted into opening 214. Step 244, however, defining the boundary between intermediate section 222 and rear section 224, has an external periphery larger than the opening 214 such that the rear surface of cup shaped member 206 makes contact with step 244 acting as a stop. Extending rearwardly away from step 244 is cylindrical forward section 246 which is integral with base 248 of rear section 224. Base 248 has a diameter or external periphery which is greater than that of forward section 246, but less (e.g., a clearance of 0.001–0.002 of an inch) than the wall of main body 148 defining intermediate cavity 194 so as to allow for relatively easy sliding action of member 218 within main body 148. Base 248 includes a forward disk end 250 (FIG. 15) and a rearward disk end 252 as well as intermediate portion 254. Disk ends 250 and 252 have the largest diameter or external periphery and thus represent the above noted clearance and also have chamfered external edges. Intermediate portion 254 has slightly less of a diameter or external periphery (e.g., resulting in a clearance of 0.003 to 0.004 of an inch) as compared with disk ends 250 and 252 to provide a solvent reception area between intermediate portion 254 and the adjacent internal wall of main body 148. Intermediate portion 254 also includes radial solvent passageway 256 which extends radially in from the exterior of intermediate portion 254 and opens into passageway 230. Positioned between intermediate portion 254 and forward disk 250 there is provided first seal groove 258. Positioned between intermediate portion 254 and disk end 252 there is provided second seal groove 260.

As shown in FIG. 25, seal grooves 258 and 260 receive O-ring seals 262 and 264, respectively. Seals 262 and 264 are preferably formed of a material such as an elastomeric material such as natural or synthetic rubber and composites involving rubber or a plastic material (such as Teflon® material) or composites involving plastic or any other material suitable for sealing off solvent introduced through solvent port 166 in main body for passage initially within the clearance between intermediate portion 254 and the internal wall of cavity 194 and then within radial solvent passageway 256 as discussed in greater detail below. FIG. 25 also shows smaller O-ring seal 266 received within the aforementioned seal recess 242 at the rear end of mixing chamber defining member 218. The material and sizing of seals 262, 264 and 266 is sufficient to preclude fluid leakage while still allowing for relative ease in movement between shifting or reciprocating objects in contact with the seals.

With reference to FIGS. 7, 20–23 and 25, in particular, purging rod assembly 268 is comprised of purge rod 270 and piston 272. Piston 272 features a forward disk section 274 and a rearward disk section 276 having a periphery or external diameter which is slightly less (e.g., 0.002 to 0.004 of an inch) than wall 278 shown in FIG. 25 as defining reciprocating piston chamber 190. Between disk sections 274 and 276 there is positioned circular seal groove 280. As shown in FIG. 25, seal groove 280 is designed to receive O-ring seal 282 with the latter making contact with wall 278 so as to provide a sufficient enough seal to provide for reciprocation of the piston and attached purge rod between its most forward and rearward states upon the introduction of pressurized air (e.g., 100 psi) through the appropriate one of air ports 162, 164 formed in main body 148. In a preferred embodiment, the piston diameter is 1.6 inches. This roughly 1 ⅔ inch diameter size for the piston is suitable for use with a 100 psi position manipulating air supply. A comparison with the prior piston sizes also reveals that the present invention provides a highly compact configuration and an easily reciprocated purge rod. Further, unlike the prior art, this pressure level and piston size the motive force provided can easily handle the aforementioned mixing chamber diameter range of 0.125 to 1 inch is anticipated as being able to easily go well beyond that range (e.g., up to 5 inches or more) in view of the essentially negligible increase in resistance due to an increase in the diameter of the seals and fluid interface area between the solvent and relevant purge rod and mixing chamber surfaces.

Piston 272 includes a central, preferably threaded, through-hole 284. As shown in FIG. 20, purge rod 270 includes protrusion 286 which is designed for releasable securement in through-hole 284 by way of a threaded connection, for example. The ability to disassemble purge rod assembly 268 into the purge rod and piston components can facilitate servicing by, for example, adding greater flexibility in the direction the purge rod can be pushed out.

Forward of protrusion 286 is the purge rod's elongated main section 288, recessed section 290, and tip section 292. FIG. 21 provides a cross-sectional and more detailed view of these sections. As shown in FIG. 21, tapered section 291 forms a step down from the larger diameter main section 288 to recessed section 290. Tapered section 293 provides a step up from recessed section 290 to tip section 292. Tip section 292 is shown as being generally cylindrical except for a concave front tip extremity 294 which is designed to provide a solvent pocket by way of fluid surface tension. The solvent pocket preferably defines an open volume for storage of 0.5 ml of solvent. The depth and/or length of the recess can be increased or decreased or shifted back or forward in position as it provides a solvent source for maintaining wetting in the general flow of solvent and need not be precisely positioned with respect to a particular portion of the mixing chamber as in the prior art.

Tip section 292 is preferably of the same diameter as main section 288 (or same external periphery if a non-cylindrical shape is involved which is true for other components of the present invention, as it is axial movement which is of importance). Further, while the inclusion of a recessed section in the purge rod (such as recess section 290) is preferred, a non-recessed, purge rod having a common diameter over its entire length or other variations are also contemplated in the present invention.

FIG. 25 shows purge rod 268 received within passageway 230 in mixing chamber defining member 218 in a non-interference fit relationship along the purge rod's entire length (i.e., the non-interference fit is not limited to recessed section 290, but includes tip section 292 and main section 288). In the context of the present invention, a non-interference fit includes, from the time of original assembly or manufacture, a predetermined clearance space of at least 0.0005 and preferably 0.0005 to 0.005 of an inch, with the spacing more preferably being 0.001 to 0.003 of an inch, and even more preferably, 0.002 to 0.003 of an inch. To seal off the area provided by the non-interference fit from chamber 188 while still allowing for relatively low friction reciprocating action between purge rod 268 and mixing chamber defining member 218 which is preferably stationery at the time, seal 266 is provided near the rear opening of passageway 230. A suitable material for seal 266 includes the above mentioned elastomeric or conforming plastic material.

With reference to FIGS. 7, 18, 19 and 25, back cap piston 296 includes front ring flange 298, rear ring flange 300 and intermediate seal groove 302. Set within intermediate seal groove 302 is O-ring seal 303 which provides a rear seal to the piston chamber 190. Retainer clip 304 is positioned rearward of back cap piston 296 and is partially received within circular spring clip recess 192 and partially extends radially within the interior of chamber 190. Clip 304 thus abuts the rear end of back cap piston 296 when pressurized air in the system forces back cap piston 296 into contact with clip 304. Back cap piston 296 typically retains this rearward position due to the frictional forces between seal 303 and chamber wall 278 and because there is typically no downward force acting on the back end piston 296. Spring clip 304 includes expanded end 306 with holes 308 for receiving an appropriate compression tool for removal during servicing. The expanded ends 306 also provide for removal by hand.

Figure 24:
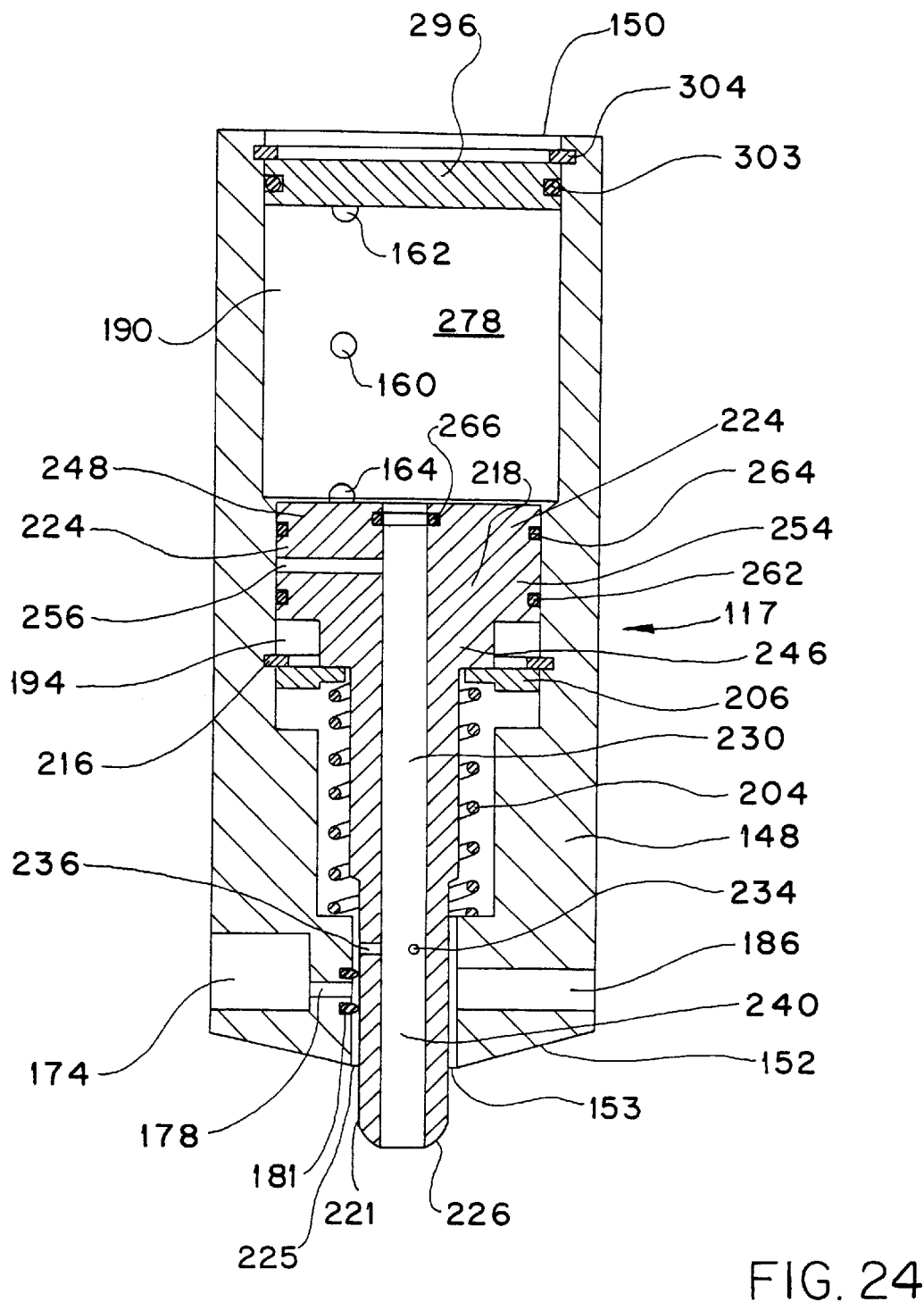
FIG. 24 shows a cross-sectional view of the dispensing apparatus in a stand-by or parked, non-dispensing position, with seals included, but the purge rod and purge rod piston not shown for added clarity.

FIGS. 24–27 show the relative positioning of the various components of dispensing apparatus 117, when in a dispensing position (e.g., foam mix and solvent flow) and when in a parked position (e.g., a solvent flow which preferably produces a slow drip). FIG. 24 illustrates dispensing apparatus 117 with purge rod assembly 268 removed for added clarity and with chemical on/off valves 168 and 170 not shown. FIG. 24 also illustrates mixing chamber defining member 218 in a non-dispensing parked state. While in the parked state, piston chamber 190 is in an unpressurized state (at least following the escape of any gas introduced to move the purge rod piston from its retracted dispensing state into the parked state). Because of the unpressurized state of piston chamber 190, return spring 204 is in an extended state which places cup-shaped, spring receiving member 206 into contact with retainer clip 216. As cup-shaped member 206 is in contact with cylindrical forward section 246 of mixing chamber defining member 218, member 218 is positioned such that its tip section 226 is in a retracted minimum extension state (if any extension at all) with respect to end 152 of main body 148. This minimum extension is represented by $L_1$ in FIG. 25 which can be, for example, a distance of ¼ to 1 inch, and preferably ½ of an inch. In this parked position, the rear end of the rear section's base 248 is positioned at the boundary between piston chamber 190 and intermediate cavity 194. The rear end of the mixing chamber defining members' base 248 is also positioned at the level of reciprocating piston air port 164 (e.g., about halfway between the forward and rearward edges of reciprocating piston air port 164).

In the parked position chemical injection ports 234 and 236 in mixing defining member 218 are positioned above the corresponding chemical internal passageways 176 and 178 formed in main body 148 and also above the level of shuttle valve seals 181, 183 (see FIG. 10) received within seats 180 and 182, respectively. Seals 181 and 183, which are represented by O-ring seals in this embodiment, are in a state of compression with respect to planar surfaces 221 and 223 (FIG. 14) of multi-sided elongated section 220 of mixing chamber defining member 218 such that they form a compression seal with respect to planar surfaces 221 and 223 at a location removed from chemical injection ports 234 and 236 (opening out at those same planar surfaces). In this way, the chemicals are being supplied to the dispensing apparatus are precluded from leaking out of passageways 176 and 178 further into the dispensing apparatus. Seals 181 and 183 are preferably formed of an elastomeric material or conforming plastic material such as TEFLON material and of a sufficient cross-sectional diameter to enable the seals to extend out away from seats 180 and 182 to provide a sealing function despite the presence of any spacing 225 provided by a non-interference fit relationship between main body 148 and the adjacent planar sections 221, 223. This O-ring material is also suited to withstand the shifting nature of mixing chamber defining member 218, and is able to sufficiently withstand or avoid completely any degrading effect that contact with a solvent might introduce.

Figures 43, 44, 45:
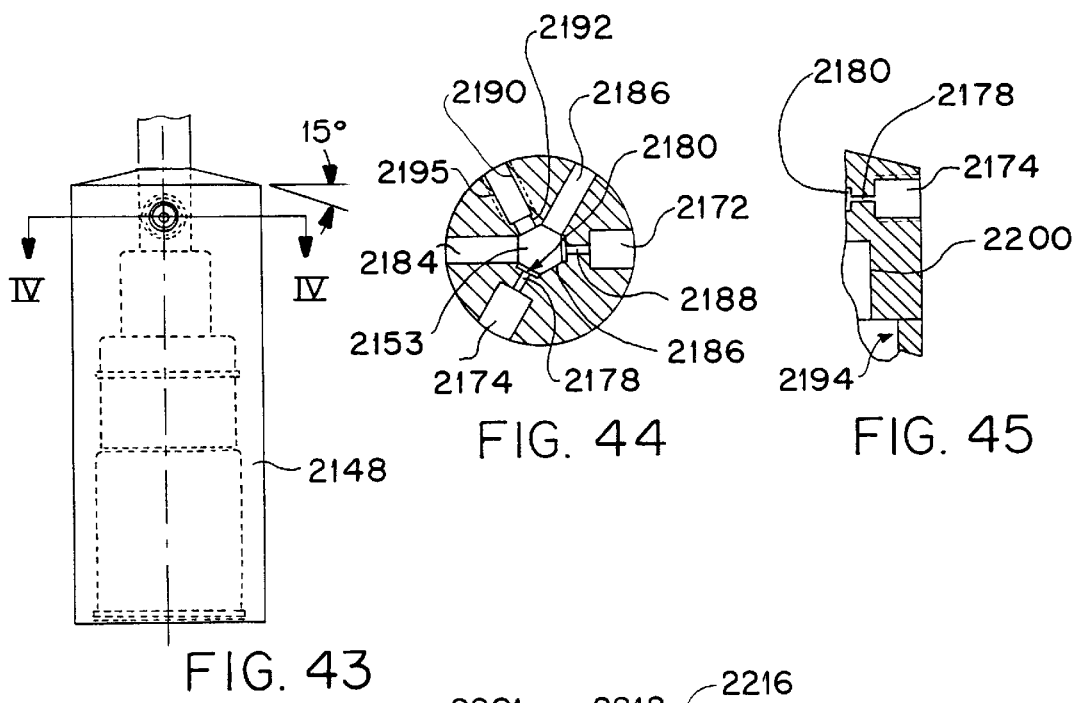
FIG. 43 shows a view of an alternate embodiment of the housing which is similar to that shown in FIG. 11.
FIG. 44 shows a cross-sectional view taken along section line IV—IV in FIG. 43.
FIG. 45 shows a cut away and cross-sectional view of the dispensing end of the housing shown in FIG. 43.

FIGS. 43–49 are directed at an even more preferred embodiment for providing the aforementioned shuttle valve function. FIG. 43 provides an elevational view of main body or housing 2148, which has the same features as that of its counterpart 148 in FIG. 11, except for the differences described below. One such difference can be seen in a review of FIG. 45 wherein threaded reception hole 2174 is concentrically arranged with respect to chemical passageway 2178 and seal seat 2180 rather than offset. This provides for greater ease in cleaning chemical passageway 2178 through access holes in hose attachments or through diametrically opposed access port 2186 (FIG. 44). A similar concentric arrangement thus also exists for seal seat 2186, chemical passageway 2188, access port 2184 and threaded reception hole 2172. Reference numbers 2200 and 2194 depict cavities similar to cavities 194 and 200 in the FIG. 8 embodiment.

An additional change in housing 2148 is illustrated in FIG. 44 which reveals threaded plug reception hole 2190 which opens into smaller plug reception hole 2192 with the two being separated by stop shoulder 2195.

Figures 46, 47:
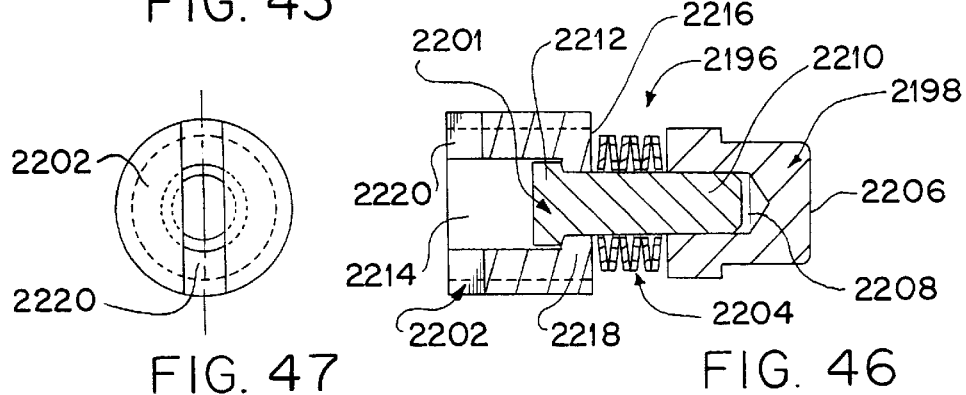
FIG. 46 shows a cross-sectional view of the plunger assembly for the preferred embodiment of the shuttle valve assembly of the present invention.
FIG. 47 shows an end view of the plunger screw component of the plunger assembly of FIG. 46.

FIG. 46 illustrates in cross-section plunger assembly 2196 which is received within reception holes 2190, 2192 formed in housing 2148. As shown in FIG. 46, plunger assembly 2196 is comprised of plunger 2198, plunger pin 2201, plunger screw 2202 and biasing means 2204. Plunger 2198 is preferably formed of aluminum with a smooth finished contact surface 2206 and receiving cavity 2208 on its opposite end. The non-expanded end 2210 of plunger pin 2201 is inserted into cavity 2208 in at least a friction tight fit. Plunger pin 2201 is preferably formed of DELRIN® plastic and the elongated, main body of the pin 2201 is inserted through small diameter hole 2216 defined by annular flange 2218 of plunger screw 2202. Plunger pin 2201 also has its expanded head 2212 received within larger diameter hole 2214 of plunger screw 2202 such that plunger pin 2201 is prevented from forward release out from plunger screw 2202. Biasing device 2204 is sandwiched between plunger 2198 and plunger screw 2202 so as to bias plunger 2198 out away from screw 2202 for the purpose described below. Biasing device 2204 is preferably comprised of three opposed pairs of Bellville washers. Plunger screw 2202 has a threaded exterior surface designed for threaded engagement with threaded plunger reception hole 2190. In addition, screw 2202 has notch 2220 formed in its rear end for receipt of a screw driver.

Plunger assembly 2196 is installed in housing 2148 by inserting assembly 2196 into reception holes 2190 and 2192 such that the end 2206 extends into multi-sided opening 2153 formed in housing 2148. Plunger assembly 2196 is moved into its desired position by screwing screw 2202 within hole 2190 preferable all the way forward until the screw abuts shoulder 2195. When plunger assembly 2196 is installed in housing 2148, plunger 2198 abuts against the adjacent exterior side wall of the inserted mixing chamber defining member such as that illustrated in FIG. 15. This abutment pushes the mixing chamber member into contact with seals received in seats 2180 and 2186 shown in FIG. 44 to be 120 degrees apart from each other and from the plunger. Biasing device 2204 is designed to have plunger 2198 exert a force of preferably 30 to 50 pounds against the side wall of the mixing chamber defining member which is suitable for ensuring sufficient seal compression to prevent leakage past the seals in seats 2180 and 2186.

Figure 48:
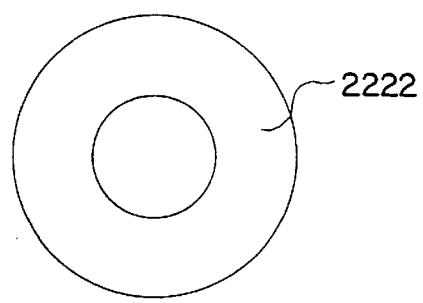
FIG. 48 shows a plan view of a preferred annular shuttle valve seal preferably formed of 25% glass filled TEFLON® material.
Figure 49:
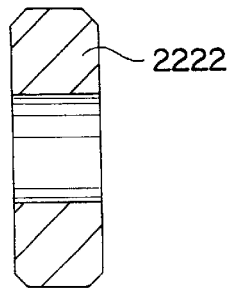
FIG. 49 shows a cross-sectional view of the annular seal shown in FIG. 48.

FIGS. 48 and 49 illustrate a plan and cross-section view of seal 2222 which is preferred for insertion in seats 2180 and 2186. Seal 2222 is preferably made of a material comprised of 25%glass filled TEFLON® material. This composition provides a low friction material having sufficient strength to withstand a large number of cycles under solvent contact without degrading. This material also provides a good sealing function particularly within the compression range provided by plunger assembly 2196 which compression levels are low enough to avoid any cold flow problem during the extended operating life of the seal. With reference again to FIGS. 24–27, radial solvent conduit 256 is shown axially intermediate the forward and rearward edges of intermediate portion 254 of the mixing chamber defining member's rear section 224. The axial length of intermediate portion 254 is designed to be sufficiently long enough as to allow solvent port 166 on main body 148 (see FIG. 8) to continuously feed solvent between the upper and lower O-ring seals 262, 264 and into passageway 256 in rear section 224 despite the shifting nature of mixing chamber defining member 218, which shifting nature is discussed in greater detail below. In the embodiment shown in FIG. 24 radial solvent passageway 256 is in a non-aligned relationship with solvent port 166 (not shown in FIG. 24 but port 166 is in alignment with ports 162 and 164 that are shown in FIG. 24), although various other arrangements are possible such as a direct alignment relationship.

FIG. 25 presents a view similar to FIG. 24 except for the illustration of purge rod assembly 268. FIG. 25 shows purge rod assembly 268 in a parked or stand-by state. In this state, piston 272 has its front face in contact with the rear face of mixing chamber defining member 218, with member 218 being an integral, monolithic unit as shown (but member 218 can also be an assembly of a plurality of interconnected components). In addition, purge rod 270 is received within passageway 230 formed in member 218 in the non-interference fit relationship described above. Seal 266, in addition to sealing of the area provided by the non-interference fit in the upper region of the purge rod's elongated main section 288, also helps to center purge rod 270 therein. As also shown in FIG. 25, while in the stand-by state, purge rod 270 has the lower or forward most end of its tip section 292 in horizontal alignment with the forwardmost edge of mixing chamber defining member 218 representing the discharge opening. Other arrangements are also possible, however, such as the tip member extending a distance of, for example, up to 5/16 of an inch away from a horizontal plane lying flush on the discharge end of member 218.

Figure 26:
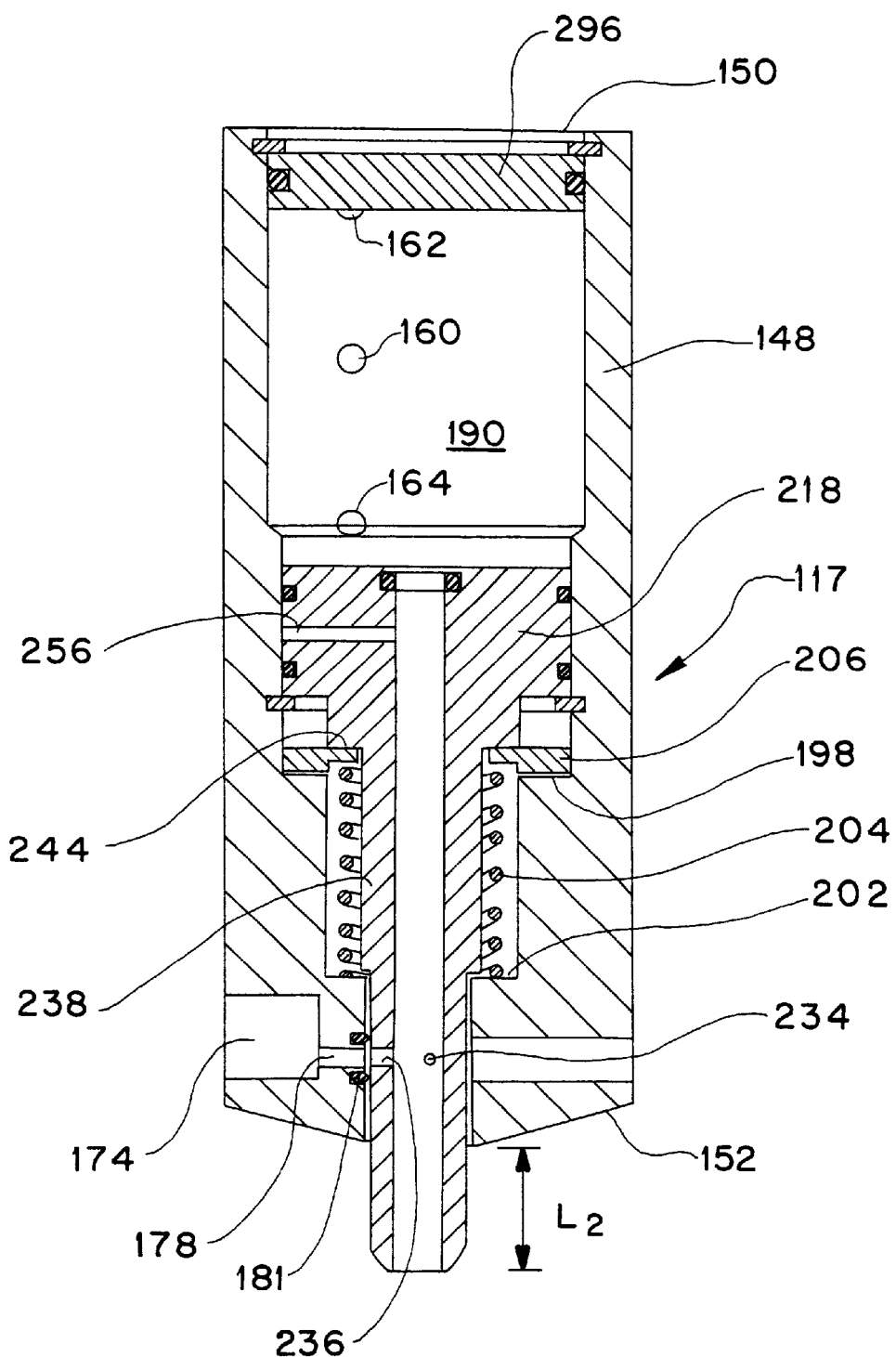
FIG. 26 shows a cross-sectional view similar to that shown in FIG. 24 except that the mixing chamber is shown in the dispense mode.

FIG. 26 is a view similar to FIG. 24 (purging rod assembly not shown for added clarity) except for the mixing chamber defining member 218 being in a dispensing mode position. Upon activating the appropriate dispensing mode switch (e.g., a switch such as 144 in FIG. 5 or a handle trigger for a non-mounted gun dispenser), a pressurized gas at, for example, 100 psi is introduced through port 164. The gas pressure causes a shift (axially downward in the embodiment of FIG. 26, although other orientations for dispensing apparatus 117 are possible) in mixing chamber defining member 218 such that its forwardmost tip is placed a distance $L_2$ away from the forwardmost end of main body 148. The preferred length for $L_2$ is ½ of an inch with the shift being $L_2$-$L_1$ or 3/16 of an inch in a preferred embodiment. This shift in member 218 results in chemical injection ports 234 and 236 becoming aligned (i.e., sharing a common axial central line or essentially sharing a common central line) with internal passageways 176 and 178 (only the latter shown in FIG. 26) for precursor chemicals A and B.

The level of pressure provided by the gas introduced into port 164 is sufficient to compress spring 204 the same $L_2$-$L_1$ shift distance (or, for example, from a 50 lb. compression state to a 90–95 lb. compression state). The compressed nature of spring 204 provides a fail-safe feature in that if there is a break in or detachment of the line or some other problem leading to a loss of pressure, the mixing chamber defining member will be automatically returned to the park or non-dispensing position under the return action of spring 204. This avoids a continuous dispensing of foam product once a dispense switch is activated.

Chemical injection ports 234 and 236 are encompassed by seals 181 and 183 (or, more preferably, seals 2222 in combination with plunger assembly 2196) when in the dispensing position. The seals prevent leakage of precursor material external to mixing chamber defining member 218. Thus, seals 181 and 183 provide an on/off shuttle valve arrangement by a combination of their location and the shifting in position of mixing chamber defining member 218. As discussed above, the shifting of solvent passageway 256 during the shifting of member 218 does not preclude the introduction of solvent in the dispensing state as discussed in greater detail below.

Figure 27:
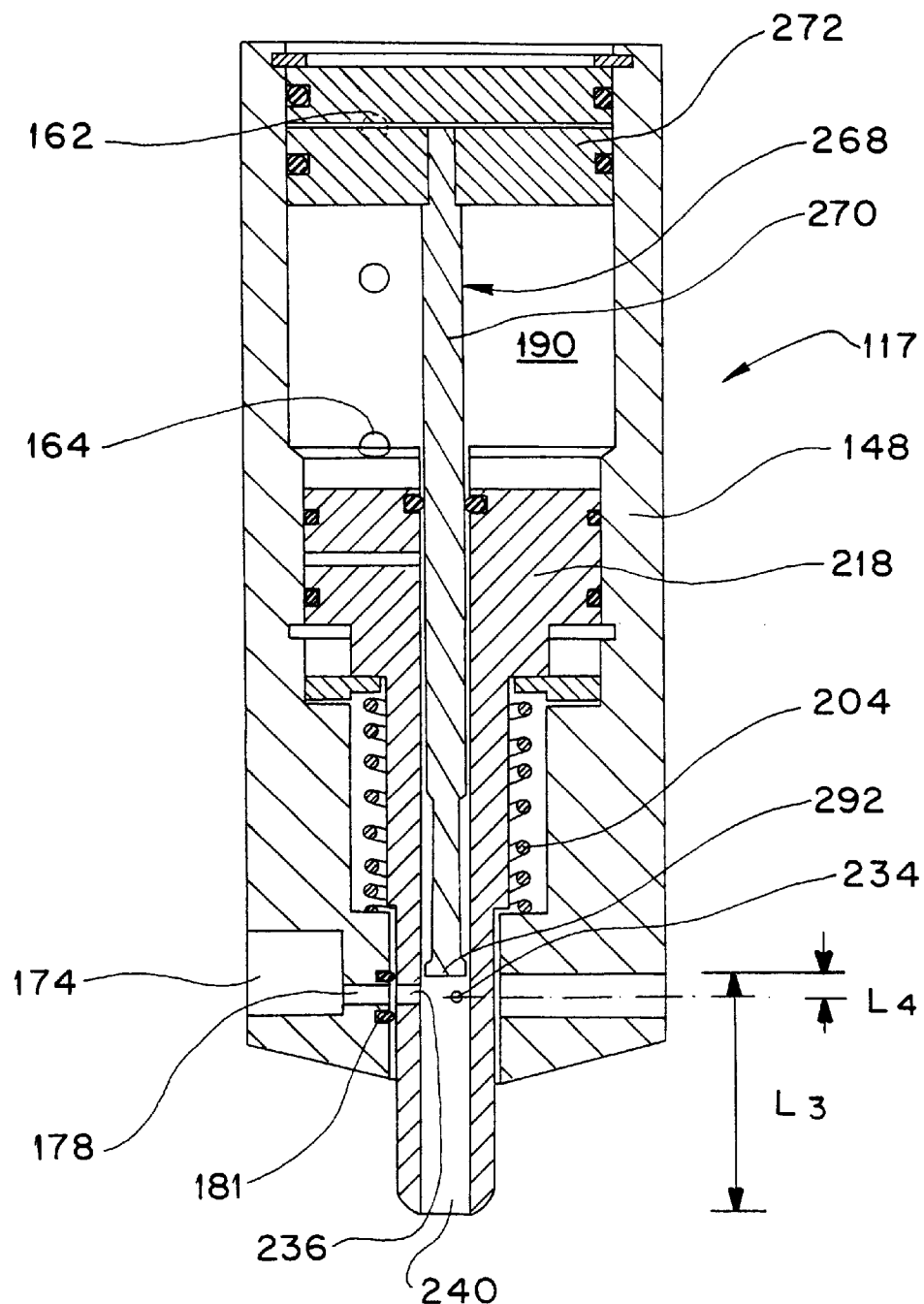
FIG. 27 shows a cross-sectional view similar to that shown in FIG. 26 except for the inclusion of the purge rod and purge rod piston.

In the dispensing state for mixing chamber member 218 shown in FIGS. 26 and 27, step shoulder 238 preferably is brought nearly into contact with spring bottom receiving shoulder 202 of main body 148, so as to leave a small clearance space. In the dispensing state, preferably the forwardmost face of cup-shaped member 206 is placed in contact with shoulder 198 of main body 148 so as to provide an added degree of surety as to the proper level positioning of chemical passageways 234 and 236 with respect to passageways 176, 178 despite any variation over time in the spring force.

FIG. 27 is a view similar to FIG. 26 except for purge rod assembly 270 (which can be a monolithic unit instead of the multi-component device shown) being shown in the dispensing mode position for the dispensing apparatus 117. At the time of introducing pressurized gas through port 164, in addition to the aforementioned downward shifting of mixing chamber defining member 218, piston 272 is shifted in an opposite direction as the pressurized air is introduced between the rear face of member 218 and front face of piston 272. The upward shifting of piston 272 results in a corresponding shifting in purge rod 270 such that purge rod tip 292 moves from a level essentially commensurate with the forwardmost tip of member 218 to a position rearward of or commensurate with chemical injection ports 234, 236. The shifting distance of purge rod tip 292 is depicted by length $L_3$ which is 1.25 inches, for example. The distance $L_4$ shown in FIG. 27 represents the distance the forwardmost edge of tip 292 is rearward of the rearwardmost edge of introduction port 236. Distance $L_4$ is preferably 0 to 0.25 of an inch.

In operation, there is a shifting sequence for piston assembly 270 and mixing chamber 218. When foam is to be dispensed, the pressurized air is introduced and piston assembly 270 is shifted back first and then, as the air is further introduced and while the piston assembly is retained in its rearwardmost position, the mixing chamber defining member 218 is forced forward against the biasing force of spring 204 into a dispensing position. Upon shifting from the dispensing state back to a parked state, the pressure arrangement is changed. For instance, pressure in chamber 190 is relieved through port 164 such that spring 204 forces mixing chamber member 218 into a parked position wherein shuttle valve seals 181 and 183 (or 2222) prevent further chemical flow. Pressurized gas can then be introduced through port 162 to force purge rod assembly 269 into a forward parked position. Accordingly, the preferred sequence in a dispensing cycle is to have the purge rod first move from its parked position into a rearward, dispensing position followed by the mixing chamber member moving from its parked position forward into a dispensing position. However, upon completion of dispensing, the mixing chamber member 218 is the first to return to a parked state while the purge rod assembly follows behind. That is, at the end of dispensing, it is the mixing chamber member which is first to shift back into a non-dispensing, shuttle valve closed state. The solvent wetted tip and solvent pool of the purge rod efficiently work on the mixing chamber at a time when the chemicals are not flowing. Moreover, unlike the prior art, when the purge rod of the present invention is in its parked state, solvent is free to flow not only completely through the mixing chamber (as well as other areas) but at the same time also through the chemical inlet ports while the chemical is blocked by the seals of the present invention's shuttle valve assembly. The flow path of the solvent is described in further detail below with respect to FIGS. 28 and 29.

Despite the belief in the art that an interference fit, particularly at the front section of a purge or valve rod, was needed, not only for achieving complete purging of the mixing chamber forward of a retracted rod, but also to prevent the rearward leakage of the mixed chemical past the tip, much to the surprise of the inventors of the present application it has been discovered that an interference fit is not required under the arrangement of the present invention along the entire length of the purging rod including tip section 292. Under the arrangement of the present invention, there has not shown to be a problem of foam mix backflow past the non-interference fit purge rod tip and the mixing chamber has been kept clean of deposits despite the non-interference fit relationship between the periphery of the purge rod (including the tip section) and the wall defining mixing chamber 240.

The ability to maintain the mixing chamber and other portions of the dispensing apparatus free of blocking residue stems, at least in part, from the unique solvent flow, non-interference fit relationship of the present invention. As discussed below, a solvent flow is provided in the space provided by the non-interference fit which clearance space is pre-set to a minimum and maximum allowable clearance spacing, while taking into consideration the tolerance levels applicable in the production techniques (e.g., machining or molding) at the time of manufacture. This solvent flow, although allowing for the dripping out of solvent from the dispensing apparatus, is still able to use a small amount of solvent. For example, 0.1 to 1.0 ml or, more preferably 0.3 to 0.7 ml shot of CARBITOL™ solvent in each solvent supply cycle is considered suitable for operation under the present invention with such shots being provided by opening the aforementioned pressurized solvent supply system for 0.2 of a second, both just before dispensing (e.g., at the time a foam gun is fired) and just after return of the mixing chamber to the parked position. The range of 0.1 to 1.0 ml can be equated with about 2 to 15 drops of solvent per cycle. It is also helpful to provide an extended solvent flushing upon initial start up in the morning or extended periods of non-use wherein there is provided a three-second extended supply cycle (with 0.5 of a second=1 cc solvent supply).

Figure 28:
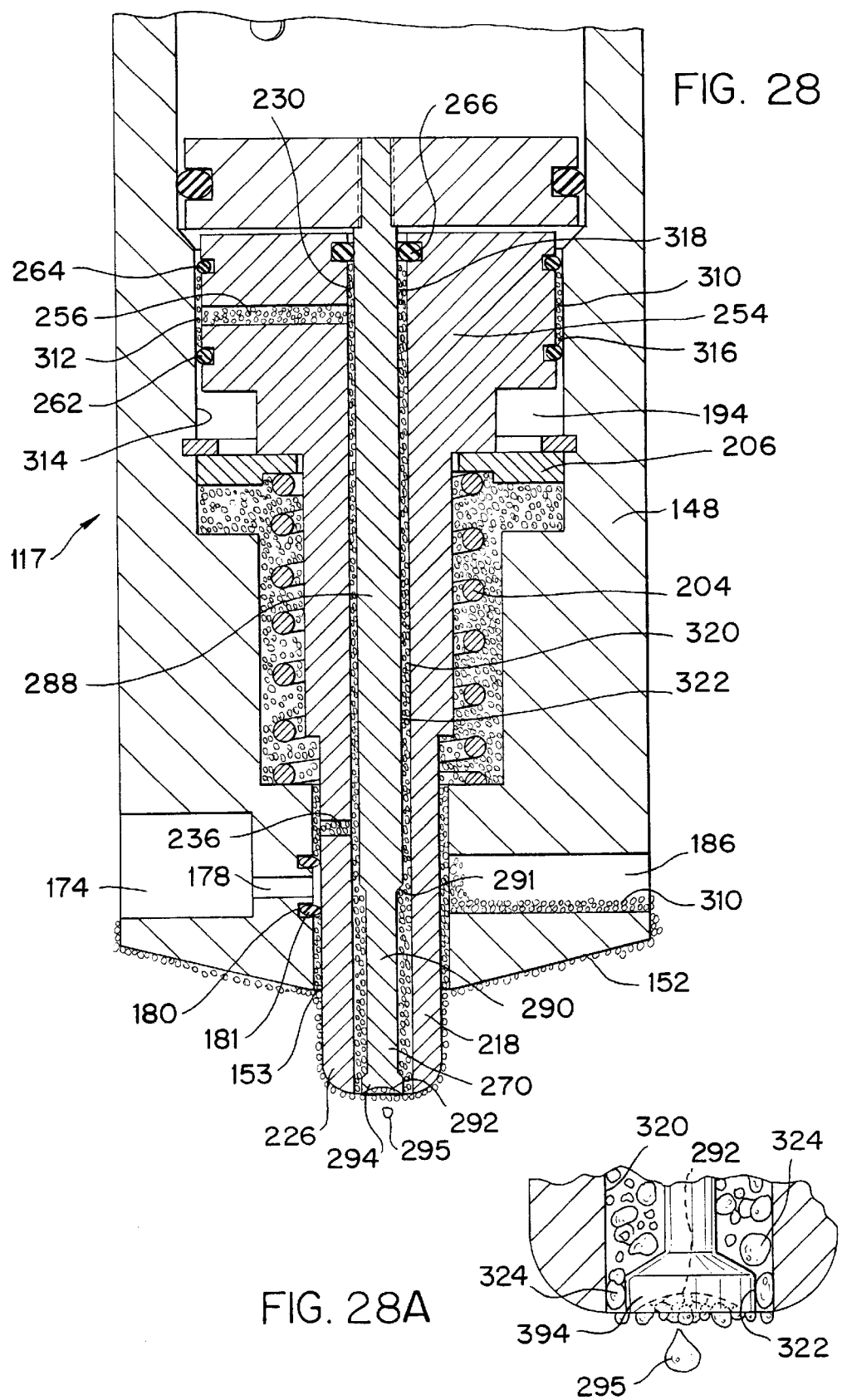
FIG. 28 shows an enlarged view of the dispensing end of the dispensing apparatus shown in stand-by mode in FIG. 25 together with an illustration of solvent flow.
Figure 29:
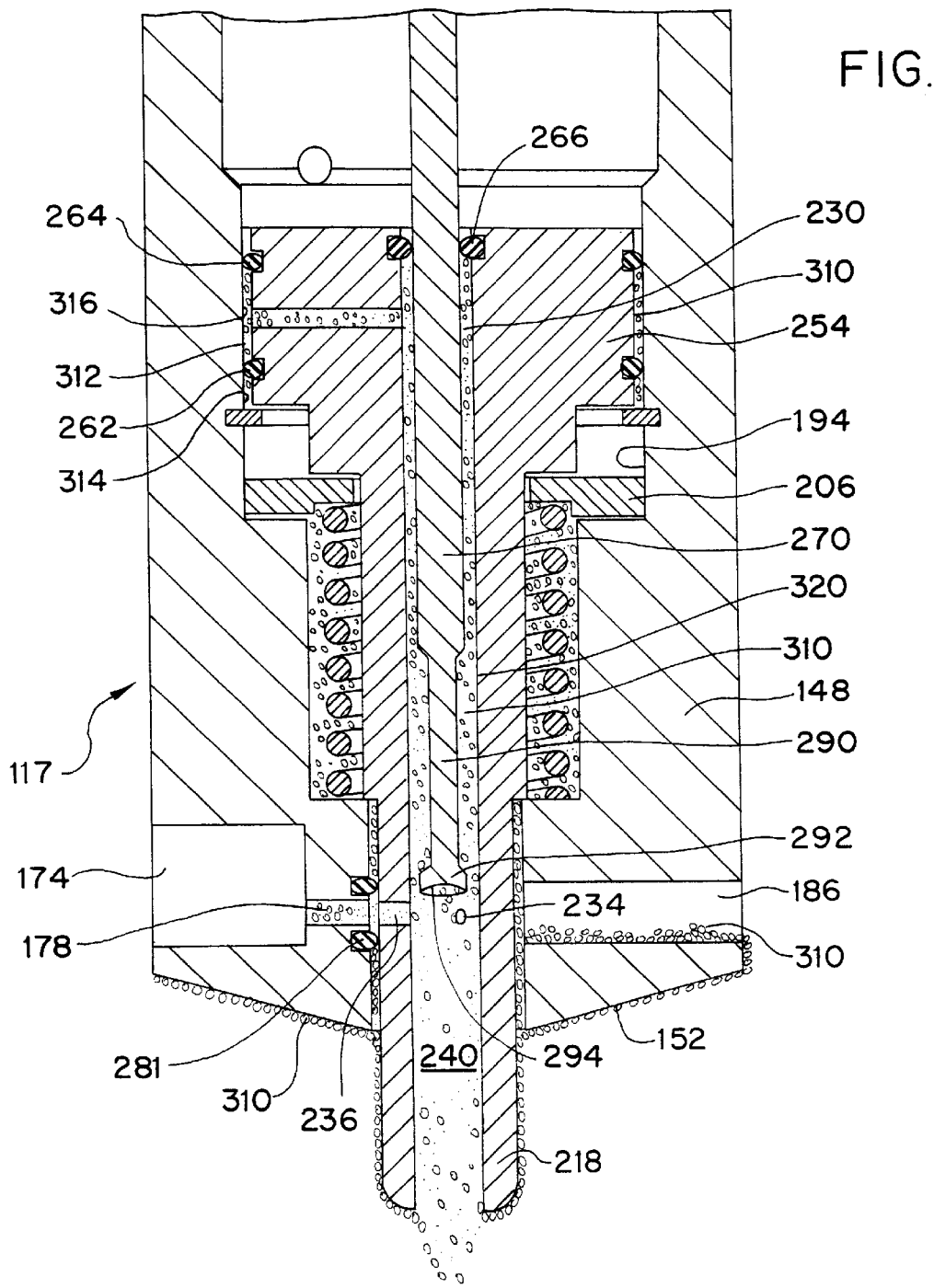
FIG. 29 shows an enlarged view of the dispensing end of the dispensing apparatus shown in the dispense mode in FIG. 27 together with an illustration of the introduction of the fluid precursor materials into the mixing chamber and the optional solvent flow at the same time.

FIGS. 28 and 29 provide an illustration of the solvent flow made possible by the non-interference relationships discussed above for both a dispenser park position (FIG. 28) and a dispenser dispensing position (FIG. 29). As can be seen from FIGS. 28 and 29, the solvent introduction can be made independent of the activity of foam dispensing. Thus, the solvent need not be limited to introduction when the purge rod is in one position or the other and there is provided great flexibility as to when solvent is introduced into the dispensing apparatus. For example, the solvent can be introduced prior to dispensing, during dispensing, after dispensing, or any combination thereof. As will become clear upon a review of the disclosure below concerning the solvent flow through the dispenser, a unique feature of the present invention lies in the ability to maintain all surfaces in the dispenser which could come in contact with mixed foam precursor material wetted with solvent in a continuous fashion. Accordingly, the solvent flow arrangement of the present invention acts to prevent even the start of a build up of mixed foam precursor residue and also acts to flush the system in its providing for travel of solvent from its introduction port through one of the many possible flow routes and eventually out away from the tip of the dispensers.

FIG. 28 illustrates the solvent flow when dispensing apparatus 117 is in the aforementioned parked or stand-by state. The solvent 310 is depicted with small circles solely for the purpose of helping to visually differentiate the liquid solvent from the structural components of the dispensing apparatus within which it flows, although in one preferred embodiment small microspheres or particles are added into the solvent for added flow control purposes. "Solvent" as used in the context of the present invention can mean a solvent material alone or a combination of materials of which a solvent material is a major part. The solvent of the present invention is any solvent which has the capability of lessening the likelihood of mixed chemical build-up (either by way of precluding a reaction from taking place in the areas of concern, dissolving components reacted, or both). A relatively low viscosity liquid (0.05 poise at 20° C.) such as diethylene glycol monoethyl ether (CARBITOL™ solvent) has shown in field testing to provide satisfactory solvation at 1.0 ml/per cycle. It is expected by Applicants that this amount can likely be lowered significantly (e.g., a 0.25 to 33 ml/cycle range down to 0.2 ml/cycle) while still providing a high level of dispenser performance. While the force level requirements of the present invention are so low as not to require lubricants in the solvent supplied, petroleum and non-petroleum based lubricant formulations can be included in the supplied solvent for the added lubricating benefits and possibly for added wetting and extended maintenance of surfaces in a wetted state. These lubricants include, for example, lithium complexes and glycerol complexes. Typical solvents used in other polyurethane chemical dispensing environments (i.e., dibutyl ester, gamma butyrolactone, tripropylene glycol monomethyl ether) also can be used in the present invention. The solvent can also include, for added flow control purposes, solid particulate matter or hollow thermoplastic microspheres such as Expancel® thermoplastic particles made available by Nobel Industries Sweden. Various fumed silica and/or polyamide thixotropic agents may also be added to substrate solvents to satisfy the metering means of solvent bathing.

The solvent supply means of the present invention (discussed in greater detail below) features a means for supplying solvent (see for example, FIG. 42 discussed below) to solvent port 166 formed in main body 148 (FIG. 9). Solvent 310 then flows through solvent port 166 into solvent initial supply area 312 which, in the embodiment shown in FIG. 28, is a cylindrical sleeve-shaped area having upper and lower limits defined by seals 262, 264, an external side limit defined by wall 314 defining intermediate cavity 194, and an internal side limit defined by the external surface 316 of intermediate portion 254. The spacing provided between surfaces 314 and 316 is preferably about 0.025 of an inch. The vertical spacing between the upper and lower seals is preferably about 0.315 of an inch. While specific examples of lengths and spacing are provided herein for purposes of illustrating preferred embodiments of the present invention, these specific dimension discussions are not meant to limit in any way the features of the present invention not disclosed or suggested in the prior art.

From initial solvent supply area 312, the solvent 310 flows through radial solvent passageway 256 (having, for example, a 0.062 inch diameter) into non-interference fit area 318 having an exterior surface represented by wall 320 defining passageway 230 formed in mixing chamber defining member 218 and an interior surface defined by the adjacent exterior surface 322 of purge rod 270. The concentric spacing between these interior and exterior surfaces is preferably about 0.0005 to 0.005 of an inch, and more preferably about 0.001 to 0.003 of an inch.

Both elongated main section 288 and tip section 292 preferably have the same diameter such that the concentric spacing at these two locations of non-interference fit area 318 is equal, although variations between the two are also possible as long as the purge and solvent flow functions are sufficiently available to carry out the purposes described herein for the present invention. The non-interference fit spacing 318 is also preferably maintained constant despite changes in the mixing chamber size such as from a ³⁄₁₆ inch to a ⅜ or ½ inch diameter mixing chamber 240 (and passageway 230).

The solvent is prevented from flowing upwardly out of intermediate portion 254 by way of seal 266. Solvent 310 also flows down along elongated main section 288, whereupon it flows radially out through ports 234 and 236. This arrangement is particularly advantageous in that it is ports 234 and 236 which are difficult to maintain clean in the prior art systems and it is the partial blockage of these ports which results in deviation from the proper mixing ratio and the requirement for complicated and expensive sensing and adjustment means in the chemical supply means. Also, it is the obstruction of these ports in the prior art dispensing system that prevents a consistent quantity of output between the time of initial use until the time the dispenser fails. Also, the presence of the solvent film along the exterior of the rod also helps avoid cross-over due to, for example, leakage in an upstream chemical precursor valve.

Once external to ports 234 and 236, solvent flows upwardly within spring reception cavity 200 and into the lower portion of intermediate cavity 194. The upward flow is limited by the sealing effect provided by the spring biased cup-shaped member 206 abutting shoulder 244 of member 218. Solvent also flows downwardly and externally about seals 181 and 183 provided in Brings seats 180 and 182 formed in main body 148. If a plunger assembly is relied upon, although not shown, the susceptible portions of the plunger assembly would also be wetted with solvent. Just as shuttle valve seals 181 and 183 (and 2222) prevent the in flow of chemical precursors while the dispensing apparatus is in the parked state, these seals also prevent the solvent from flowing into internal passageways 176 and 178. The spacing between the exterior of multi-sided front section 220 of mixing chamber defining member 218 and the interior of the multi-sided wall of main body 148 defining multi-sided opening 153 is also preferably a non-interference fit (e.g., 0.0005 to 0.002 of an inch). Thus, the solvent flows downwardly out of opening 153 and, by way of fluid surface tension, travels along the outwardly extended portion of multi-sided front section 222, along tip section 226 down to the edge defining the discharge opening of mixing chamber 240.

While some solvent travels out through chemical injection ports 234 and 236, solvent also continues to flow down between the parked purge rod 270 and the parked multi-sided front section 220. This "internal" flow joins up with the "external" flow passing along the exterior of tip section 226 of member 218. In this way, all of the typically problematic, interactive areas of the dispensing apparatus are bathed in solvent. Thus, the solvent acts to maintain these components clean of the resultant chemical mix. As all applicable surfaces stay free of build up, the prior art problems of purge rod sticking with associated added motive force requirements, obstruction of passageways with associated inconsistent and lowered output, difficult servicing due to the build up of the adhesive mixed foam precursor material, limitations on throughput due to limitations on mixing diameter size because of the scraping, interference fit relationship, etc., have all been solved under the present invention.

In a preferred embodiment, a five-gallon canister of solvent is provided to supply the necessary solvent at a slow rate (e.g., 1–15 drops released from the tip of purge rod 270 every 2 seconds). The aforementioned drops of solvent are released periodically after fluid accumulates in concave tip extremity 292. By manipulating the relative spacing arrangement between the internal and external flow paths so as to change the pressure in each, it is also possible to adjust the amount of solvent passing through each. This manipulation also involves the positioning of the purge rod recess below or forward of the mixing chamber's chemical inlet ports to prevent too much of the flow being directed along the purge rod as to not provide sufficient flow through the chemical port 234, 236. However, as the size of the mixing chamber is scaled up together with the chemical inlet ports (with the interference fit spacing staying the same) a change in positioning of the recess further upward along the rod may be helpful in providing the appropriate pressure differential to provide the proper flow through each of these solvent flow branches of the overall solvent flow system.

FIG. 28A illustrates in greater detail the accumulation of fluid by surface tension in concave tip extremity and the release of an accumulated solvent drop 295. FIG. 28A also illustrates the introduction of microspheres or particles 324 into the solvent. For example, particles 324 having a diameter of about 0.002 are added to solvent. The size of particles 324 is chosen so as to be similar in size as the clearance between purge rod 270 and mixing chamber 240 to provide an added degree of flow control. Thus, under the arrangement illustrated in FIG. 28A involving the use of added particulates to the solvent, there is provided an added degree of freedom to design the non-interference spacing even larger so as to facilitate rapid reciprocation and large solvent quantities in the areas needed. A more viscous solvent material can also provide added solvent flow control. Also, when the particulate material added into the solvent has a certain degree of compressibility, then the size of the particulate material can be larger than the spacing with the degree of compressibility taken into consideration (note the compressed nature of the particulate material passing past tip 292 in FIG. 28A). Particles contemplated for use in the solvent include solid particulate matter or hollow thermoplastic microspheres such as Expancel® thermoplastic particles made available by Nobel Industries Sweden. Various fumed silica and/or polyamide thixotropic agents may be added to substrate solvents to satisfy the metering means of solvent bathing.

As noted, access ports 184, 186, in addition to providing access to seals 181, 183 (and 2222), also provides for the passage of solvent radially outward to the exterior of housing down along at least a portion of surface 152 down to the exposed end of member 218. Also, the recessed section 290 of purge rod 270 provides an added amount of clearance between purge rod 270 and the wall defining mixing chamber 240. This allows for added accumulation of solvent as the solvent flows through the system to provide a film or coating on the areas of the dispensing apparatus previously prone to clog or have foam residue accumulation problems. As shown in FIG. 28 and as noted above, tapered step 291 of recessed section 290 is preferably placed below the outlet of chemical injection ports 234 and 236 to provide additional incentive for solvent 310 to travel radially out through ports 234 and 236. That is, if the larger flow area provided by recessed section 290 was directly across from the ports 234, 236 then the pressure differential between the two paths would result in little flow passing through ports 234, 236 and externally out away therefrom. The recessed area provides an added solvent reservoir of, for example, 0.5 ml, for helping in maintaining a continuous supply of solvent to all applicable surfaces even for extended periods of non-use.

To maintain a constant wetting by solvent even during particularly long periods of non-use, control unit 146 can also automatically trigger a periodic, brief activation of the solvent supply means to supply solvent intermittently over the long periods of non-use.

FIG. 29 shows an enlarged, cut-away view of dispensing apparatus 117 in the dispensing mode shown in FIG. 27 with chemical precursors A, B and the solvent being simultaneously supplied through chemical injection ports 234, 236. As in the arrangement of FIG. 28, solvent 310 is fed to initial solvent supply area 312 formed between seals 262, 264 and between wall 314 and external surface 316. Initial solvent supply area 312 is supplied through the aforementioned solvent port 166 despite a shifting in position of intermediate portion 254. From initial solvent supply area 312, solvent 310 passes through radial solvent passageway 256 and into the non-interference fit area 318 formed between the exterior of purge rod 270 and wall 320 defining passageway 230. Seal 266 limits the upward travel of solvent, while the remaining introduced solvent travels downward in dispensing apparatus 117.

With purge rod 270 in its retracted position having tip 292 just above chemical injection ports 234, 236 and with the shuttle valve assembly, which is governed by seals 281 and 283 (or 2222), in its open/dispensing position, chemicals A and B are mixed in mixing chamber 240 to initiate foam dispensing. As seen by FIG. 29, while chemicals A and B are being introduced into mixing chamber 240, solvent also remains in the areas previously accessed while in the parked mode.

In the dispense position shown in FIG. 29, solvent also flows past tip 292 due to the non-interference relationship between tip 292 and the wall of passageway 230 and into the chemical precursor mix. The small quantity of solvent introduced does not appreciably degrade the foam mix into which it is introduced after passing past tip 292. Nor does the solvent film flowing on the exterior surface of the end of mixing chamber defining member and into the foam flow result in any appreciable degradation. Actually the leftover "exterior flow" provided by solvent flowing through access ports 184 and 186 and along tapered surface 152 of main body 148 can assist in avoiding build-up on exterior components during the dispensing operation wherein backsplatter is possible.

FIG. 29A shows a sequence of operation of a preferred embodiment of the present invention such as the dispensing system shown in FIG. 5. In FIG. 29A, a preferred sequence of operation of the dispensing apparatus of the present invention is designated by sequence points $S_0$–$S_{12}$. Upon first arriving on a shift, an operator provides an initial extended solvent flush cycle by providing, for example, a 3-second solvent supply cycle to provide about 6 ml of solvent to the dispenser. Following this, the dispensing system is well prepared to carry out a typical foam dispensing cycle. Upon initiation of a dispensing cycle (either triggered by a hand-triggered switch or by an automatic triggering means), sequence $S_1$ occurs wherein the purge rod is shifted (by way of, for example, the air pressure/piston shifting means described above) from the parked position shown in FIG. 25 to the dispensing mode position shown in FIG. 27. While the purge rod is traveling to its dispensing mode position or upon reaching that position, step $S_2$ occurs wherein the means for supplying solvent to the dispensing apparatus starts a solvent cycle (e.g., a 0.2 second cycle providing 0.25 to 0.33 ml of Carbitol™ solvent) to continue the slow flow of solvent in the dispensing apparatus ($S_2$). With the solvent supply cycle in progress, the mixing chamber 218 shifts from its parked position shown in FIG. 28 to its dispensing position shown in FIG. 29 ($S_3$). With the mixing chamber in its dispensing position and with the on-demand pump activated upon pressing the trigger, an uninterrupted or continuous flow of the desired quantity of chemicals A and B is introduced into the mixing chamber in step $S_4$ at the desired ratio. Activation of the on-demand pump is preferably coordinated by the control means with such that the timing of the shifting of the mixing chamber to a dispense position occurs simultaneously with the flow of pressurized chemicals reaching the mixing chamber. This avoids extra stress on the shuttle valve seals. Although not shown, solvent cycles can also be continued despite the presence of foam in the chemical inlet ports and mixing chamber. It is more preferable, however, to initiate solvent supply cycles at the time of initial triggering and upon return of the dispenser to a parked state.

Once the two chemicals come in contact in the mixing chamber, they are discharged immediately through the discharge outlet into the object to receive the foam ($S_5$). Following the introduction of the desired amount of chemical precursor material, the mixing chamber member is shifted to park so as to close off the shuttle valve seals and discontinue chemical introduction ($S_6$). The mix within the mixing chamber rapidly discharges following closing of the shuttle valves ($S_7$).

Following the return of the mixing chamber member to a parked state, the purge rod is then shifted back by way of pressurized air introduced into the dispenser housing's piston chamber ($S_8$). Another solvent flow cycle similar to the first 0.2 second cycle is then initiated following return of the purge rod to the parked state ($S_9$).

In a preferred embodiment involving the filling of a molding bag with the discharged mixed chemicals, the bag can then be removed for placement about an object to be protected, for example ($S_{10}$).

For subsequent dispensing cycles, reliance is placed on the solvent previously introduced to maintain the objects wetted until the next foam dispensing cycle (or until a time determines that a rewetting operation is needed during extended non-use periods in the foam dispenser). The pool of solvent in the recessed area of the purge rod is helpful in maintaining by way of capillary flow, for example, the wet state in all relevant surfaces of the dispenser.

As noted earlier, the introduction of a fluid film in place of the interference fit relationships relied upon in the prior art provides for the advantage of lower motive force requirements which allows for an increase in the mixing chamber volume and discharge opening area per a given rod driver force. Under the present invention, the mixing chamber diameter and corresponding discharge outlet can be made many times the size of the prior art, while using a similar level motive force and with the velocity output being the same. With the output velocity level fixed, any increase in the mixing chamber volume leads to a substantial increase in the foam throughput capability of the dispenser and a corresponding decrease in output time for a given volume of foam to be outputted.

As discussed above, the prior art systems overwhelmingly rely upon a 3/16 inch diameter mixing chamber discharge outlet and a chemical intake which produces on the first cycle a throughput of about 8 to 10 lb./min. with a velocity of about 80 in./sec. which is basically the maximum level of operation for these prior art systems.

Figure 50:
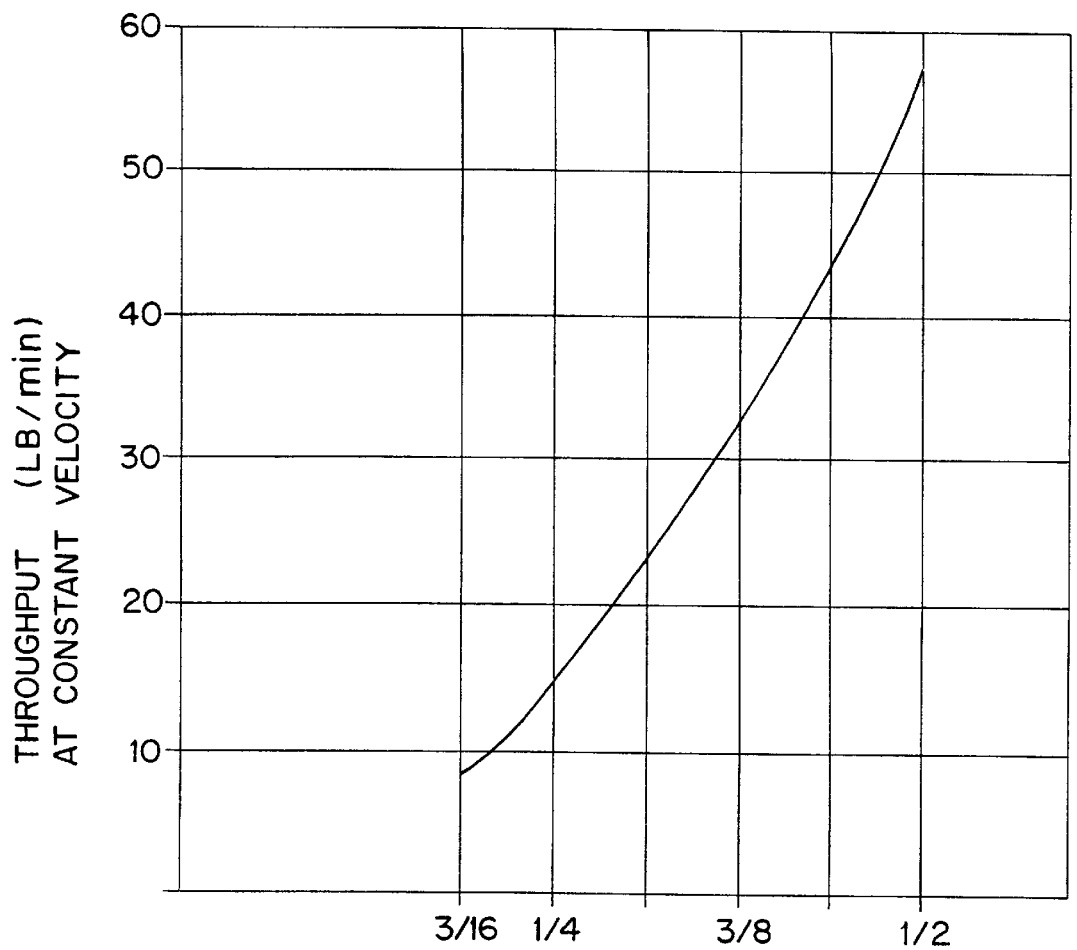
FIG. 50 illustrates foam throughput parameters for the present invention's dispensing apparatus with varying mixing chamber diameters and a constant velocity output.

FIG. 50 features a foam throughput vs. mixing chamber diameter graph with output velocity constant graph which helps illustrate the significant advantages made possible by the present invention, which allows for increased diameter mixing chambers due to the non-interference fit/solvent flow arrangements in the present invention.

As seen from the graph and incorporated adjacent table in FIG. 50, the step up in size from a 3/16 inch mixing chamber diameter provides nearly a twofold increase in output and thus nearly a halving in dispensing time, while a step up in size from a 3/16 inch diameter to a 5/16 or 3/8 inch diameter provides a four-fold increase in output and a quartering in dispensing time for a given foam volume output, and the ability to increase the diameter from a 3/16 diameter to an 8/16 inch diameter provides for over a seven-fold increase in throughput and a corresponding decrease in dispensing time. Thus, even without taking into consideration the inevitable decrease in output of prior art systems (e.g., 8 lb./min. down to 4 lb./min.) due to foam mix build up in the dispenser, the ability to use a larger sized mixing chamber diameter made possible by the present invention represents a substantial improvement over the dispensers in the field. In addition to increasing the output capability of a dispensing station, the present invention also helps in avoiding the problem of inadequate time to position the foam in its desired position before too much of it converts from a creamy mixed state to a solid foam state. With the ability to dispense the same quantity of foam as the prior art dispenser in nearly half the time or even less through the availability of larger sized mixing chambers, an operator has more time to place the foam in its desired position. For example, if the foam is dispensed into a bag for placement about an object (thus avoiding direct foam contact with the object), a reduction in the amount of time to fill a bag will have great advantages in providing more time for the operator to remove and place the bag before it becomes non-malleable. Under the prior art system operating at a maximum 8 lb./min., it would take roughly 1/8 of a minute or 7.5 seconds to dispense one pound of foam mix into a bag. If the average time for reaching solidification is 15 seconds for that particular foam, there is a limited window of 7.5 seconds for bag removal and manipulation. With the decrease in throughput over time problem in the prior art, a decrease down to 5 lb./min. would provide for only about a three-second window for removal and manipulation, which is not practical in most situations. Under the present invention, even if a 3/16 inch diameter mixing chamber is still utilized, the operation of the present invention would remain consistent such that the same 7.5 window would be available even after prolonged periods of dispenser use. With the breakthrough in the cap on mixing chamber diameter made possible with the arrangement of the present invention even a minor scaling up in size to a 1/4 inch diameter mixing chamber would provide about a 4 1/4 second dispense period leaving nearly 11 seconds for removal and manipulation.

Figure 30:
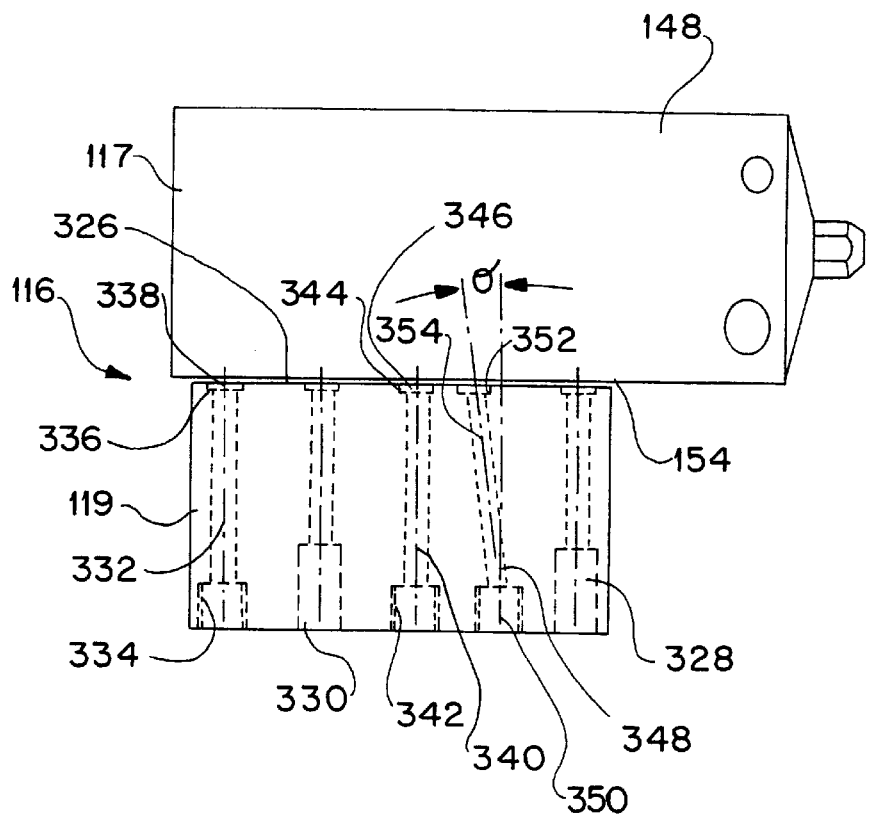
FIG. 30 shows a side view of a dispensing assembly comprised of the dispensing apparatus of FIG. 6 (with chemical feed lines and safety valves removed) and a mounting block for use in the dispensing system of FIG. 5.

FIG. 30 shows dispensing assembly 116 as including dispensing apparatus 117 together with mounting block 119 for use with a support stand. Mounting block 119 is attached to planar flat surface 154 of main body 148. FIG. 31A shows connecting end 326 of mounting block 119 which is placed flush against planar surface 154 and held in place by suitable bolts (not shown) received in countersunk holes 328 and 330. Holes 328 and 330 open out at surface 326 and are aligned with threaded holes 158 and 160 in main body 148 such that the inserted bolts can fasten mounting block 119 to dispensing apparatus 117. The length of the inserted bolts is not so long as to extend into hollow 188 of main body 148.

Also, mounting block 119 has first reciprocating gas conduit 332 with threaded attachment recess 334 formed at one end and O-ring seat 336 at the opposite end. Conduit 332 is positioned so as to have outlet end 338 in line with reciprocating piston air port 162 in main body 148. Similarly, second reciprocating gas conduit 340 includes threaded attachment recess 342 at one end and valve seat 344 at its opposite end surrounding outlet opening 346 aligned with port 164 in main body 148.

Figure 31B:
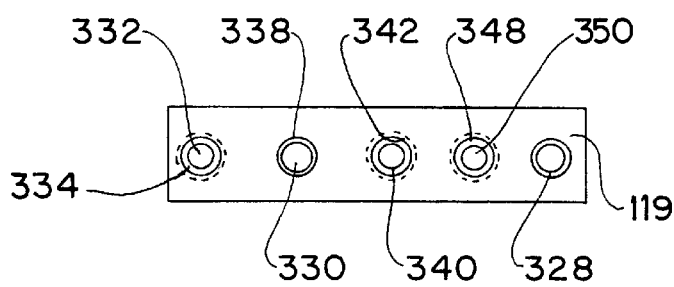
FIG. 31B shows the support structure connecting edge of the mounting block in FIG. 30.
Figure 31A:
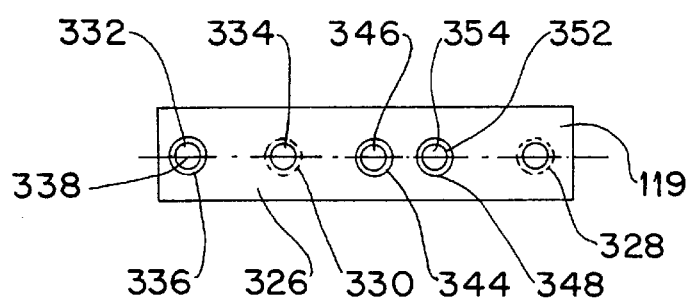
FIG. 31A shows the dispensing apparatus connection edge of the mounting block in FIG. 30.

FIGS. 30, 31A and 31B further illustrate solvent conduit 348 having threaded reception aperture 350 at one end and O-ring seat 352 surrounding its outlet end 354 at the opposite end. Between its threaded and outlet ends, solvent conduit 348 slopes upward at oblique angle $\Theta$(e.g., 5–15°). The outlet end of solvent conduit 348 is aligned with solvent port 166 in main body 144. The threaded reception holes in mounting block 119 are designed to receive a corresponding male fastener member (not shown) of pressurized air and solvent lines (not shown in these figures) extending from a supply source for the pressurized air and solvent.

While FIGS. 30, 31A and 31B are directed at a fixed, support mount dispenser, the present invention encompasses a plurality of different means for supporting a dispensing apparatus such as dispensing apparatus 117 shown in FIG. 30. For example, FIG. 32 shows an alternate embodiment of dispensing assembly 116 which is represented by reference number 116'. As shown in FIG. 32, dispensing assembly 116' is comprised of dispensing apparatus 117 and mounting block 356 in the form of a handle grip. Dispensing assembly 116' thus presents a hand-held gun dispensing apparatus which can be easily grasped, manipulated and activated by an operator. Dispensing assembly 116' can be supported, for example, in an operator's holster between usage.

As shown in FIG. 32, handle grip 356 has curved upper surface 358 designed to conform to the curved contour of main body 148. Grip 356 also features cavities 360, 362 at an upper end thereof and through which appropriate fastening screws or bolts can be inserted into threaded, corresponding holes formed in main body 148. Further, as in the earlier embodiment, dispensing assembly 116' includes reciprocating piston gas passageways 368, 370 with passageway 368 representing the gun opening air supply and passageway 370 representing the gun closed air supply. As shown, these passageways originate in a threaded reception hole provided on the side of gun block 358. FIG. 32 also illustrates similarly situated solvent introduction conduit 372.

Dispensing assembly 116' further includes trigger 374 which is pivotably mounted at pivot post 376 and in contact with plunger 375 which is biased by a spring or the like to its outward position. The squeezing of trigger 374 activates electric switch 377, which in turn triggers, via electrical lines 369 or the like, a central control unit similar to central control unit 146 described for the support stand system 100 in FIG. 5. The control unit for the hand held gun can be provided in a wall mount or on its own rollable support stand also having the LCD display and desired parameter setting means described for system 100. This stand or wall mount thus has the various gas and solvent supply means attached to it and the solenoids or metering means described above for controlling the timing of the gas and solenoid flow. Suitable supply lines extend from the wall mount or stand and from the pump assemblies to the hand held gun. As in the other embodiment, the separately situated control unit for the hand held gun is also in communication with the pumps to provide the desired timing and amount of chemical A and B to the mixing chamber. Thus, a solenoid or the like opens and/or closes the appropriate passageways for the lines extending to the group 368, 370 and 313 of openings to carry out the foam dispensing and solvent feed cycles described above for the fixed mount dispenser assembly 116. The utilization of the electric switch as opposed to the standard spool valves utilized in the prior art provides for enhanced versatility in choosing the appropriate times for the solvent dispense cycle and the characteristics of the foam dispensing cycle. Various other triggers are also possible such as an index finger squeeze trigger, etc.

FIGS. 33 and 34 provide a front view and right side elevational view of an alternate embodiment (118') of support stand 118 shown in FIG. 5 with further laterally spread beams 132, 134. Support stand 118' includes pivotable, rollers or casters 136 connected to longitudinal beams 132 and 134. Platform 378 extends laterally between beams 132 and 134. Housing 379 is supported by platform 378 and features front face 380, side faces 382, 384 and rear walls 386 and 388 with interior edges 390, 392. The opening between rear edges 390 and 392 allows for access to an interior recess defined by housing 379.

Vertical support wall 122 extends transversely with respect to horizontal top plate 120 and includes air holes 390 and 392 and fastener holes 394 for receiving fasteners designed to hold blower guides 124, 126 (FIG. 5) in place. Alternatively, a key slot arrangement can be provided for a drop in place arrangement in the guides. Also, filters are preferably included to prevent the inflow of environmental debris into the bag. Vertical wall 122 also includes mounting block aperture 396 which allows the aforementioned air and solvent tubes to be passed through vertical wall 122 into engagement with mounting block 119.

Lateral slots 398, 400 are included in plate 122 and provide means for mounting in an adjustable, sliding fashion, bag support assembly 128 discussed immediately below.

Figure 35:
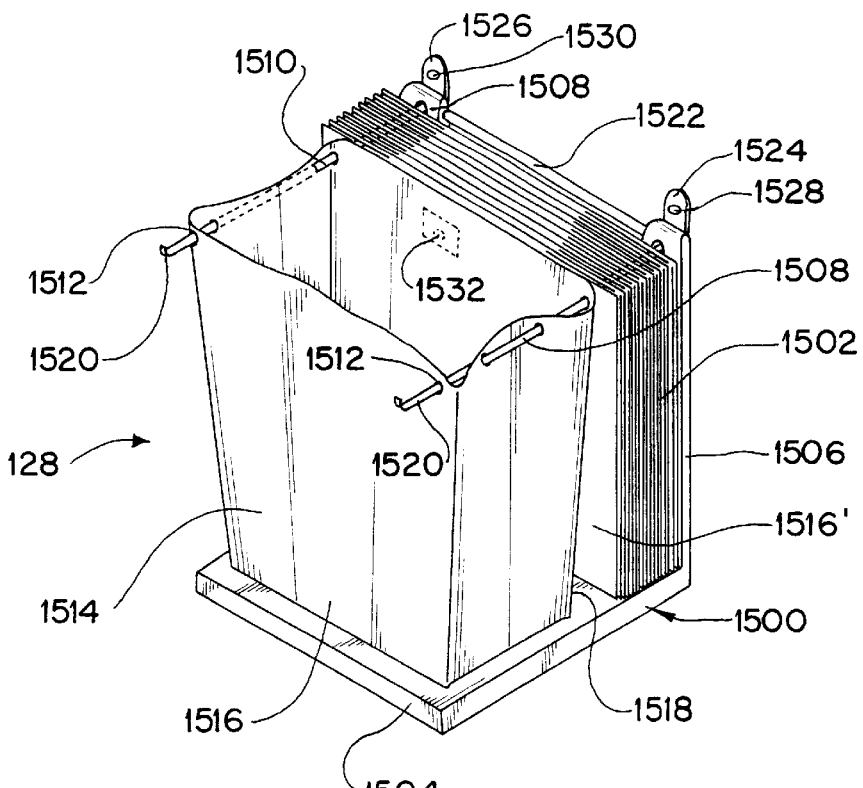
FIG. 35 shows a perspective view of a bag supply assembly.
Figure 36:
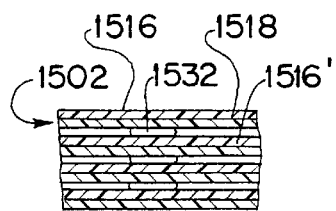
FIG. 36 shows a cut-away view of the bag stack with coupling means.
Figure 37:
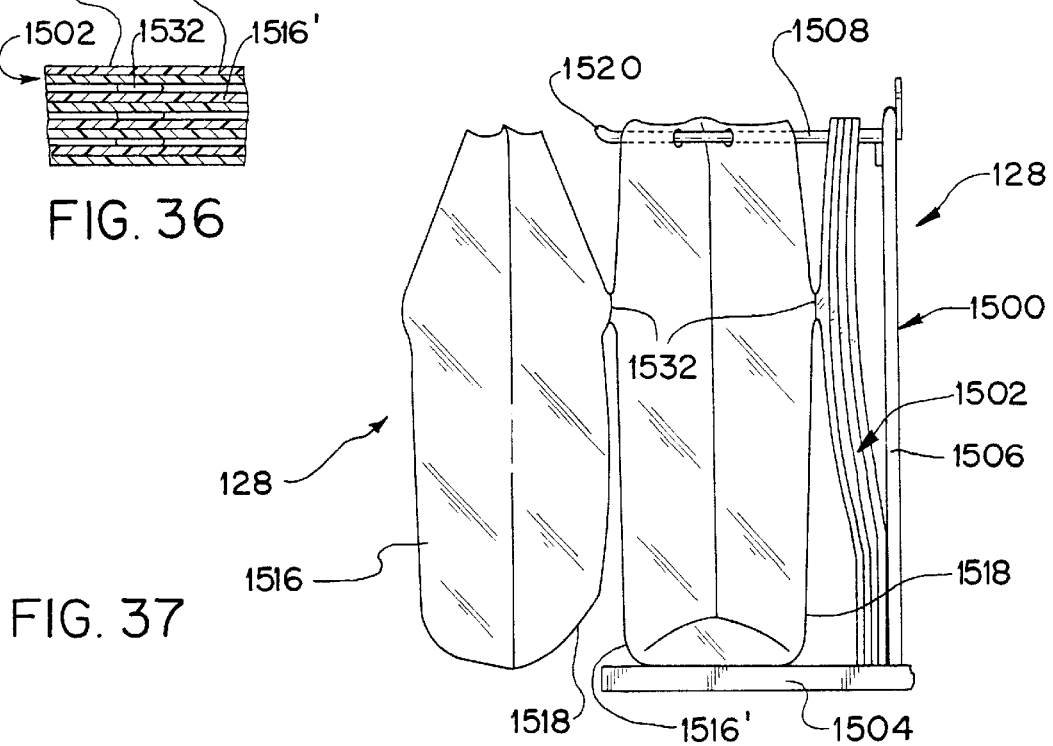
FIG. 37 shows a side elevational view of the bag assembly in FIG. 35 with bag nearly in a state of removal.

FIGS. 35–38 provide views of various bag support assemblies (128, 128' and 128") for use with the above described support stand. FIG. 35 provides a perspective view of bag support assembly 128 which includes support rack assembly 1500 and bag stack 1502. An example of a similar prior art bag support assembly is found in U.S. Pat. No. 3,380,579 which is incorporated by reference. Support rack assembly 128 in FIGS. 35 and 37 comprises base 1504 which is optional but useful from the standpoint of helping to support the bags and hold them in the proper position. Support columns 1506 and 1508 extend upwardly from the lateral extremities of base 1504. Extending outwardly from columns 1506 and 1508 are bag wickets 1508 and 1510, which are threaded through appropriate holes 1512 formed in individual bags 1514 of stack 1502. In FIGS. 35 and 37, pleated bags are illustrated with four holes on each side. Alternatively, non-pleated bags with holes on the front and/or back walls (1516, 1518) only can be relied upon. Wickets 1508 and 1510 preferably have an upturned free end 1520 for helping to avoid premature removal of the bags from the support wickets.

Extending between vertical support columns 1506, 1508 is horizontal, upper support bar 1522, which is provided for added structural rigidity.

FIG. 35 further shows fastener tabs 1524 and 1526 extending up from vertical columns 1506 and 1508. Tabs 1524 and 1526 include fastener holes 1528, 1530 through which suitable fasteners (not shown) can be inserted through slots 398 and 400 for releaseably attaching bag support assembly 128 to support stand 118. Alternatively, hook-shaped type fasteners alone can be used.

As particularly shown in FIG. 36 the back wall 1518 of an earlier bag in sequence is releaseably joined with the front wall 1516' of the next bag in sequence by, for example, adhesive patch 1532 (the prime designation in 1516' being used to show the latter in sequence front wall).

FIGS. 5 and 35 illustrates bag 1514 ready to receive foam dispensed from dispenser assembly 116 (as well as in a ready to catch dripping solvent position). An operator can thus immediately proceed with filling the bag with the desired quantity of chemical mix. Once the discharge of chemical mix into the bag is completed, the operator removes the filled bag. Because of the releasable coupling means provided by adhesive patch 1532 (or any other releasable attachment such as a heat bond, intermesh folding arrangement etc.), the removal of the filled bag draws the next bag in sequence into the appropriate open position, as shown in FIG. 37. When the next to be filled bag is in the proper position, it catches at the end 1520 of the wickets providing for the release of the releasable adhesive area or patch 1532.

Various other modifications are also contemplated in the present invention including the providing of a friction enhancing member at the end of wickets 1508, 1510 to facilitate the breaking of adhesion patch 1532.

FIG. 38A illustrates an alternate embodiment 128' of bag support assembly 128 that features bag stack 1534 comprised of individual bags 1536. The arrangement of FIG. 38 is similar to the arrangement shown in U.S. Pat. No. 5,020,750 which is also incorporated herein by reference. The arrangement shown in FIG. 38 feature bags with handles similar to that used in grocery stores together with the bag support rods passing through holes formed in the handles which handle bags such as that used in FIG. 38 can be used in the present invention but non-handled bags are preferred for non-interfering packing purposes.

FIG. 38B shows another bag support assembly 128" having hook like fasteners 1524' and 1526' which are preferably S-shaped for added clasping ability. Support assembly 128" is also free of a bottom plate as in the other embodiments and the supported bags 1536' have a different configuration than in the other embodiments in that they have a longer rear wall as compared to their front wall and the wicket members extend only through the rear wall extension and adhesive patch 1532' is placed sufficiently low enough on the rear wall to contact the lower height front wall of the next bag in succession.

FIGS. 39 and 40 illustrates blower guide 1538. Blower guide 1538 is attached to wall 122 of support stand 118 by inserting fasteners through holes 1540 in guide 1538 and the aforementioned holes 394 in wall 122 or through use of a slotted insertion technique (not shown). A second blower guide 1538 is similarly fastened over opening 392 (FIG. 33). Guide 1538 feature carried blower passageway 1542 extending from base 1544 which has an appropriate angle Z for directing air toward the center of a bag's top opening such as one bag supported by support assembly 1500. The bag can be used in combination with the aforementioned releasable coupling means or as a substitute therefor. When used in conjunction with releasable connecting means 1532, a suitable air blower can be activated to direct air through guides 1538 to keep a previously operated bag open. A filter is also preferably provided upstream of the outlet to avoid foam contamination.

FIG. 41 provides a top plan view of support stand 118. As shown in FIG. 41, interior recess 138 and rear gap 406 formed between interior edges 391 and 393, provide sufficient room for a canister of solvent, the location for which is shown by dashed circle 398. Top plate 120 also features conduit reception cavities 400, 402, 404 for the insertion of a solvent conduit as well as the pressurized air tubes for piston reciprocation.

FIG. 42, provides a rear view illustration of support stand 118 with solvent canister 406 contained within interior recess 138. Pressurized air tube 408 extends to solvent canister 406, which preferably holds five-gallons (a one year supply for typical usage) of the previously discussed solvent fluid. Extending away from canister 406 is solvent supply conduit 410 which is passed through aperture 402 in top plate 120. Supported on top plate 120 is solenoid valve 412 or some other metering means which is connected to the aforementioned control unit 146 (FIG. 5) such that the opening and closing of supply conduit 410 is controlled.

An additional segment 418 of solvent supply line 410 extends from the solenoid valve into the appropriate threaded aperture in mounting block 119 (mounting block 119 is mounted on the front of plate 122 and is aligned with aperture 396 in vertical plate 122). FIG. 42 also illustrates pressurized air lines 414 and 416 extending through apertures 400 and 404 and into respective solenoid valves 420, 422 or the like. Air pressure conduit extensions 424, 426 extend away from solenoid valves 420, 422 and have their threaded free ends secured in the corresponding threaded receiving ports formed in mounting block 119. As with the other electrical components in the system, valves 420 and 422 are linked with the control unit 146 (FIG. 5) which is also in communication with switch 144 to manipulate the dispensing apparatus into the dispensing or parked modes.

With reference to FIGS. 6 and 7, an explanation of the ease in which the present invention can be serviced is provided. When it is desired to service the present invention (e.g., a periodic replacement of seals); a servicer need only first ensure that valves 168, 170 are shut off and the remainder of the system shut down. The servicer then contracts and releases spring clip 304 with a suitable tool such as a needle tip plier tool or by hand. Once clip 304 is released the operator need only apply a relatively small amount of force, by hand or by way of a rubber mallet or the like, to the tip 226 of mixing chamber defining member 218 extending out from end 152 of main body 148. This force results in mixing chamber defining member 218 and all remaining components shown to the right of mixing chamber defining member 218 in FIG. 7 (i.e., piston rod assembly 268 and piston 296 and all associated seals) being removable from the open, rear end of main body housing 148. The threaded connection between purge rod 270 and piston 272 provided even added versatility in servicing.

If access to spring clip 204 and cup-member 208 is desired, then clip 216 can be retracted and removed in the same manner as spring clip 304, providing ready access to the spring and cup-shaped member, each of which have a central opening to be used in helping to withdraw those components.

If access to seals 181 and 183 (or 2222) is desired (see FIGS. 10 and 48), then an operator need only reach through the appropriate one of access ports 184 and 186 (after member 218 is removed) with a tweezer or tweezer-like device and pull off a preexisting seal and in reverse sequence, position a new seal in place.

If the entire dispensing apparatus is to be serviced or replaced, housing or main body 148 and mounting block 119 can be detached from vertical wall 122 and separated upon the withdrawing of the fasteners contained in holes 328 and 330 of mounting block 119 or by sliding the dispensing apparatus off from a slide slot capture arrangement.

Figure 52:
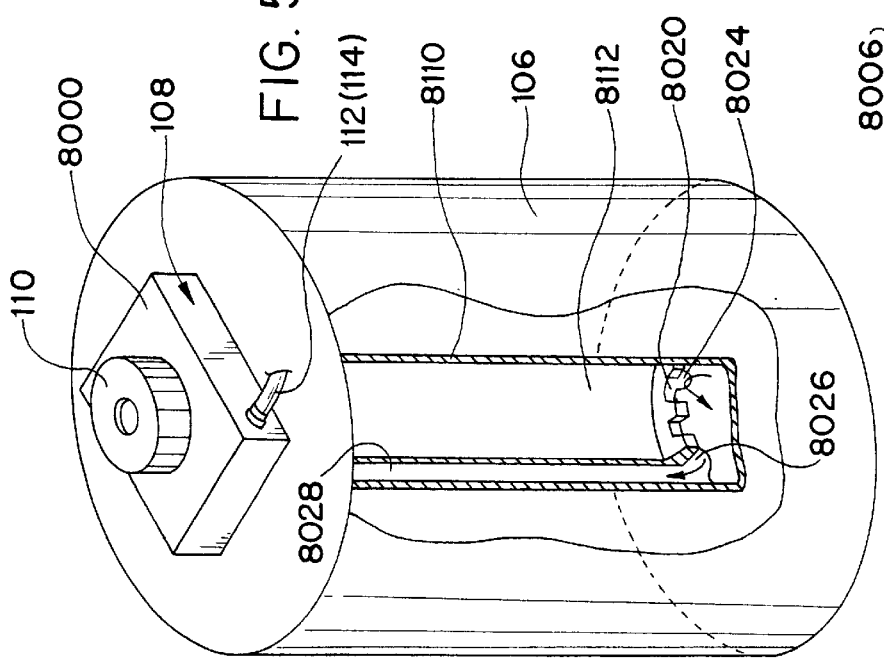
FIG. 52 shows a perspective cut-away view of one embodiment of a pump assembly for pumping a chemical to the dispensing apparatus via a heated conduit.

FIGS. 52–55 illustrate pump assembly 108 preferably featuring a gerotor pump 8110 or the like driven by motor 110 so as to pump blocks of foam through the system on demand. Motor 110 is preferably an AC motor that is readily activated upon receiving an electrical signal from an electrical control unit in the dispensing system or directly from a dispenser apparatus such as an electrical switch in a hand-held gun dispenser. The pump is thus rotated in a first direction to provide the desired block of foam material at the desired pressure and bleeds off pressure by rotating in an opposite direction. FIG. 52 shows both motor 110 and pump manifold 8000 supported on the top of chemical container 106. As the same pump assembly type is preferably used to pump both chemicals only one of the pair of pump assemblies relied upon is discussed.

Figure 54:
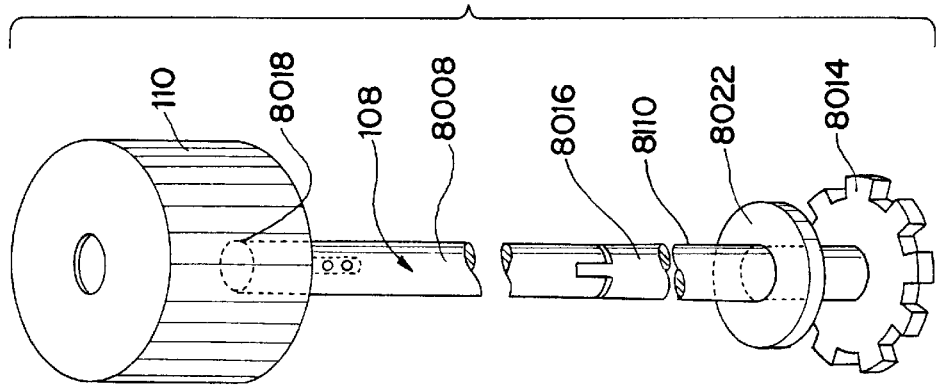
FIG. 54 provides an illustration of one embodiment of the driving motor and pump shaft and gear combination.

FIG. 52 shows in a somewhat schematic, cut-away fashion the pressure housing 8112 of pump 8110 (the pump's driving shaft and driving gear is not illustrated in FIG. 52 for added clarity as to the other components, but is shown in FIG. 54). Pressure housing 8112 extends down from manifold 8000 and is received within a suitable bottom recess 8002 (FIG. 53) provided in the manifold. Upper recess 8004 is provided on the top of manifold 8000 for receipt of motor 108. Intermediate aperture 8006 is provided between recess 8002 and 8004 and provides a passageway for drive shaft 8008 (FIG. 54) of pump 8110. The preferred gerotor or star pump embodiment of the present invention is available from, for example, Nichols/Portland Company of Portland, Me. The gerotor is a positive displacement pumping unit comprised of two main elements: an inner rotor and an outer rotor. The outer rotor has one more tooth than the inner rotor and has its centerline positioned at a fixed eccentricity from the centerline of the inner rotor and shaft. Although gerotors come in a variety of geometric configurations, materials, and sizes, all gerotor sets share the basic principle of having conjugately-generated tooth profiles which provide continuous fluid-tight sealing during operation. As the rotors rotate about their respective axes, fluid is drawn into the enlarging chamber to a maximum volume. As rotation continues, chamber volume decreases, forcing fluid out of the chamber. The process occurs constantly for each chamber, providing a smooth pumping action. A change in rotation speed in the rotors provides a change in the pressure output of the motor.

Figure 55:
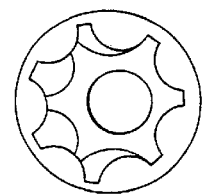
FIG. 55 shows schematic depiction of one embodiment of a gerotor pump driving and driven gear combination.
Figure 53:
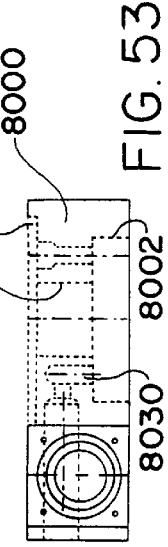
FIG. 53 shows a cross-sectional view of a manifold positioned between the AC motor on one side and the pump shaft and chemical container on the opposite side.

FIG. 55 illustrates a schematic depiction of the relative positioning of the rotor teeth whose function is described above. FIGS. 52 and 54 show inner rotor 8014 (which is the driving rotor in this embodiment) mounted on multi-sectioned shaft 8016 fixed at its upper end to driving shaft 8018 of motor 110. The outer rotor component 8020 of the gerotor pump is shown partially in FIG. 52 at the bottom of housing 8112 and is held in place and allowed to rotate through a bearing assembly or the like. Covering cap 8022 is positioned over both the inner and outer rotors in a sealed, volume limiting manner with respect to housing 8112. Chemical is free to travel into position in the larger volume portion of the intermeshing teeth through inlet opening 8024 whereupon it is subject to the pressure increasing, volume reduction cycle of the meshed gerotor rotors and released through outlet port 8026 whereupon the liquid chemical block flows through conduit 8028, through manifold 8000 to outlet conduit 112 (or 114 depending on which chemical container is involved). FIG. 53 illustrates the outlet passage 8030 provided in manifold 8000 which has threaded outlet 8032 for receipt of an end of conduit 112 (or 114).

Because of the versatility of a gerotor pump design, various other gerotor pump arrangements are also contemplated. For example, a hollow, multi-sectioned conduit having a general external shape similar to that of drive shaft 8008 in FIG. 54 receives internally a smaller multi-sectioned drive shaft/extension, which is fixed and extends off from the motor's drive shaft, down to the bottom of the conduit. The conduit is fixed in position with respect to a manifold similar to manifold 800 in FIG. 53 or to a top lid of the rotor chemical supply tank. One or more meshed assemblies similar to that illustrated in FIG. 55 are stacked within the housing and fixed to the rotating drive shaft extension to provide the required outflow of chemicals to the dispenser. One such suitable meshed rotor assembly is the Nichols/Portland Company's 6020 gerotor-type having an outside diameter (externalmost periphery in FIG. 55) of 1.123 inches, an inside diameter (diameter of shaft reception opening in inner rotor) of 0.3125, an eccentricity of 0.052 inches, a maximum recommended operation, speed of 16,000 rpm, and a recommend thickness range of 0.094–0.625 of an inch. With the theoretical displacement of 0.20 In.$^3$/Rev./In for a rotor assembly of this type, one would be suitable for dispensing a sufficient amount of chemical for a lower throughput range such as the 8 lb./min. described as standard for many prior art systems. By stacking and fixing a second, similarly featured rotor assembly on the same drive shaft, the pump's output can be increased to handle an output of about 14 lb./min., for example. Additionally stacked rotor assemblies can also be relied upon to handle larger throughput requirements such as that for a ⅜ inch diameter mixing chamber. While not shown, the double-stacked arrangement would be fed by any suitable gerator inflow conduit system and its product would leave through any suitable outflow conduit system.

As discussed above, an intermittently run, AC motor is preferred for driving the pump assembly. One motor type which is particularly suited for use in the pumping system of the present invention, such as the double-stack arrangement discussed above, is "Series M" asynchronous single phase motor, short-circuit rotor manufactured by ELETROME-MECCANICAA NERI S.R.L. of Italy, and distributed by New England Mechatronics of Dover, N.H. One particularly suitable motor of the aforementioned type is the M71B, four-pole, 50 Hz motor which operates at about 1380 rpm and is a 0.35 Hp motor.

Figure 51:
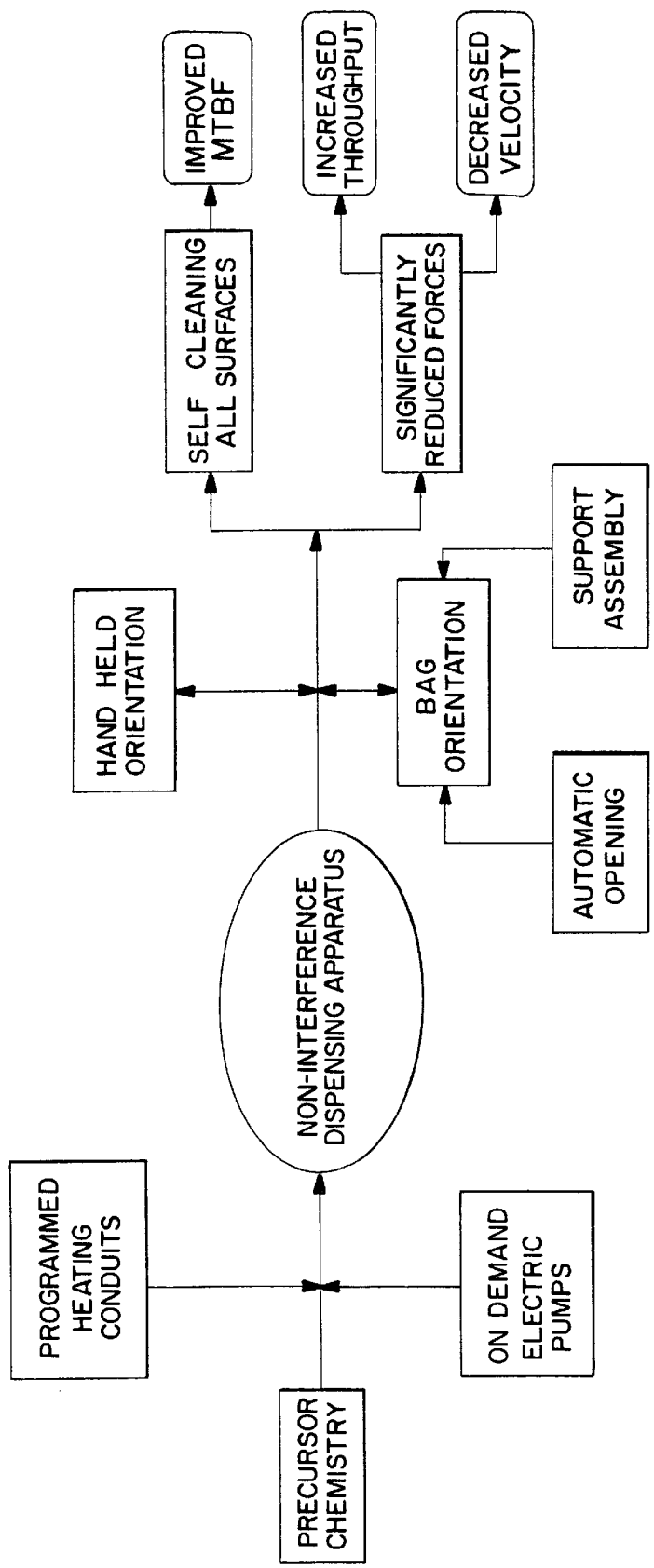
FIG. 51 schematically illustrates various interrelationships and some of the benefits made possible under the present invention.

FIG. 51 provides a schematic overview of many of the interrelationships and some of the resultant advantages of the preferred dispensing systems of the present invention. As shown in FIG. 51, the precursor chemistry is pumped using on-demand electric pumps having the beneficial feature described above including rapid and precise response to the demand for chemicals to be received in the mixing chamber. Also, FIG. 51 illustrates that the pumped chemicals are passed through heated conduits which include sensing and adjustment means to provide the foam being introduced into the mixing chamber assembly at the desired temperature and viscosity.

FIG. 51 further shows that the pumped and heated precursor chemicals are provided to a dispensing apparatus (e.g., a hand held gun or mounted dispenser) which has a non-interference fit purge rod arrangement with respect to the mixing chamber. Also, when utilizing a dispenser apparatus supported by a support stand, a bag dispensing assembly is provided which facilitates the position of a to be filled bag in the desired position.

FIG. 51 also reveals that whether dealing with a hand held dispenser, support stand mounted dispenser, or other type of dispenser of the present invention, the advantages of self-cleaning of all pertinent surfaces with solvent is obtained in conjunction with significantly reduced forces. The self-cleaning of all interactive, pertinent surfaces in the dispenser provides, among other advantages, improved meantime between failures (or scheduled servicing) and the force reduction allows for increased throughput (e.g., from the ability to increase the mixing chamber diameter) and/or a corresponding decrease in velocity of the foam output to avoid splattering. Numerous other advantages stem from the arrangement of the present invention as further outlined earlier and as will become apparent following a review of the description herein.

The on-demand pump assembly described above and noted in FIG. 51 of the present invention provides significant advantages over the prior art arrangements. The pulse pump arrangement of the present invention is such that the two heat controlled conduit lines 112, 114 are initially filled with the respective precursor chemicals up to the shuttle valve assembly. While the lines are filled, the chemicals in the lines are not under pressure. This is a significant distinction over the prior art pump systems wherein a certain pressure (e.g., 300 psi) was maintained in the conduit lines at all times. The on-demand or pulse pump arrangement of the present invention is designed such that a desired volume of foam is fed into the filled conduit at the time a handgun trigger or a switch is activated so as to push out that same volume at the opposite end of the conduit. The pump then stops and any built up pressure in the line is relieved at the pump (e.g., reverse rotation of a gerotor pump—which makes the above described AC motor/gerotor pump combination a particularly good combination). With the arrangement of the present pumping system, the pump can quickly reach the required pressure level (e.g., well less than a second and more likely within a couple of milliseconds (e.g., <10 milliseconds)) as opposed to the prior art systems that maintain a content pressure level in the lines in view of the long time needed to get up to the required pressure. Also, if different ratio's of chemicals A and B are required rather than altering the pump output, different diameter mixing chamber inlet ports can be utilized.

Figure 59:
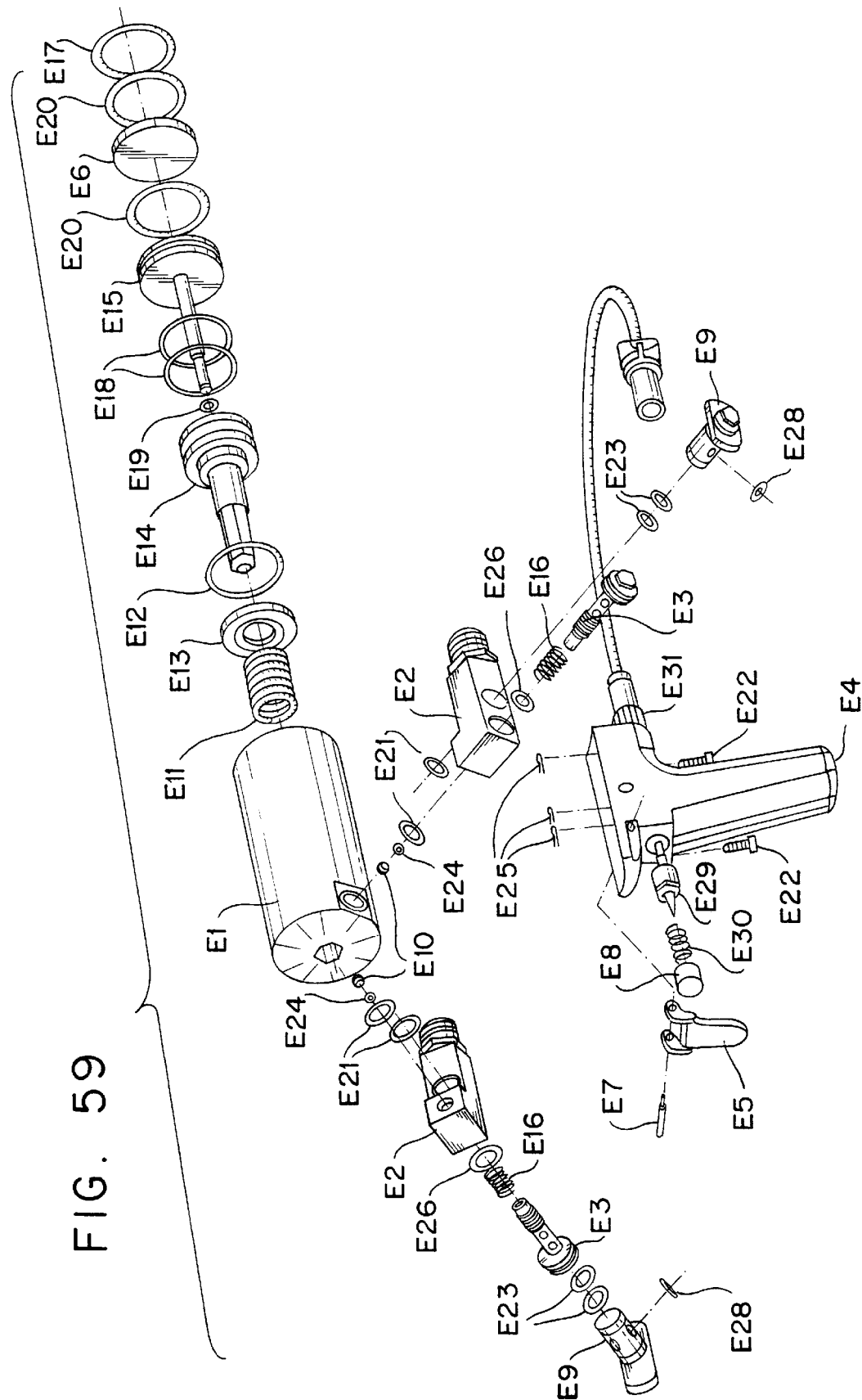
FIG. 59 shows an exploded view of an alternate embodiment of the dispensing assembly of the present invention.

FIG. 59 shows an exploded view of an alternate design of the dispensing assembly for the present invention. Provided below in Table 1 is a listing of the various components shown in FIG. 59 which each have the initial "E" to help in the indication that the embodiment of FIG. 59 is being discussed.

TABLE

| Item | Description of components |
| --- | --- |
| E1 | main gun body |
| E2 | manifold/ell valve |
| E3 | manifoid or ell valve retainer |
| E4 | handle |
| E5 | trigger |
| E6 | end cap |
| E7 | trigger retainer |
| E8 | trigger button |
| E9 | plug valve |
| E10 | chemical seal |
| E11 | valving spring |
| E12 | int. 1-½" S-ring |
| E13 | spring retainer |
| E14 | mixing chamber |
| E15 | purge rod |
| E16 | filter screen |
| E17 | 1-⅝" int. S-ring |
| E18 | 1-026 O-ring |
| E19 | 1-010 O-ring |
| E20 | 1-218 O-ring |
| E21 | ½" int. S-ring |
| E22 | cap screw |
| E23 | 1-012 O-ring |
| E24 | 1-006 O-ring |
| E25 | 1-008 O-ring |
| E26 | 1-013 O-ring |
| E27 | 1-014 O-ring |
| E28 | 1-009 O-ring |
| E29 | trigger switch assembly |
| E30 | trigger spring |
| E31 | strain relief |

Figure 60:
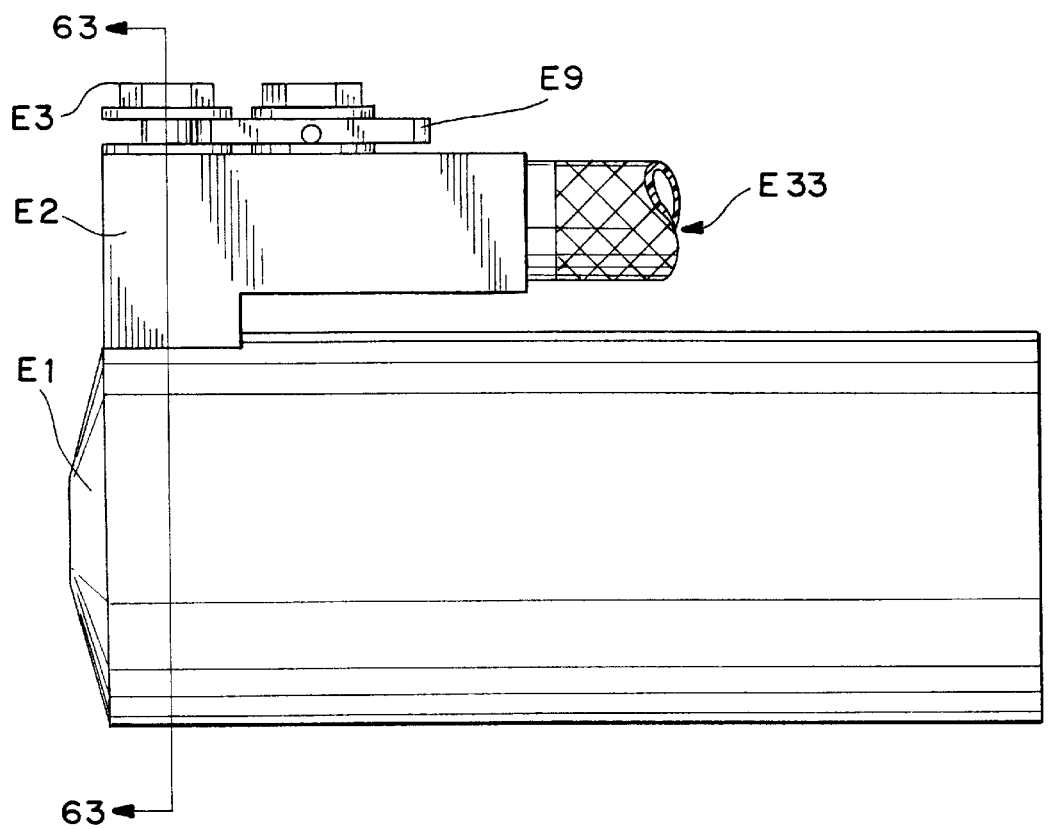
FIG. 60 shows a side view of the main body and manifold combination of the embodiment in FIG. 59.

The embodiment shown in FIG. 59 operates and is constructed in essentially the same fashion as the earlier described embodiments except for some modifications as described below and illustrated in the additional FIGS. 60–84. FIG. 60 illustrates chemical hose E33 leading into one of the two manifolds and plug valve E9 which is shown in the open and closed state in FIGS. 61 and 62. The outer end of retainer E3 is shown in each of FIGS. 60–62. Retainer E3 screws into the gun body and hold the manifold in position with respect to the gun body E1.

Figure 61:
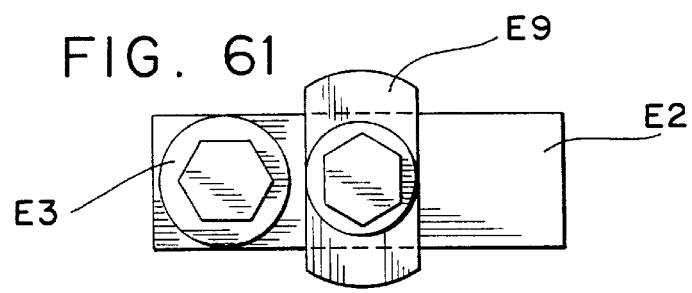
FIG. 61 shows a top view of the manifold in FIG. 60 in a closed state.
Figure 62:
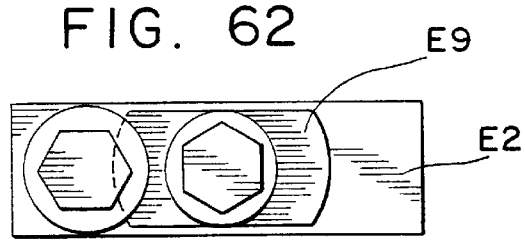
FIG. 62 shows a top view of the manifold in FIG. 61 in an open state.

FIG. 61 shows the valve E9 in a closed position wherein the retainer E2 can be removed without a problem of chemical leakage. Upon reattachment of manifold E2 to the gun body E1, valve E9 can then be moved into an open position wherein chemical flow to the mixing chamber is governed by whether the inlet ports of the mixing chamber are appropriately aligned.

Figure 63:
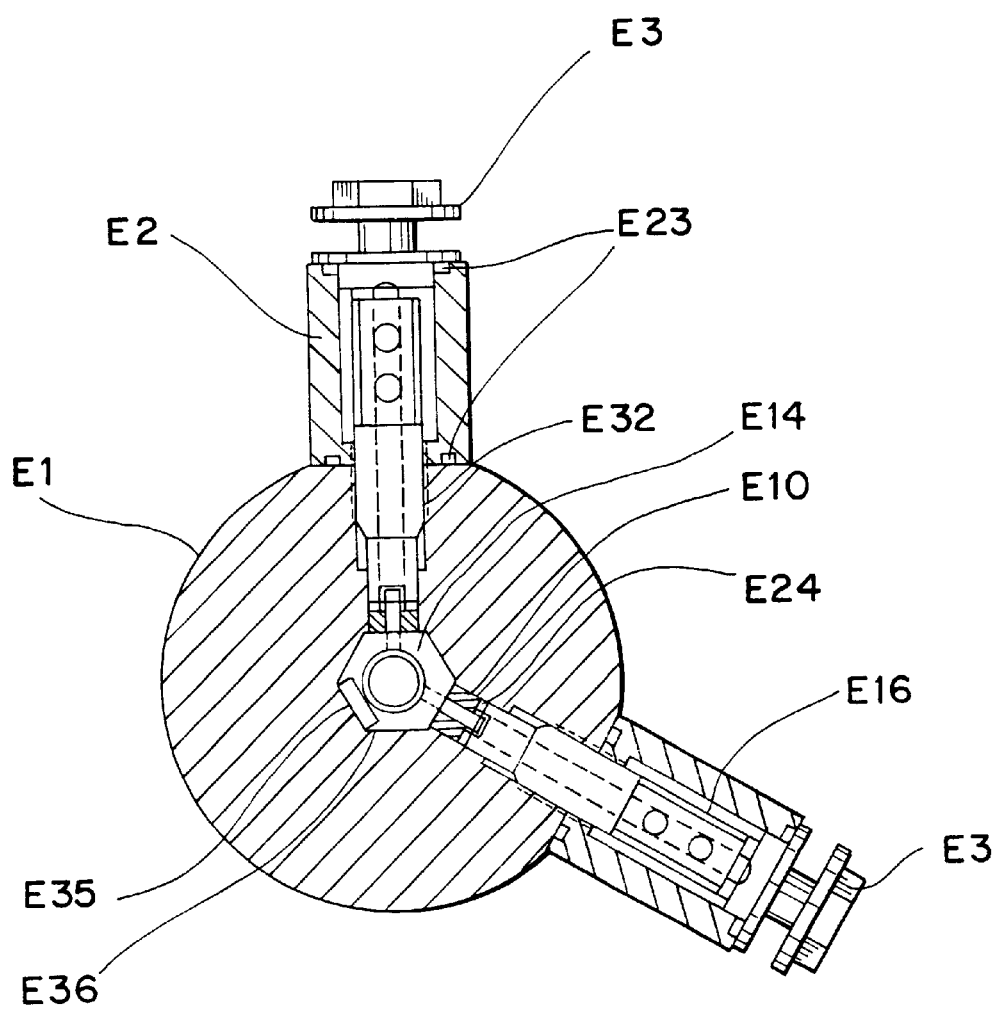
FIG. 63 shows a partial cross-section view taken along cross-section line 63—63 in FIG. 60.
Figure 69:
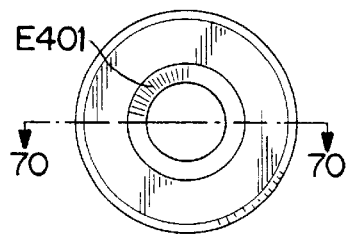
FIG. 69 shows an end view of the chemical seal used in the FIG. 60 embodiment.

FIG. 63 shows a cross-sectional view taken along cross-section line 63–63 in FIG. 60. This sectional view shows how the hose manifolds E2 are held onto the body with the retainer E3. Each retainer E3 is threaded into gun body E1 and is sealed top and bottom with O-rings. One advantage of this new design is easy removal of the chemical lines E33 and access to the chemical seals without disassembly of the dispenser. Also, rather than the spring loaded plunger of the last embodiment, nylon guide E35 is inserted into the side of the mixing chamber. The guide allows the mixing chamber to slide inside the gun body and holds the distance between the hexes at 0.010". The seals themselves provide for spacing fluctuation due to the O-ring's resiliency. That is, as particularly shown in FIG. 63, the new chemical seal E10 is stepped so that an O-ring is received and the combination is adjustable to spacing fluctuations.

Figure 72:
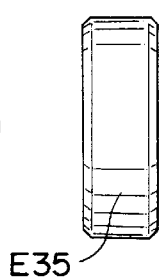
FIG. 72 shows a side view of that which is shown in FIG. 71.
Figure 73:
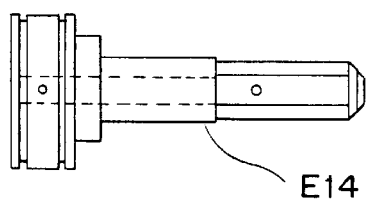
FIG. 73 shows an elevational view of the mixing chamber used in the FIG. 59 embodiment.
Figure 74:
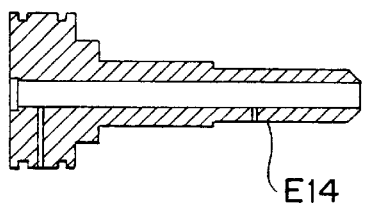
FIG. 74 shows a cross-sectional view of that which is shown in FIG. 73.
Figure 77:
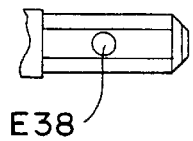
FIG. 77 shows an enlarged, cut-away view of that which is shown in FIG. 73.
Figure 75:
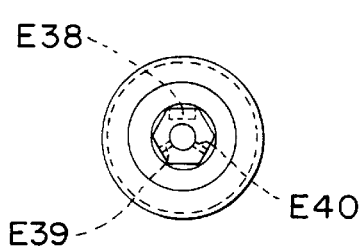
FIG. 75 shows a right end view of the mixing chamber shown in FIG. 73.
Figure 76:
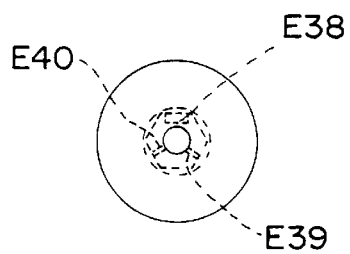
FIG. 76 shows a left end view of the mixing chamber shown in FIG. 73.

With reference to FIGS. 63, 71, 72, 75 and 77, the position and arrangement of the low friction glide is now described. FIG. 63 shows the glide in position with respect to mixing chamber E14. Glide E35 is best shown in FIG. 72 and is received within reception hole E38 spaced 120° offset from inlet ports E39 and E40 of mixing chamber E14 (FIGS. 75 and 76).

Figure 70:
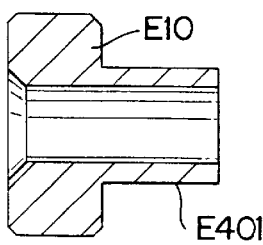
FIG. 70 shows a cross-sectional view of the seal in FIG. 69.
Figure 71:
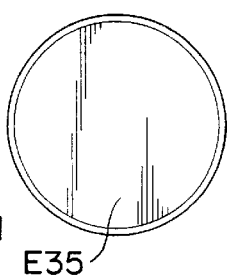
FIG. 71 shows a planar view of the chamber glide in the FIG. 60 embodiment.

With reference to FIGS. 63, 70 and 72, a description of chemical seal E10 retained in position by threaded retainer E3, is provided. Chemical seal E10 is stepped so that O-ring E24 can be placed over it. The stepped extension E40 chemical seal E10 fits within cylindrical tip E41 of retainer E3 O-ring E24 thus performs two functions (1) as a spring preload (it thus replaces the spring loaded plunger) of the earlier embodiment, and (2) seals the chemical seal from leakage when the mixing chamber E14 is in a closed state. The bottom and inside diameter of the O-ring is sealed against the chemical seal E10, while the outside diameter of the O-ring is sealed against the base in the gun body, and the top seals against the bottom of the retainer. The O-ring is designed for compression within a range of about 0.005" to 0.030".

As shown in FIGS. 64–68, the gun body is essentially the same as the earlier embodiments with a few exceptions such as a flattened manifold reception surface E42 and some modifications to receive the threaded section E43 provided on retainer E2. The threaded section E43 also provides a surface on which a hollow, cylindrical filter screen (not shown) rests. This screen is held within the larger end of manifold E2, the latter being illustrated in FIGS. 63 and 81–84. As shown in these figures, O-rings are received between the gun body and one end of the main housing of the manifold and also between a flanged ring of retainer E3 and an opposite end of the main housing of manifold E2. The rotating shut off valve E9 is received within intermediate recess E44 and manifold E2 is connected with a female hose reception coupling E45 pivotably joined to a swivel connector/communication line E46.

Although the present invention has been described with reference to preferred embodiments, the invention is not limited to the details thereof. Various substitutions and modifications will occur to those of ordinary skill in the art following a review of this application, and all such substitutions and modifications are intended to fall within the spirit and scope of the invention as defined in the appended claims.

Figure 85B:
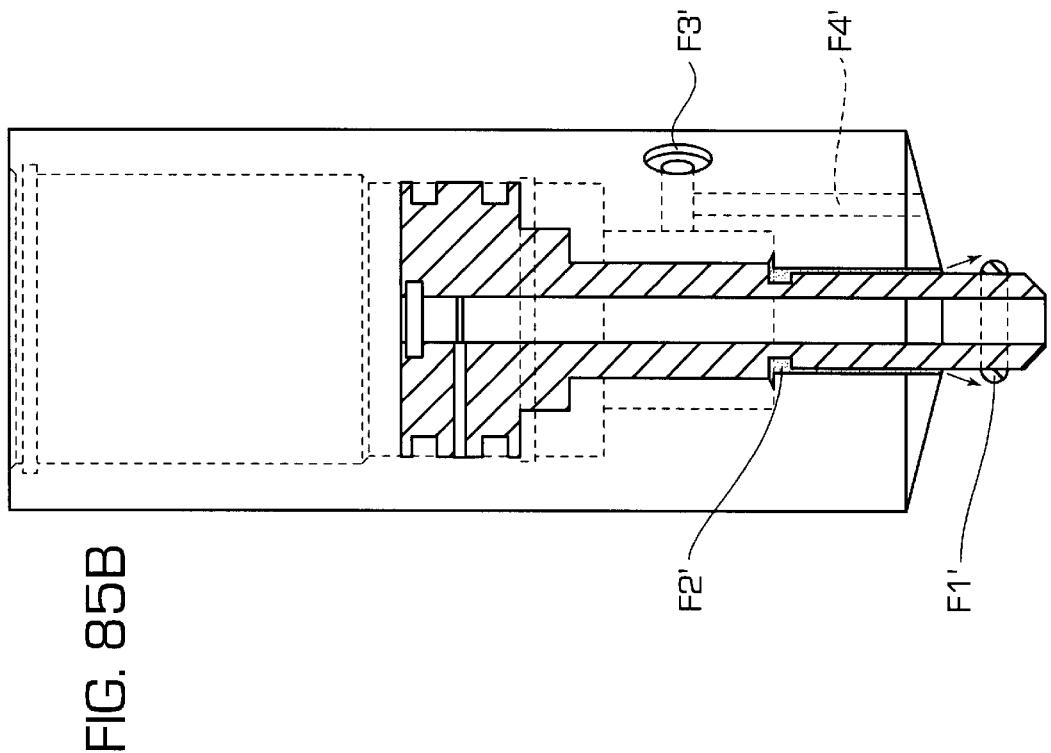
FIGS. 85A and 85B show a modified embodiment of the invention.
Figure 85A:
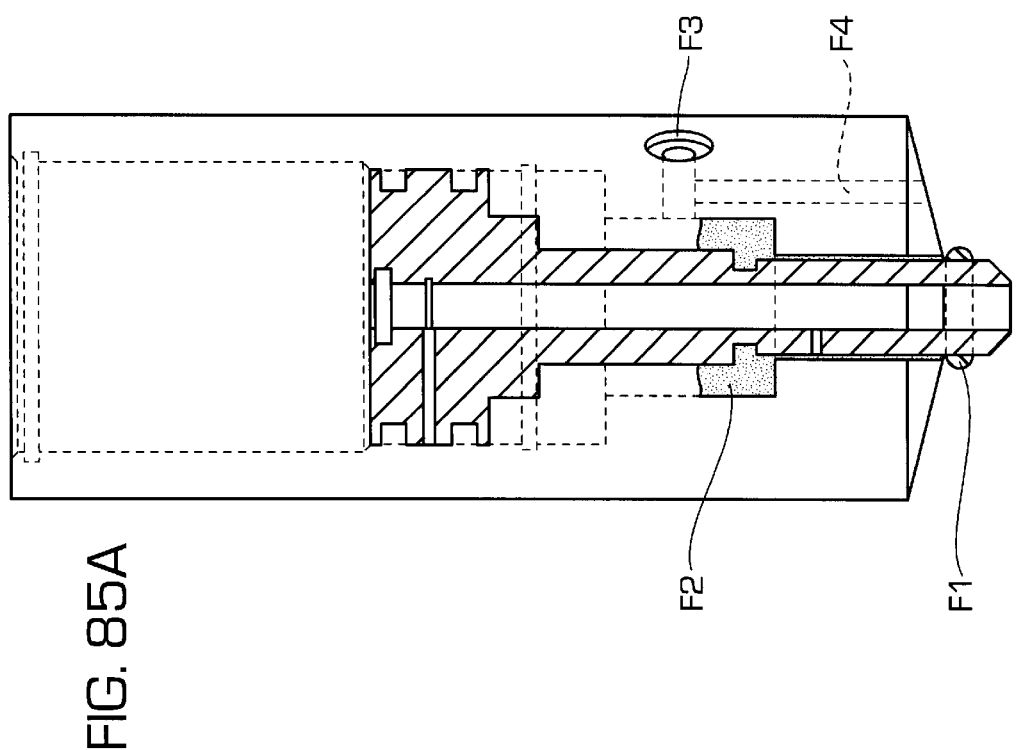

FIGS. 85A and 85B show a modified embodiment of the invention featuring seals positioned in a recess on the mixing chamber housing which is positioned to seal against the housing during the gun closed state and in a non-sealing arrangement during the gun open state. Thus the flow past along the mixing chamber member can be temporarily prevented to allow for a pooling of solvent until the next cycle. Also, a vent line is shown in these figures which helps avoid a pressurizing of the pooled solvent. In other words, when the gun is closed the O-ring seals the bottom of the hex between the body and chamber. The solvent now can collect in this space, keeping the chem seals wet between shots. When the gun opens the solvent flushes out from the tip, bringing with it any contaminants that may have collected inside. It also wet the tip of the hex with each shot. In this way there can be controlled the length of time that the solvent is turned on, and so control the solvent level. With the vent keeping the solvent unpressurized there is provided smoother flow with no high pressure squirting upon opening. Also, by keeping the space between the hexes wet keeps the surfaces and seals much cleaner for longer gun life.

FIGS. 86A and 86B show another embodiment of the invention featuring a spring return gun arrangement. These figures show the inside of the spring return gun. In the arrangement illustrated, the mixing chamber spring is stronger than the piston return spring. As air pressure si applied, the first action is the movement of the piston/purge rod assembly. When this action is completed, the pressure overcomes the mixing chamber spring and the chamber moves forward. Similarly, when the pressure is released, the stronger mixing chamber spring returns the chamber to its closed position, then the piston spring returns the piston to the closed position.

Figure 87A:
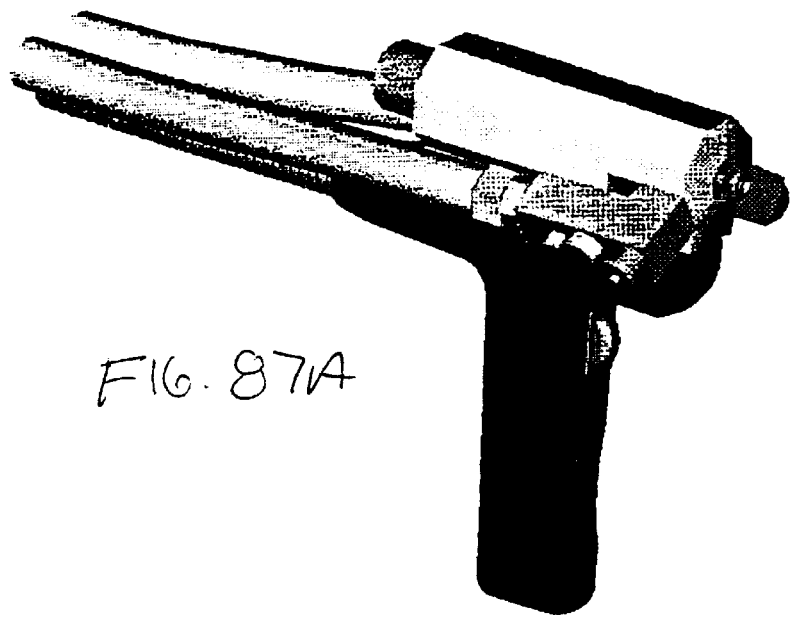
FIGS. 87A and 87B show perspective views of the embodiment in FIGS. 86A and 86B.
Figure 87B:
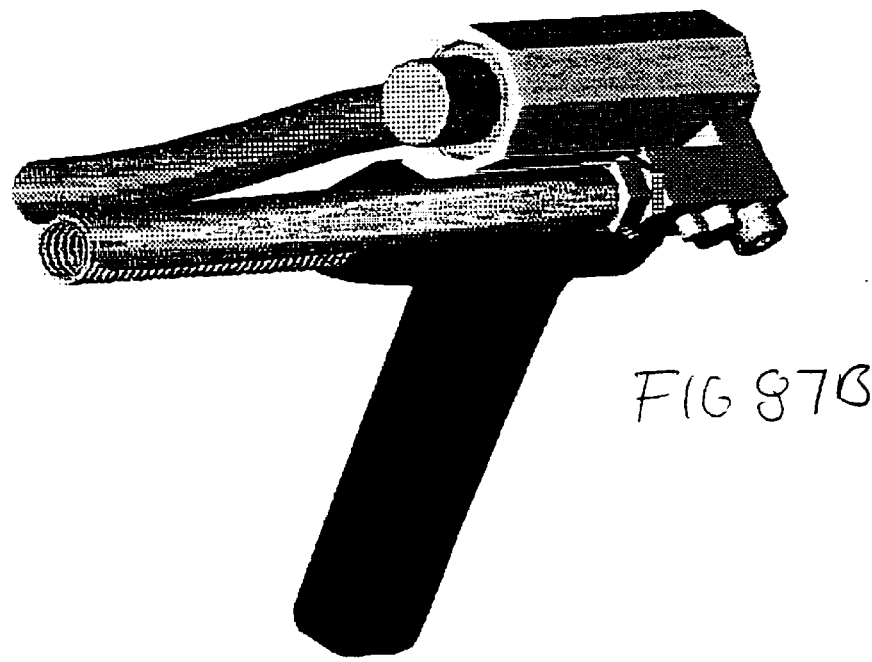

FIGS. 87A and 87B show perspective views of the embodiment spring gun return embodiment in FIGS. 86A and 86B mounted on a handgrip handle with the various feed tubes or conduits therefore illustrated in cross-section.

Figure 88:
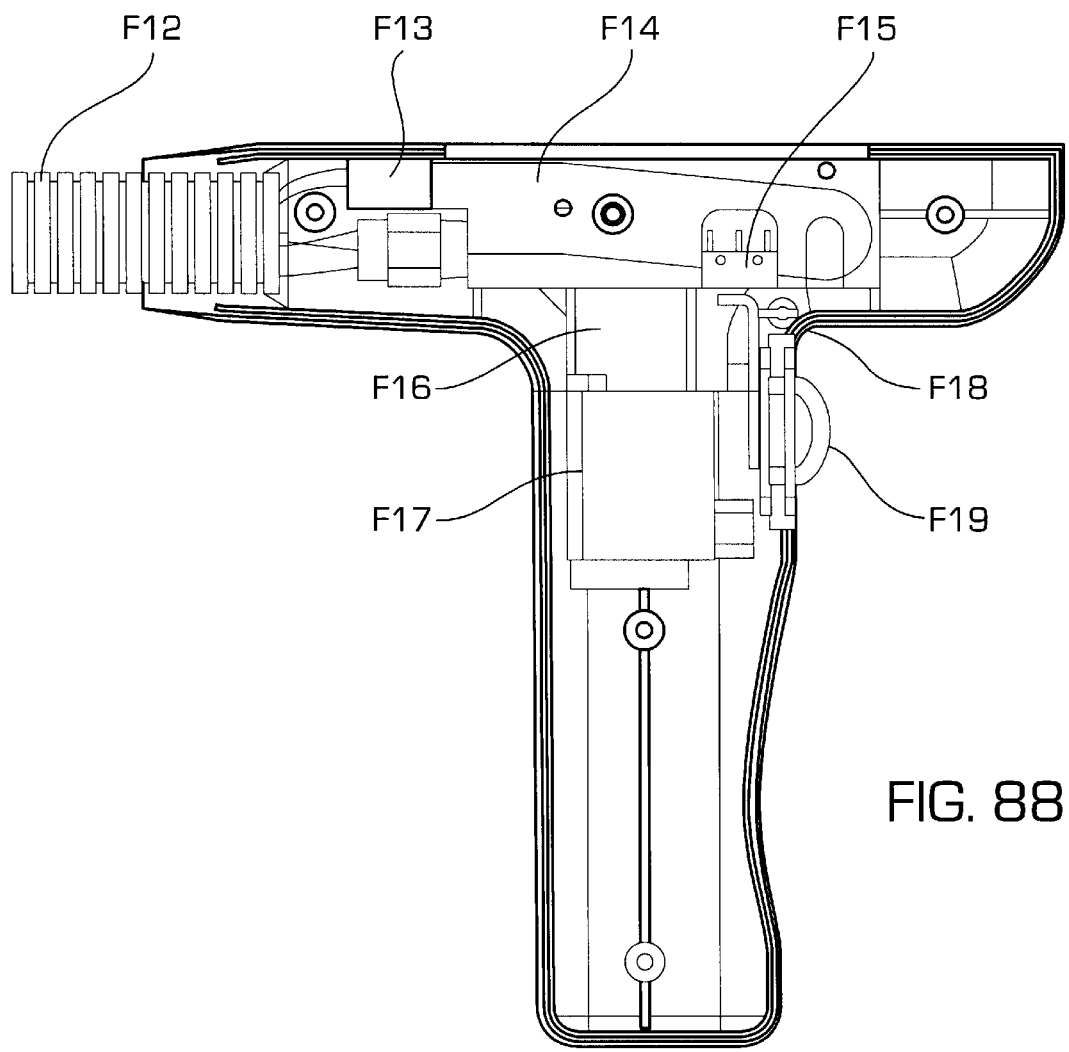
FIG. 88 shows a cut-away view of the embodiment in FIGS. 87A and 87B.
Figure 89:
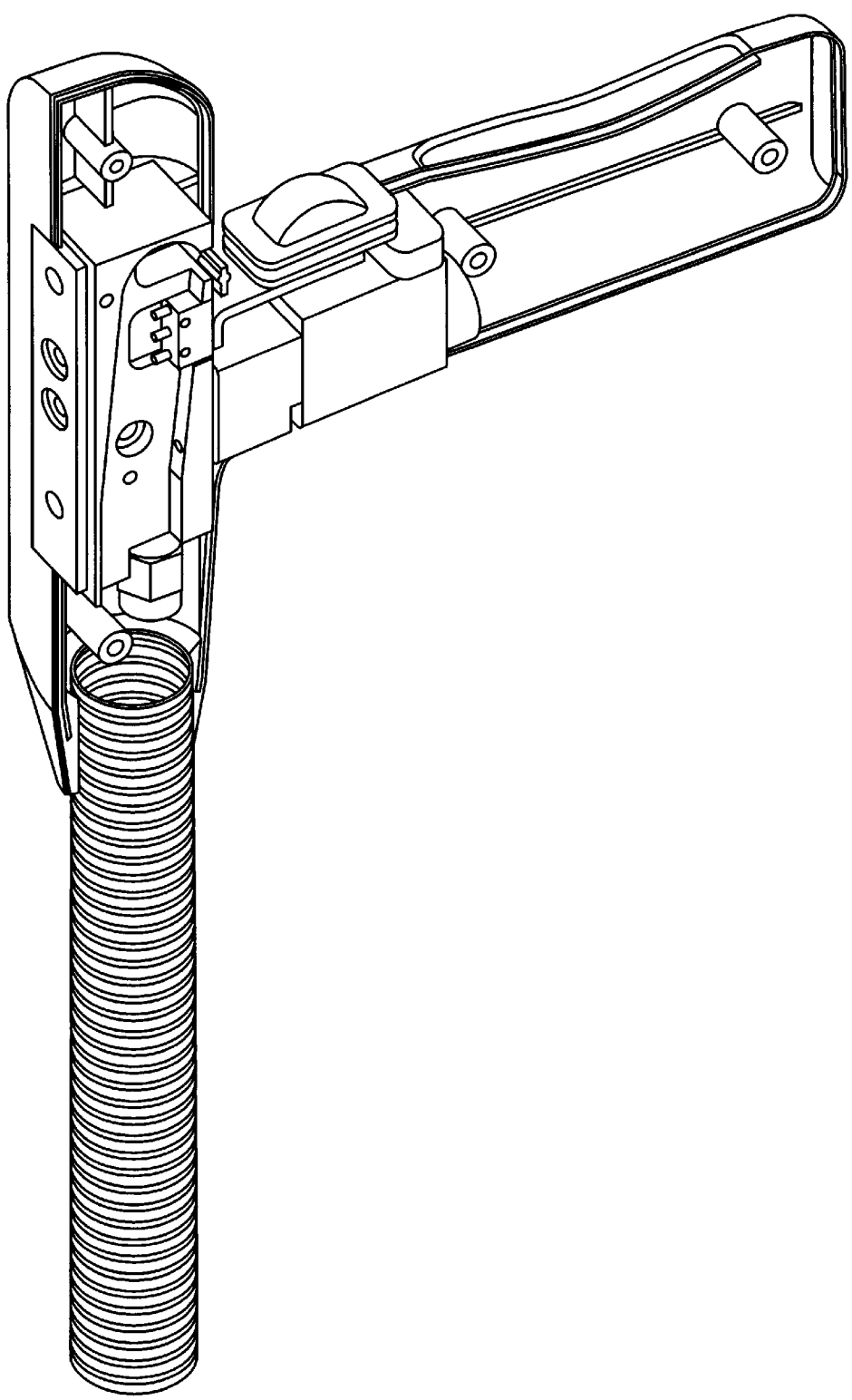
FIG. 89 shows a perspective view of FIG. 88.
Figure 91E:
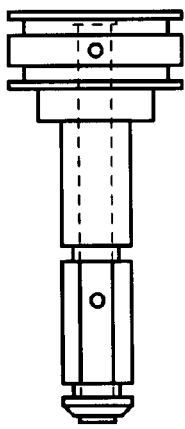
FIG. 91 shows a modified mixing chamber.
Figure 91B:
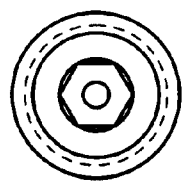
Figure 91A:
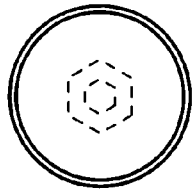
Figure 91D:
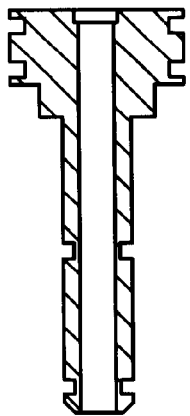
Figure 91C:
Figure 92A:
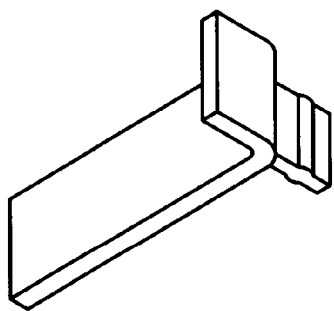
Figure 92B:
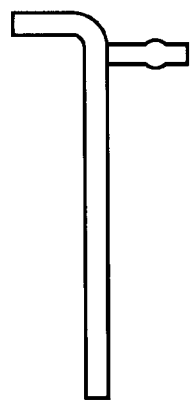
Figure 92C:
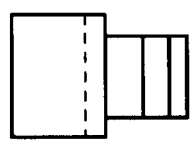
Figure 92D:
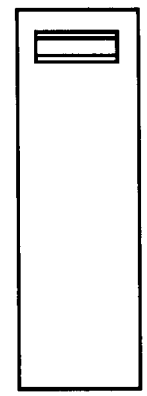
Figure 93C:
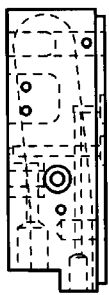
Figure 93B:
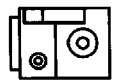
Figure 93A:
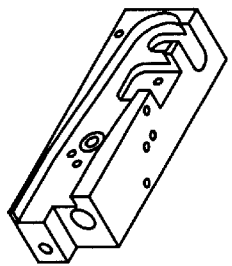
Figure 93F:
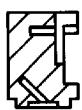
Figure 93E:
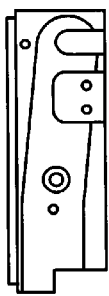
Figure 93D:
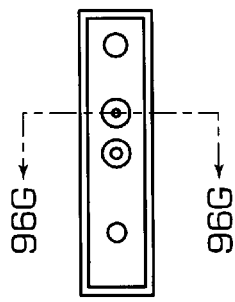
Figure 93G:
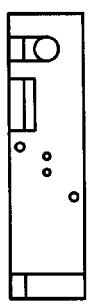
Figures 94A, 94E:
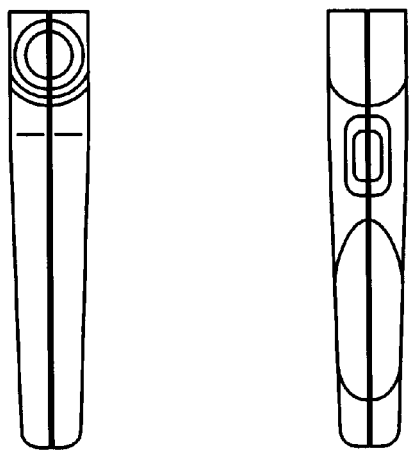
Figure 94B:
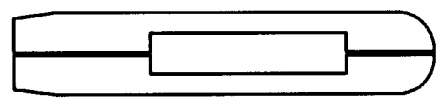
Figure 94C:
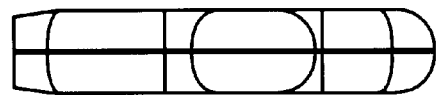
Figure 94D:
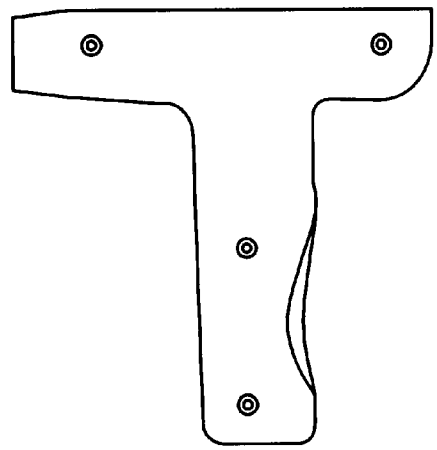

FIG. 88 shows a cut-away view of the hand dispenser handle shown in perspective view in FIGS. 87A and 87B, while FIG. 89 provides a perspective view of the same. The gun handle shown in FIG. 88 is preferably used in combination with the spring gun shown in FIGS. 86A and 86B. As shown in FIG. 88, in this embodiment there is only solenoid involved for actuation. The solenoid is located in the handle casing as shown. This arrangement speeds up the operation of the gun since the supply tube is maintained in a pressure state so there is no initial accumulation effect in opening. Thus, the spring gun is subjected to rapid action in going from its closed state to an open state (e.g., rapid movement of the mixing chamber member to a position wherein the chemical feed ports become aligned to allow for initiation of the precursors into the mixing chamber). Also the vent is closer in the embodiment shown to provide for rapid release of the pressurizing air and a corresponding fast close off.

FIG. 90 provides a plurality of views showing the vented gun body discussed above in FIGS. 85A and 85B.

FIG. 91 provides an illustration of the modified mixing chamber member with the added O-ring recess for the temporary accumulation of solvent.

FIGS. 92–96 provide a more detailed illustration of the various components of the hand dispenser handle and internal components.

| ITEM/FEATURE | DESCRIPTION OF COMPONENT |
| --- | --- |
| F1 | O-ring which seals solvent in gun (gun closed status) |
| F1' | O-ring in gun open status |
| F2 | Maximum solvent level |
| F2' | Gun open solvent status |
| F3 | Screw plugged hole |
| F4 | Air vent which keeps solvent from pressurizing |
| F5 | State of solvent flush when gun opens |
| F6 (FIG. 86A) | Piston return spring (gun closed status) |
| F7 | Piston/Purge (gun closed status) |
| F8 | Mixing chamber return spring (gun closed status) |
| F9 | Mixing chamber (gun closed status) |
| F10 | Open Air Port |
| F11 | Spring return gun |
| F12 (FIG. 88) | Conduit |
| F13 | Fittings |
| F14 | Handle Block |
| F15 | Switch |
| F16 | Solenoid Valve |
| F17 | Solenoid |
| F18 | Plastic Actuation |
| F19 | Rubber Button |

FIGS. 90A to 90E show various views of the main body of the gun.

FIGS. 91A to 91E show various views of the mixing chamber.

FIGS. 92A–92D show various views of the trigger actuator.

FIGS. 93A to 93G show various views of the handle block.

FIGS. 94A to 94G show various views of the handle's exterior.

FIGS. 95A to 95F show various views of the handles' interior.

FIGS. 96A to 96G show various views of the trigger.

What is claimed is:

1. A dispensing apparatus comprising:
   a dispenser housing having a dispensing end and a reception chamber formed in said dispenser housing;
   a mixing chamber member received within the reception chamber of said dispenser housing, said mixing chamber member having a mixing chamber formed therein, fluid passageways opening into said mixing chamber, and a discharge outlet for discharging mixed fluid;
   said mixing chamber member being slidably received within said reception chamber so as to be shiftable between a dispensing mode and a non-dispensing mode; and
   said dispensing apparatus further comprising a seal member supported at a front end of said housing and in sealing engagement with said reciprocating mixing chamber.

2. A dispensing apparatus as recited in claim 1 further comprising a purge rod received within said mixing chamber.

3. A method of assembling the dispensing apparatus of claim 2 comprising:
   inserting said purge rod within the mixing chamber defined by said mixing chamber member with the purge rod being dimensioned to be in a non-interference fit relationship such that a solvent fluid passageway is formed between all exterior portions of the rod received within said mixing chamber and said mixing chamber member;
   and inserting said mixing chamber member such that said mixing chamber member is in a sealing relationship with respect to said seal member.

4. A method as recited in claim 3 further comprising:
   providing solvent material for use in the foam dispensing apparatus which includes a solvent for removing or preventing foam residue build up and, in addition, flow control particles mixed with said solvent.

5. A method as recited in claim 3 further comprising manufacturing said rod and said mixing chamber so as to have a solvent flow spacing which is sufficiently large enough to allow for a solvent fluid film formation between all exterior portions of the rod received by said mixing chamber.

6. A dispensing apparatus as recited in claim 2 further comprising a mixing chamber biasing member positioned in contact with said mixing chamber member to bias said mixing chamber member within said reception chamber.

7. A dispensing apparatus as recited in claim 1 further comprising first and second side seal members in position between an exterior surface of said mixing chamber member and an interior surface of the reception chamber of said dispenser housing, said first and second side seals, when in position and when said mixing chamber member is in said dispensing mode, surrounding chemical precursor inlet ports formed in said dispenser housing, and in said mixing chamber member.

8. A method of assembling the dispenser apparatus of claim 7 comprising positioning said mixing chamber member within the reception chamber of said dispenser housing such that said mixing chamber member is in a sealing relationship with said seal member, and;

inserting said first and second side seals between the exterior surface of said mixing chamber member and the interior surface of the reception chamber of said dispenser housing, such that when said mixing chamber member is in the dispensing mode said first and second side seals surround the chemical precursor inlet ports formed in said dispenser housing and in said mixing chamber member, and when said mixing chamber member is in said non-dispensing mode the chemical precursor inlet ports of said dispenser housing are sealed off from fluid communication with the inlet ports of said mixing chamber member.

9. A method of assembling the dispenser apparatus of claim 1, comprising:

positioning said mixing chamber member within the reception chamber of said dispenser housing;

positioning said mixing chamber member so as to be in a sealing relationship with said seal member, and;

positioning a mixing chamber biasing member into contact with said mixing chamber member to bias said mixing chamber into a first of at least two reciprocation positions assumable by said mixing chamber member within said reception chamber.

10. A method as recited in claim 9 further comprising inserting a purge rod into said mixing chamber and attaching a piston to said rod prior to insertion of said rod into said mixing chamber and inserting the piston into a piston chamber defined by said dispenser housing.

11. A dispensing apparatus comprising:

a dispenser housing having a dispensing end and a reception chamber formed in said dispenser housing;

a mixing chamber member received within the reception chamber of said dispenser housing, said mixing chamber member having a mixing chamber formed therein, fluid passageways opening into said mixing chamber, and a discharge outlet for discharging mixed fluid;

said mixing chamber member being slidably received within said reception chamber so as to be shiftable between a dispensing mode and a non-dispensing mode; and wherein said mixing chamber member is reciprocated by a combination of air pressure in feed means and a pair of different strength springs.

\* \* \* \* \*